(12) United States Patent
Yamada et al.

(10) Patent No.: US 8,436,805 B2
(45) Date of Patent: May 7, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

(75) Inventors: Naoshi Yamada, Osaka (JP); Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 737 days.

(21) Appl. No.: 12/527,594

(22) PCT Filed: Mar. 5, 2008

(86) PCT No.: PCT/JP2008/053956
§ 371 (c)(1),
(2), (4) Date: Aug. 18, 2009

(87) PCT Pub. No.: WO2008/146512
PCT Pub. Date: Dec. 4, 2008

(65) Prior Publication Data
US 2010/0097359 A1    Apr. 22, 2010

(30) Foreign Application Priority Data
May 30, 2007  (JP) .................................. 2007-144187

(51) Int. Cl.
G09G 3/36    (2006.01)
(52) U.S. Cl.
USPC ........................................... 345/103; 345/87
(58) Field of Classification Search ............. 345/87–104
See application file for complete search history.

(56) References Cited

U.S. PATENT DOCUMENTS

| 6,661,488 | B1 | 12/2003 | Takeda et al. |
| 6,724,452 | B1 | 4/2004 | Takeda et al. |
| 7,167,224 | B1 | 1/2007 | Takeda et al. |
| 7,224,421 | B1 | 5/2007 | Takeda et al. |
| 7,304,703 | B1 | 12/2007 | Takeda et al. |

(Continued)

FOREIGN PATENT DOCUMENTS

CN    1892388 A    1/2007

OTHER PUBLICATIONS

International Search Report for PCT/JP2008/053956, mailed Jun. 10, 2008.

*Primary Examiner* — Alexander Eisen
*Assistant Examiner* — Nelson Lam
(74) *Attorney, Agent, or Firm* — Nixon & Vanderhye P.C.

(57) ABSTRACT

Provided is an active matrix substrate configured such that: a retention capacitor line ($18x$) is provided so as to correspond to a space between adjacent pixel regions ($5\alpha$, $5\beta$); capacitor electrodes ($27xa$, $27xb$) are provided so as to overlap the retention capacitor line ($18x$); a retention capacitor line ($18y$) is provided so as to correspond to a space between adjacent pixel region ($5\alpha$, $5\gamma$); capacitor electrodes ($27ya$, $27yb$) are provided so as to overlap the retention capacitor line ($18y$); a first pixel electrode ($17a$) provided in the pixel region ($5\alpha$) is electrically connected to the capacitor electrode ($27xa$) overlapping one ($18x$) of adjacent retention capacitor lines ($18x$, $18y$) and a second pixel electrode ($17b$) provided in the pixel region ($5\alpha$) is electrically connected to the capacitor electrode ($27yb$) overlapping the other one ($18y$) of the two adjacent retention capacitor lines ($18x$, $18y$); and an interconnection line ($27ia$) for electrically connecting the first pixel electrode ($17a$) is provided. The arrangement allows an active matrix substrate employing a pixel dividing method in which a plurality of pixel electrodes are provided in a single pixel, to restrain the number of retention capacitor lines and to improve flexibility in shapes of individual pixel electrodes.

29 Claims, 30 Drawing Sheets

U.S. PATENT DOCUMENTS

| | | |
|---|---|---|
| 7,859,500 B2 * | 12/2010 | Sasabayashi et al. ........... 345/90 |
| 2003/0227429 A1 | 12/2003 | Shimoshikiryo |
| 2004/0001167 A1 | 1/2004 | Takeuchi et al. |
| 2004/0119924 A1 | 6/2004 | Takeda et al. |
| 2005/0162599 A1 * | 7/2005 | Kurihara et al. ............. 349/139 |
| 2005/0213015 A1 | 9/2005 | Shimoshikiryo |
| 2005/0225525 A1 * | 10/2005 | Wu et al. ........................ 345/89 |
| 2006/0097972 A1 | 5/2006 | Takeuchi et al. |
| 2006/0109406 A1 * | 5/2006 | Sasabayashi et al. ......... 349/129 |
| 2006/0256271 A1 | 11/2006 | Shimoshikiryo |
| 2007/0007525 A1 | 1/2007 | Ahn |
| 2007/0064187 A1 | 3/2007 | Takeda et al. |
| 2008/0049155 A1 * | 2/2008 | Yagi et al. ....................... 349/39 |
| 2008/0122772 A1 | 5/2008 | Takeuchi et al. |
| 2008/0165298 A1 * | 7/2008 | Song et al. ...................... 349/37 |
| 2008/0165314 A1 | 7/2008 | Takeda et al. |
| 2008/0303997 A1 | 12/2008 | Takeda et al. |
| 2009/0021658 A1 | 1/2009 | Takeuchi et al. |

\* cited by examiner

ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

This application is the U.S. national phase of International Application No. PCT/JP2008/053956 filed 5 Mar. 2008, which designated the U.S. and claims priority to JP Application No. 2007-144187 filed 30 May 2007, the entire contents of each of which are hereby incorporated by reference.

TECHNICAL FIELD

The present invention relates to an active matrix substrate employing a pixel dividing method (a multi-pixel structure) in which a plurality of pixel electrodes are provided in a single pixel, and a liquid crystal display device and the like using the active matrix substrate.

BACKGROUND ART

As a technique to improve a viewing angle dependence of a γ-characteristic in a liquid crystal display device, a pixel dividing method (a multi-pixel structure) in which a plurality of pixel electrodes are provided in a single pixel has been developed. The viewing angle dependence of a γ-characteristic is a difference between (i) the γ-characteristic when the liquid crystal display device is viewed from the front and (ii) the γ-characteristic when the liquid crystal display device is viewed at oblique angles.

FIG. 30 is a plane view illustrating an arrangement of an active matrix substrate employing the pixel dividing method, disclosed in Patent Literature 1. When an active matrix substrate 900 is viewed in a plane manner, (i) a retention capacitor line (924a, 924b) is provided so as to correspond to a space between two pixel regions adjoining each other in a direction along a data signal line 914 (hereinafter referred to as a column direction); (ii) a scanning signal line 912 is provided so as to cut across a center of a pixel region; and (iii) a first pixel electrode 918a and a second pixel electrode 918b are provided on sides of the scanning signal line 912, respectively, such that (a) the first pixel electrode 918a is sandwiched between the scanning signal line 912 and the retention capacitor line 924a and (b) the second pixel electrode 918b is sandwiched between the scanning signal line 912 and the retention capacitor line 924b. The first pixel electrode 918a is connected to a drain electrode of a first transistor 916a, and the second pixel electrode 918b is connected to a drain electrode of a second transistor 916b. The first and second transistors 916a and 916b are connected to the same data signal line 914 and the same scanning signal line 912. Each of the pixel electrodes (918a and 918b) has a slit 918s, and the slit 918s serves as a structure for regulating liquid crystal orientation in a case where a liquid crystal display device is constructed by use of the active matrix substrate.

In the active matrix substrate, a capacitor electrode 932a is provided so that the capacitor electrode 932a, and the retention capacitor line 924a overlap each other. Further, a capacitor electrode 932b is provided so that the capacitor electrode 932b and the retention capacitor line 924b overlap each other. The capacitor electrode 932a is connected to the drain electrode of the first transistor 916a via a drain lead line 927a, and the capacitor electrode 932b is connected to the drain electrode of the second transistor 916b via a drain lead line 927b.

The capacitor electrode 932a is connected to the first pixel electrode 918a via a contact hole 911a, and the capacitor electrode 932b is connected to the second pixel electrode 918b via a contact hole 911b. That is, a retention capacitance is formed between (i) the capacitor electrode 932a connected to the first pixel electrode 918a and (ii) the retention capacitor line 924a, and a retention capacitance is formed between (iii) the capacitor electrode 932b connected to the second pixel electrode 918b and (iv) the retention capacitor line 924b. Moreover, as mentioned above, one retention capacitor line is provided so as to correspond to a space between two adjacent pixel regions. In other words, one retention capacitor line is shared by two adjacent pixel regions.

In a case where such an active matrix substrate is used in a liquid crystal display device, the same potential is once written in the first and second pixel electrodes 918a and 918b. However, it is possible to make effective potentials of the pixel electrodes 918a and 918b different, for example, by controlling potentials of the first and second retention capacitor lines 924a and 924b so that phases of the potentials are opposite to each other. This results in that, for example, a bright sub pixel can be formed by the first pixel electrode 918a and a dark sub pixel can be formed by the second pixel electrode 918b. Examples of related well-known documents are Patent Literatures 2 through 4 as below.

CITATION LIST

Patent Literature 1

Japanese Patent Application Publication, Tokukai, No. 2004-62146 A (Publication Date: Feb. 26, 2004)

Patent Literature 2

International Publication, WO 2006/038598 (Publication Date: Apr. 13, 2006)

Patent Literature 3

Japanese Patent Application Publication, Tokukaihei, No. 11-242225 A (Publication Date: Sep. 7, 1999)

Patent Literature 4

Japanese Patent Application Publication, Tokukai, No. 2004-78157 A (Publication Date: Mar. 11, 2004)

SUMMARY OF INVENTION

However, while the active matrix substrate 900 has an advantage that one retention capacitor line can be shared by two pixel regions, it is necessary (i) to overlap a part of the first pixel electrode 918a with the first retention capacitor line 924a so that the capacitor electrode 932a that overlaps the retention capacitor line 924a is connected to the first pixel electrode 918a via the contact hole 911a, and (ii) to overlap a part of the second pixel electrode 918b with the retention capacitor line 924b for the same reason. More specifically, while the first pixel electrode 918a should be formed so that the first pixel electrode 918a and one end of the pixel region (one of two ends of the pixel region in a row direction) overlap each other, the second pixel electrode 918b should be formed so that the second pixel electrode 918b and the other end of the pixel region (the other one of the two ends in the row direction) overlap each other. This causes a problem that shapes and positional relations of the first and second electrodes (918a, 918b) are limited. This problem may result in that a boundary between the first and second pixel electrodes 918a and 918b appears rough in a case where the first pixel electrode 918a, provided as a bright pixel, and the second pixel electrode 918b, provided as a dark pixel, are provided in the same shape such that one is placed above the other, as in the active matrix substrate 900.

In order to reduce such roughness, there has been developed an active matrix substrate, as illustrate in FIG. 31 (see Patent Literature 2), in which a first pixel electrode as a bright sub pixel is constituted by a transparent electrode 711a and a second pixel electrode as a dark sub pixel is constituted by transparent electrodes 711b and 711c such that the transparent electrode 711a is sandwiched between the transparent electrodes 711b and 711c. In the active matrix substrate, two retention capacitor lines (740, 741) are provided so as to correspond to a pixel region, a capacitor electrode 717a is provided so as to overlap the retention capacitor line 740, and a capacitor electrode 717b is provided so as to overlap the retention capacitor line 741. The capacitor electrode 717a is connected to the transparent electrode 711a via a contact hole 718a, and the capacitor electrode 717b is connected to the transparent electrode 711b via a contact hole 718b. Further, the capacitor electrode 717b is connected to the transparent electrode 711c via a wiring line 716d and a contact hole 718c. The capacitor electrode 717a is connected to a drain electrode of a transistor 715a, and the capacitor electrode 717b is connected to drain electrodes of transistors 715b and 715c. Each of the transistors 715a through 715c is connected to a data signal line 715 and a scanning signal line 716.

In the arrangement, while the transparent electrode 711b and one end of the pixel region (one of two ends of the pixel region in a row direction) overlap each other, the transparent electrode 711c and the other end of the pixel region (the other one of the two ends in the row direction) overlap each other. Further, in the arrangement, the transparent electrodes 711b and 711c are dark sub pixels. Accordingly, the arrangement cannot be structured in a similar manner to the arrangement of FIG. 30 in which two pixel regions adjoining each other in a column direction share a retention capacitor line provided so as to correspond to a space between the two pixel regions.

That is, while the active matrix substrate of FIG. 31 has an advantage that roughness can be reduced, the active matrix substrate of FIG. 31 has the following problems. That is, since the active matrix substrate of FIG. 31 is arranged such that two retention capacitor lines (740, 741) cut across a pixel region, a production yield is reduced due to short circuits between a data signal line and a retention capacitor line, a signal delay is caused due to heavy load by multiple wirings, a power consumption increases, or the like problem is caused.

The present invention is accomplished in view of the above problems. An object of the present invention is to restrain the number of retention capacitor lines and to increase flexibility in shape of a pixel electrode in an active matrix substrate employing a pixel dividing method.

An active matrix substrate of the present invention includes: scanning signal lines each extending in a row direction; data signal lines each extending in a column direction; retention capacitor lines each extending in the row direction; first and second transistors each provided near the vicinity of each intersection of the scanning signal lines and the data signal lines so that each of the first and second transistors is connected to a corresponding scanning signal line and a corresponding data signal line; first and second pixel electrodes each provided in each pixel region, said first pixel electrode being connected to the first transistor and said second pixel electrode being connected to the second transistor. The active matrix substrate is configured such that: one retention capacitor line is provided so as to correspond to a space between two pixel regions adjoining each other in the column direction; a plurality of capacitor electrodes are provided so as to overlap the retention capacitor line so that (a) either of first and second pixel electrodes provided in one of the two pixel regions and (b) either of first and second pixel electrodes provided in the other one of the two pixel regions are electrically connected, respectively, to corresponding ones of the plurality of capacitor electrodes provided so as to overlap the retention capacitor line; said first pixel electrode provided in each pixel region is electrically connected to a corresponding one of the plurality of capacitor electrodes that is provided so as to overlap one of two adjacent retention capacitor lines and said second pixel electrode provided in the each pixel region is electrically connected to a corresponding one of the plurality of capacitor electrodes that is provided so as to overlap the other one of the two adjacent retention capacitor lines; and an interconnection line for electrically connecting said first or second pixel electrode to a corresponding one of the plurality of capacitor electrodes is provided.

In the arrangement, the plurality of capacitor electrodes are provided in each retention capacitor line and the interconnection line for connecting the first or second pixel electrode to a corresponding one of the plurality of capacitor electrodes is provided. This arrangement allows (i) the arrangement in which one retention capacitor line is shared by two pixel regions adjoining each other in a column direction, and (ii) an improvement in flexibility in the shapes and positions of individual pixel electrodes. Since one retention capacitor line can be shared by two pixel regions as such, it is also possible to avoid problems such as a decrease in yield rate due to a short circuit between a data signal line and a retention capacitor line, signal delay caused by heavy load due to multiple wirings, and an increase in power consumption.

An active matrix substrate of the preset invention includes: data signal lines each extending in a column direction, when a direction in which scanning signal lines extend is regarded as a row direction; retention capacitor lines; first and second transistors each connected to a corresponding scanning signal line and a corresponding data signal line; pixel regions aligned in row and column directions each including first and second pixel electrodes, said first pixel electrode being connected to the first transistor and said second pixel electrode being connected to the second transistor. The active matrix substrate is configured such that: one retention capacitor line is provided so as to correspond to two pixel regions adjoining each other in the column direction; a plurality of capacitor electrodes are provided so as to form capacitances with the retention capacitor line, so that (a) one of two pixel electrodes provided in one of the two pixel regions and (b) one of two pixel electrodes provided in the other one of the two pixel regions are electrically connected to respective capacitor electrodes adjoining each other in the row direction out of the plurality of capacitor electrodes; said first pixel electrode provided in each of the pixel regions is electrically connected to a corresponding one of the plurality of capacitor electrodes that forms a capacitance with one of two adjacent retention capacitor lines, and said second pixel electrode provided in the each of the pixel regions is electrically connected to a corresponding one of the plurality of capacitor electrodes that forms a capacitance with the other one of the two adjacent retention capacitor lines.

With the arrangement, it is possible to improve flexibility in the shapes and positions of individual pixel electrodes, while one retention capacitor line is shared by two pixel regions adjoining each other in the column direction. For example, when a virtual line bisecting a pixel region in the column direction is regarded as a central line, a part of the first pixel region and a part of the second pixel region can be positioned at one side of the central line and the other part of the first pixel region and the other part of the second pixel region can be positioned at the other side of the central line.

The active matrix substrate of the present invention can be arranged such that each of the scanning signal lines is provided between two adjacent retention capacitor lines.

The active matrix substrate of the present invention can be arranged such that (i) a corresponding one of the plurality of capacitor electrodes that is connected to a first pixel electrode provided in one of two pixel regions adjoining each other in a row direction and (ii) a corresponding one of the plurality of capacitor electrodes that is connected to a second pixel electrode provided in the other one of the two pixel regions are provided so as to overlap the same retention capacitor line. The arrangement allows formation of an active matrix substrate preferably used in a dot-inversion drive or a V-line inversion drive that is effective for flickers or the like.

The active matrix substrate of the present invention can be arranged such that one pixel region is provided between two adjacent retention capacitor lines.

The active matrix substrate of the present invention can be arranged such that the plurality of capacitor electrodes and drain electrodes of said first and second electrodes are provided in the same layer.

The active matrix substrate of the present invention can be arranged such that said first pixel electrode provided in each pixel region corresponds to a bright pixel in display, and said second pixel electrode provided in the each pixel region corresponds to a dark pixel in display.

The active matrix substrate of the present invention can be arranged such that a part of said second pixel electrode provided in each pixel region is positioned at both ends of the each pixel region, along two adjacent retention capacitor lines, respectively.

The active matrix substrate of the present invention can be arranged such that a part of said second pixel electrode is positioned at at least two sides of four sides surrounding said first pixel electrode. This can reduce roughness appearing when pixel electrodes are provided in a top-to-bottom manner.

The active matrix substrate of the present invention can be arranged such that said first pixel electrode is electrically connected to a drain electrode of the first transistor and said second pixel electrode is electrically connected to a drain electrode of the second pixel electrode, and the interconnection line is provided so as to overstride a scanning line.

The active matrix substrate of the present invention may be arranged such that a space between said first and second pixel electrodes serves as a structure for regulating liquid crystal orientation. This allows forming multiple orientation regions in one pixel in a liquid crystal display device employing the active matrix substrate of the present invention, thereby improving a viewing angle characteristic. Further, the arrangement can improve an aperture ratio because a region where no pixel electrode is provided can be used as an electrode slit for controlling orientation.

The active matrix substrate of the present invention can be arranged such that an inorganic interlayer insulating layer and an organic interlayer insulting layer having a thickness thicker than that of the inorganic interlayer insulating layer are provided between (i) drain electrodes of the first and second transistors and (ii) said first and second pixel electrodes.

The active matrix substrate of the present invention can be arranged such that the interconnection line and the plurality of capacitor electrodes are provided in the same layer (the same layer as that in which drain electrodes of the first and second transistors are provided).

The active matrix substrate of the present invention can be arranged such that said first pixel electrode is provided substantially in a V-shape, when viewed in the row direction.

The active matrix substrate of the present invention may be arranged such that respective first pixel electrodes provided in two pixel regions adjoining each other in the row direction, face directions opposite to each other. The arrangement equalizes respective connections of the two pixel regions, thereby allowing easily wiring. Further, in a case where an R pixel, a G pixel, and a B pixel are aligned in the row direction in a liquid crystal display device employing the active matrix substrate of the present invention, pixel electrodes in R pixels adjoining each other face directions opposite to each other. As a result, orientation-disturbed parts along the scanning signal line can be distributed over orientation regions, thereby improving display quality.

The active matrix substrate of the present invention can be arranged such that said first pixel electrode is electrically connected to a drain electrode of the first transistor and said second pixel electrode is electrically connected to a drain electrode of the second transistor, only one of the first and second transistors is arranged such that its drain electrode is electrically connected to the interconnection line provided so as to overstride a scanning signal line, and the other one of the first and second transistors is arranged such that its drain electrode is connected to a drain lead line or drain extension line provided so as to overstride a scanning signal line.

The arrangement allows (i) a parasitic capacitance value generated between the interconnection line electrically connected to one of the pixel electrodes and the scanning signal line and (ii) a parasitic capacitance value generated between the drain extension line electrically connected to the other one of the pixel electrodes and the scanning signal line, to be equal to each other. This allows uniformizing the influences on the first and second pixel electrodes due to the parasitic capacitances (for example, potential fluctuation caused due to diving charge when the transistor is turned off), thereby resulting in that display quality of a liquid crystal display device including the active matrix substrate of the present invention can be improved.

Further, the active matrix substrate of the present invention may be arranged such that said first pixel electrode is electrically connected to a drain electrode of the first transistor and said second pixel electrode is electrically connected to a drain electrode of the second transistor, only one of the first and second transistors is arranged such that its drain electrode is electrically connected to the interconnection line provided so as to overstride a scanning signal line, and an overlapping area where the drain electrode of the one of the first and second transistors and the scanning signal line overlap each other is smaller than an overlapping area where a drain electrode of the other one of the first and second transistors and the scanning signal line overlap each other.

The arrangement allows (i) parasitic capacitance values generated between a respective of the interconnection line and the drain electrode that are electrically connected to the one of the pixel electrodes, and the scanning signal line and (ii) a parasitic capacitance value generated between the drain electrode electrically connected to the other one of the pixel electrodes and the scanning signal line, to be equal to each other. This allows uniformizing the influences on the first and second pixel electrodes due to the parasitic capacitances (for example, potential fluctuation caused due to diving charge when the transistor is turned off), thereby resulting in that display quality of a liquid crystal display device including the active matrix substrate of the present invention can be improved.

Further, in a case where the interconnection line is provided so as to overstride a scanning signal line in the active matrix substrate of the present invention, at least a part of a portion where the interconnection line overstrides the scanning signal line may be arranged so as to serve as a drain electrode of the first or second transistor. The arrangement allows (i) a parasitic capacitance value generated between the interconnection line (a part of which serves as a drain electrode) that is electrically connected to one of the pixel electrodes and the scanning signal line and (ii) a parasitic capacitance value generated between a drain electrode electrically connected to the other one of the pixel electrodes and the scanning signal line, to be equal to each other. This allows uniformizing the influences on the first and second pixel electrodes due to the parasitic capacitances (for example, potential fluctuation caused due to diving charge when the transistor is turned off), thereby resulting in that display quality of a liquid crystal display device including the active matrix substrate of the present invention can be improved.

The active matrix substrate of the present invention can be arranged such that said first pixel electrode is connected to a drain electrode of the first transistor and said second pixel electrode is connected to a drain electrode of the second transistor, said first pixel electrode is provided so as not to overlap any lines connected to the drain electrode of the second transistor and said second pixel electrode is provided so as not to overlap any lines connected to the drain electrode of the first transistor.

In the arrangement, no parasitic capacitance is generated between the second pixel electrode and lines (the interconnection line and drain extension line) connected to the first pixel electrodes. As a result, potential fluctuations of these lines do not affect a potential of the second pixel electrode. Similarly, since no parasitic capacitance is generated between the first pixel electrode and lines (the interconnection line and drain lead line) connected to the second pixel electrode, potential fluctuations of these lines do not affect a potential of the first pixel electrode. Consequently, it is possible to improve display quality of a liquid crystal display device including the active matrix substrate of the present invention.

A concrete example of the arrangement may be such that: (i) one pixel region is provided between two adjacent retention capacitor lines such that a scanning signal line is provided between the pixel region and one of the two retention capacitor lines, (ii) in a part of the pixel region along the scanning signal line, a part of said second pixel electrode is positioned, but said first pixel electrode is not positioned, (iii) a non-pixel electrode forming region in which neither of said first and second pixel electrodes is formed, is provided in a part of the pixel region, adjacent to the scanning signal line, and (iv) said first pixel electrode is electrically connected to a drain electrode of the first transistor via the interconnection line or a drain lead line that crosses the non-pixel electrode forming region.

The active matrix substrate of the present invention can be also arranged such that, in a case where an inorganic interlayer insulating layer and an organic interlayer insulating layer having a film thickness thicker than that of the inorganic interlayer insulating layer are provided between (i) the drain electrodes of the first and second transistors and (ii) said first and second pixel electrodes, at least one of said first and second pixel electrodes overstrides a scanning signal line. The arrangement can increase respective areas of the pixel electrodes, thereby improving an aperture ratio. Further, it is possible to prevent luminance unevenness caused by unevenness in parasitic capacitances due to uneven line widths of lines connected to the drain electrodes.

The active matrix substrate of the present invention can be arranged such that the interconnection line and said first and second pixel electrodes are provided in the same layer. The arrangement allows the scanning signal line and the interconnection line to be apart from each other. This makes it possible to reduce a parasitic capacitance generated between the scanning signal line and the interconnection line.

Further, the active matrix substrate of the present invention can be arranged such that the scanning signal lines cut across respective pixel regions. As a result, the scanning signal line and a space region between retention capacitor lines can be effectively used.

Further, the active matrix substrate of the present invention may be arranged such that an insulating film (for example, an insulating film made of a spin-off glass (SOG) material) made of an organic material is provided between the scanning signal lines and respective interconnection lines provided so as to overstride the scanning signal lines, respectively. In the arrangement, a distance between the scanning signal line and the interconnection line becomes large. As a result, it is possible to reduce a parasitic capacitance between them (the scanning signal line and the interconnection line). Further, the arrangement has an effect to restrain an occurrence of a short circuit between them. Similarly, in a case where there are other lines (e.g., a drain lead line and a drain extension line) provided so as to overstride a scanning signal line, it is preferable that the insulating film (for example, an insulating film made of a spin-off glass (SOG) material) made of an organic material be provided between these other lines and the scanning signal line.

A liquid crystal panel of the present invention includes the aforementioned active matrix substrate. Further, a liquid crystal display unit of the present invention includes the liquid crystal panel and a driver. Furthermore, the liquid crystal display device of the present invention includes the liquid crystal display unit and an illumination device.

The liquid crystal display device can be arranged such that, when two adjacent retention capacitor lines are regarded as first and second retention capacitor lines, respectively, potentials of said first and second retention capacitor lines are controlled so that phases of potential waves of said first and second retention capacitor lines are shifted from each other by 180°.

The liquid crystal display device of the present invention can be arranged such that (i) a potential of said first retention capacitor line is controlled such that, after each transistor has been turned off, the potential has been increased and an increased value thereof is maintained in a frame until the each transistor is to be turned off in a subsequent frame, and a potential of said second retention capacitor line is controlled such that, after the each transistor has been turned off, the potential has been decreased and a decreased value thereof is maintained in the frame until the each transistor is to be turned off in the subsequent frame, or alternatively, (ii) a potential of said first retention capacitor line is controlled such that, after each transistor has been turned off, the potential has been decreased and a decreased value thereof is maintained in a frame until the each transistor is to be turned off in a subsequent frame, and a potential of said second retention capacitor line is controlled such that, after the each transistor has been turned off, the potential has been increased and an increased value thereof is maintained in the frame until the each transistor is to be turned off in the subsequent frame.

Further, the liquid crystal display device of the present invention can be arranged such that a retention capacitor line signal that shifts its level in response to a cyclic level shift is supplied to a corresponding retention capacitor line in such a manner that respective retention capacitor line signals supplied to two retention capacitor lines that form capacitances with two pixel electrodes provided in one pixel region are set to shift their levels such that first level shifts of said respective retention capacitor line signals, carried out after scanning of a scanning signal line to which the two pixel electrodes are connected, become opposite to each other.

A television receiver of the present invention includes the aforementioned liquid crystal display device and a tuner section for receiving television broadcasting.

As described above, the active matrix substrate of the present invention is arranged such that: one retention capacitor line is provided so as to correspond to a space between two pixel regions adjoining each other in a column direction; a plurality of capacitor electrodes are provided so as to overlap the retention capacitor line; (a) either of first and second pixel electrodes provided in one of the two pixel regions and (b) either of first and second pixel electrodes provided in the other one of the two pixel regions are electrically connected, respectively, to corresponding ones of the plurality of capacitor electrodes provided so as to overlap the retention capacitor line; a first pixel electrode provided in each pixel region is electrically connected to a corresponding one of the plurality of capacitor lines that is provided so as to overlap one of two adjacent retention capacitor lines and a second pixel electrode provided in the each pixel region is electrically connected to a corresponding one of the plurality of capacitor lines that is provided so as to overlap the other one of the two adjacent retention capacitor lines; and an interconnection line for electrically connecting the first or second pixel electrode to a corresponding one of the plurality of capacitor electrodes is provided. The arrangement can improve flexibility in the shapes and positions of individual pixel electrodes, while one retention capacitor line is shared by two pixel regions adjoining each other in a column direction.

Figure 22:
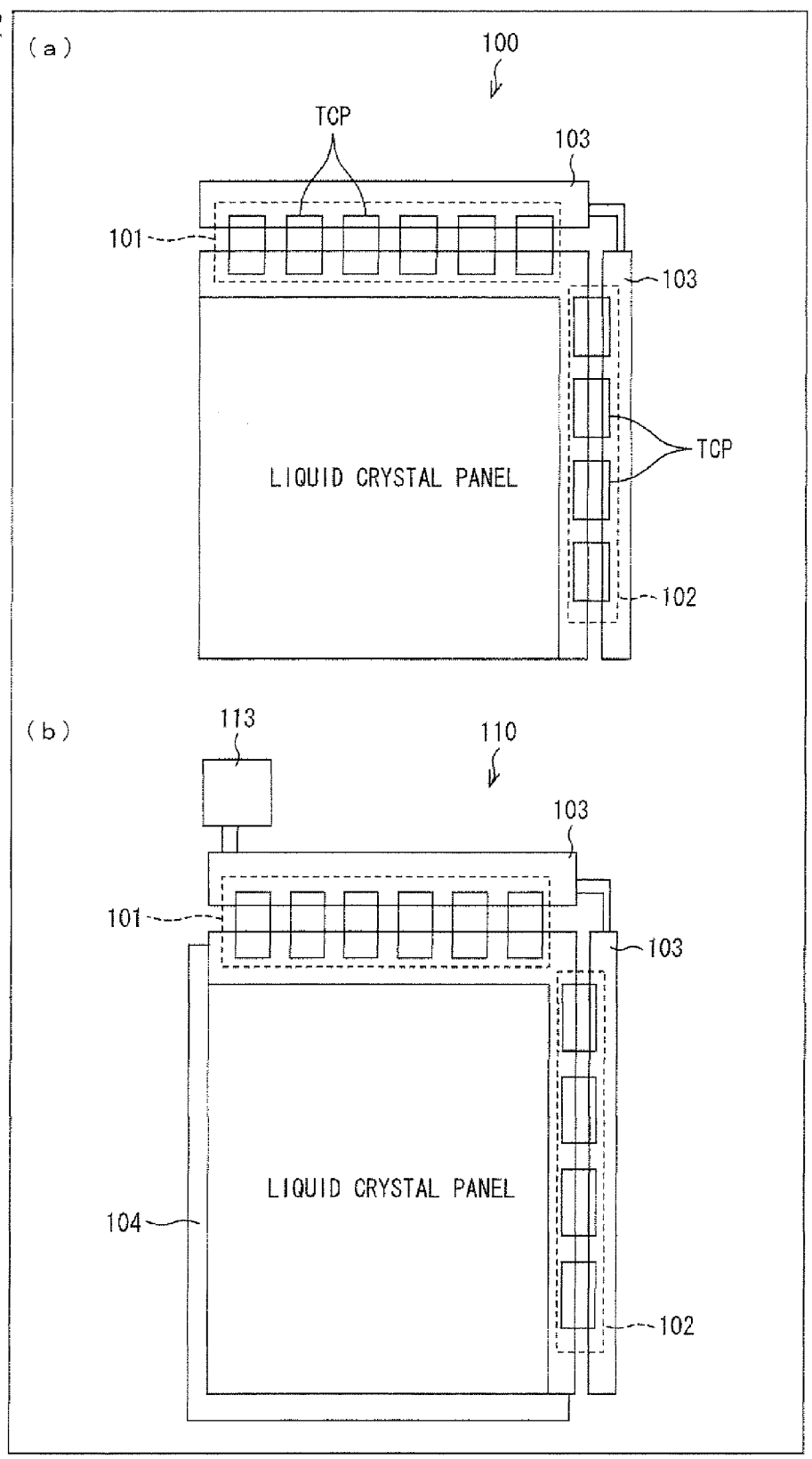

(a) of FIG. 22 schematically illustrates an arrangement of a liquid crystal display unit of the present invention, and (b) of FIG. 22 schematically illustrates an arrangement of the liquid crystal display device of the present invention.

Figure 23:
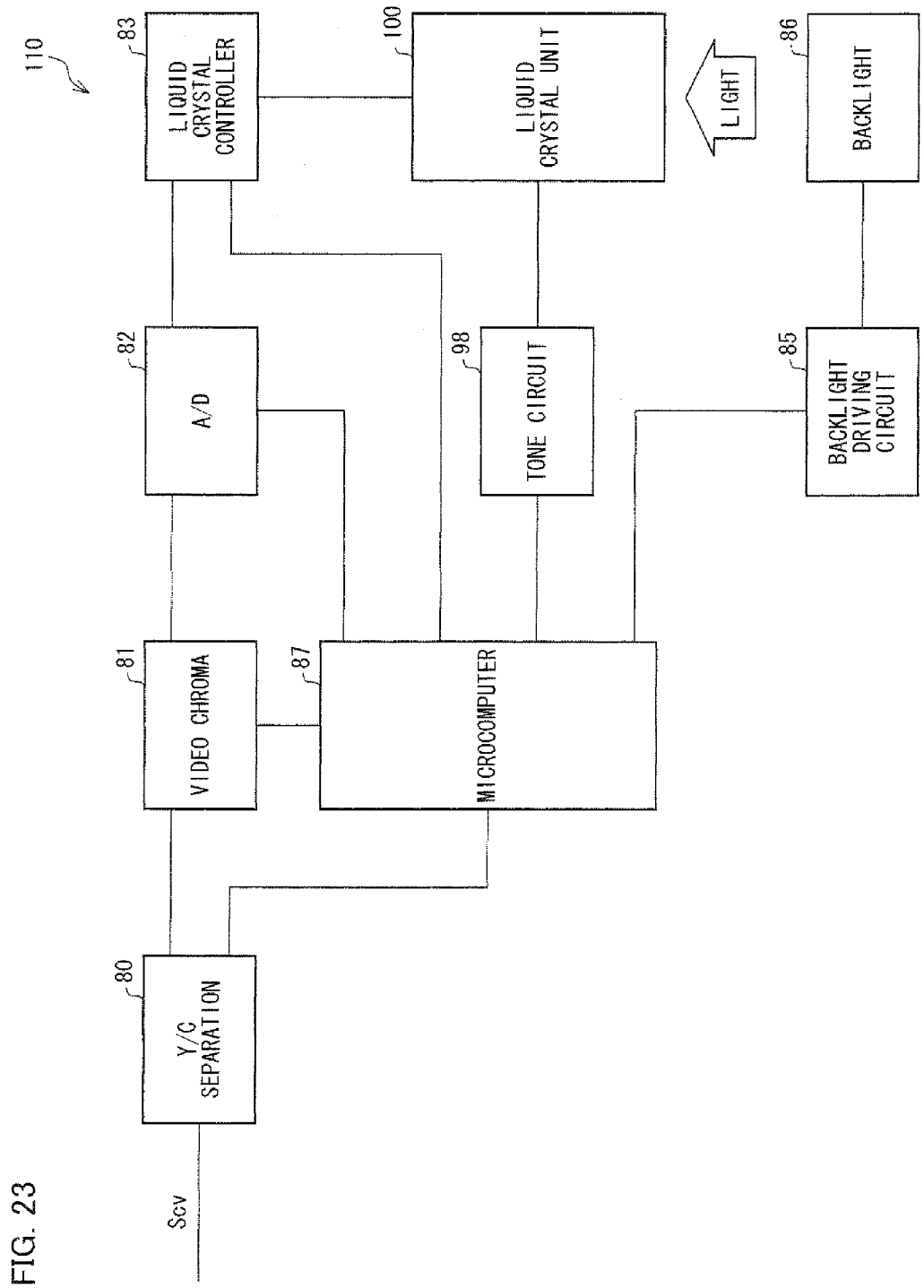

FIG. 23 is a block diagram showing functions of the liquid crystal display device of the present invention.

Figure 24:
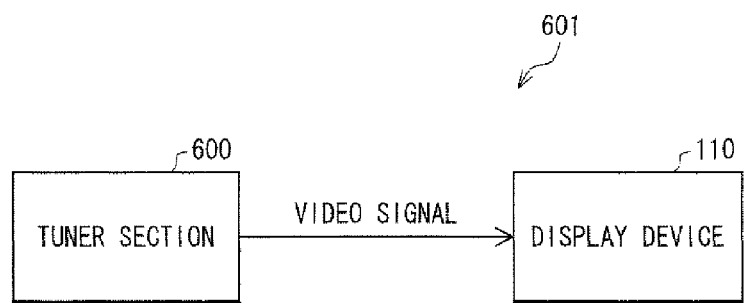

FIG. 24 is a block diagram showing functions of a television receiver of the present invention.

Figure 25:
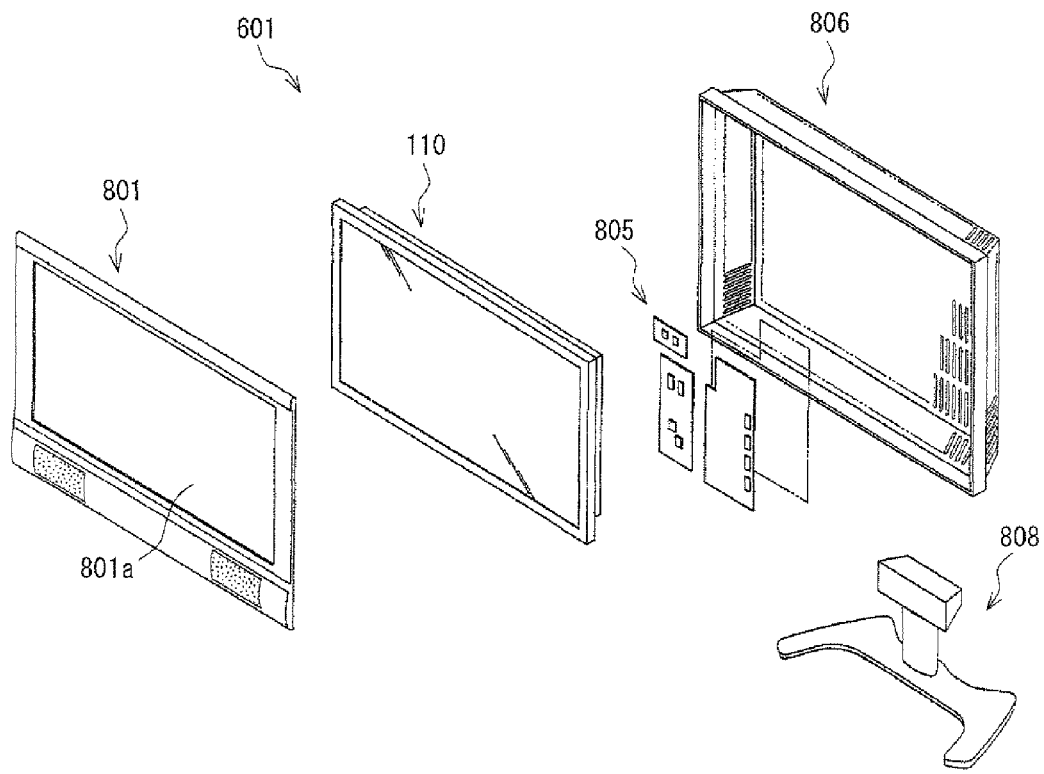

FIG. 25 is an exploded perspective view illustrating an arrangement of the television receiver of the present invention.

Figure 26:
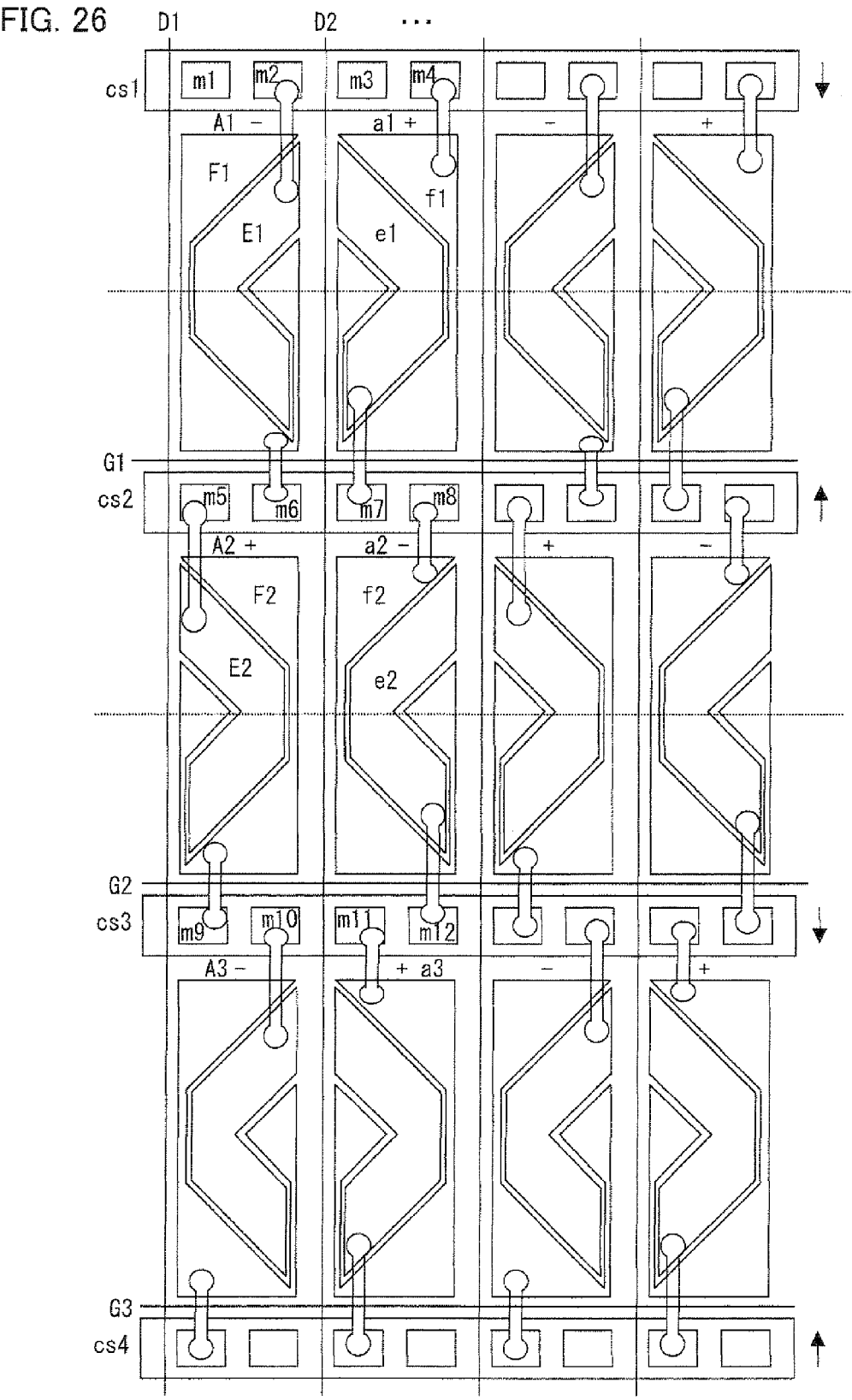

FIG. 26 is a plane view illustrating an arrangement of an active matrix substrate according to Embodiment 6 of the present invention.

Figure 27:
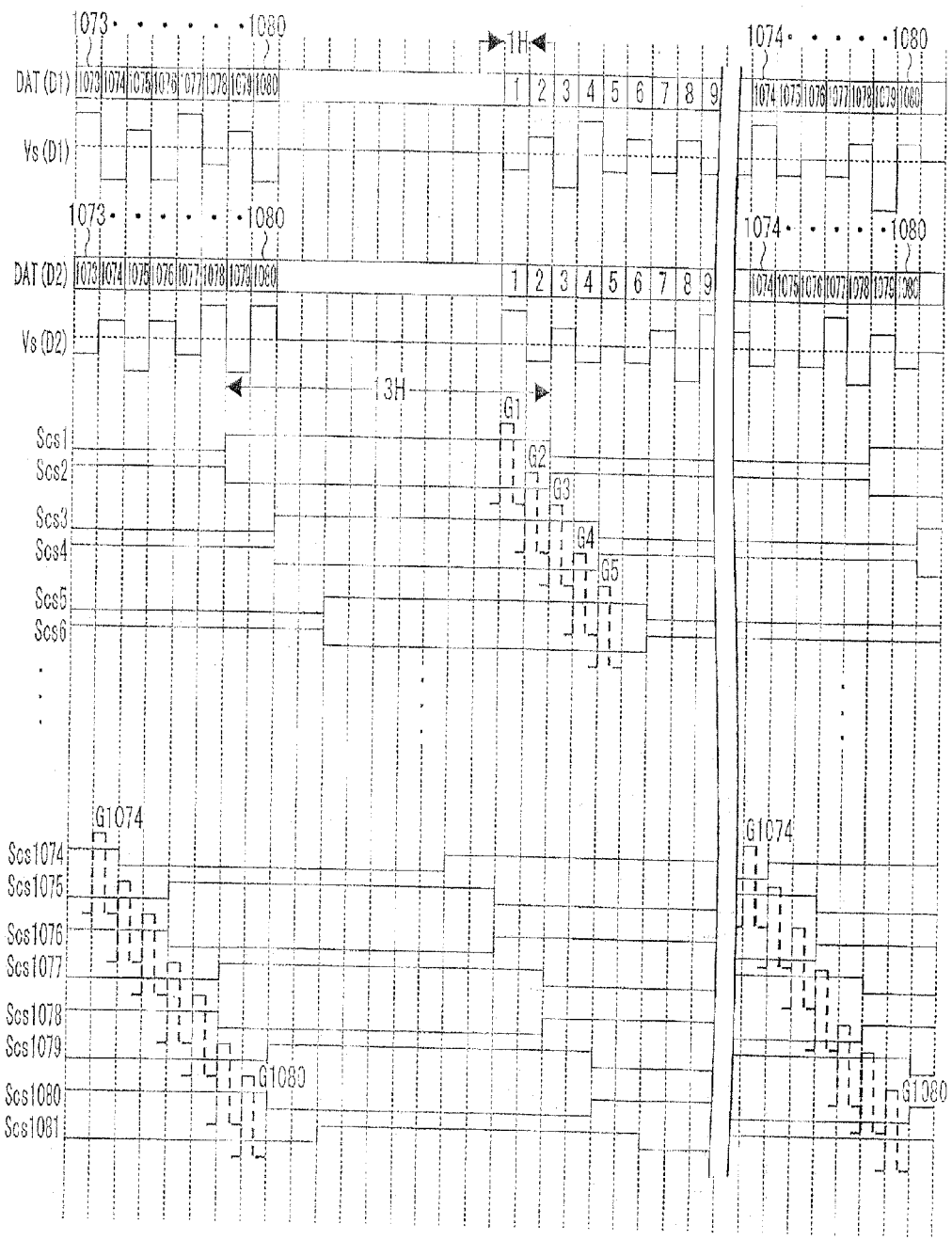

FIG. 27 is a timing diagram showing a driving method of a liquid crystal display device including the active matrix substrate of FIG. 26.

Figure 28:
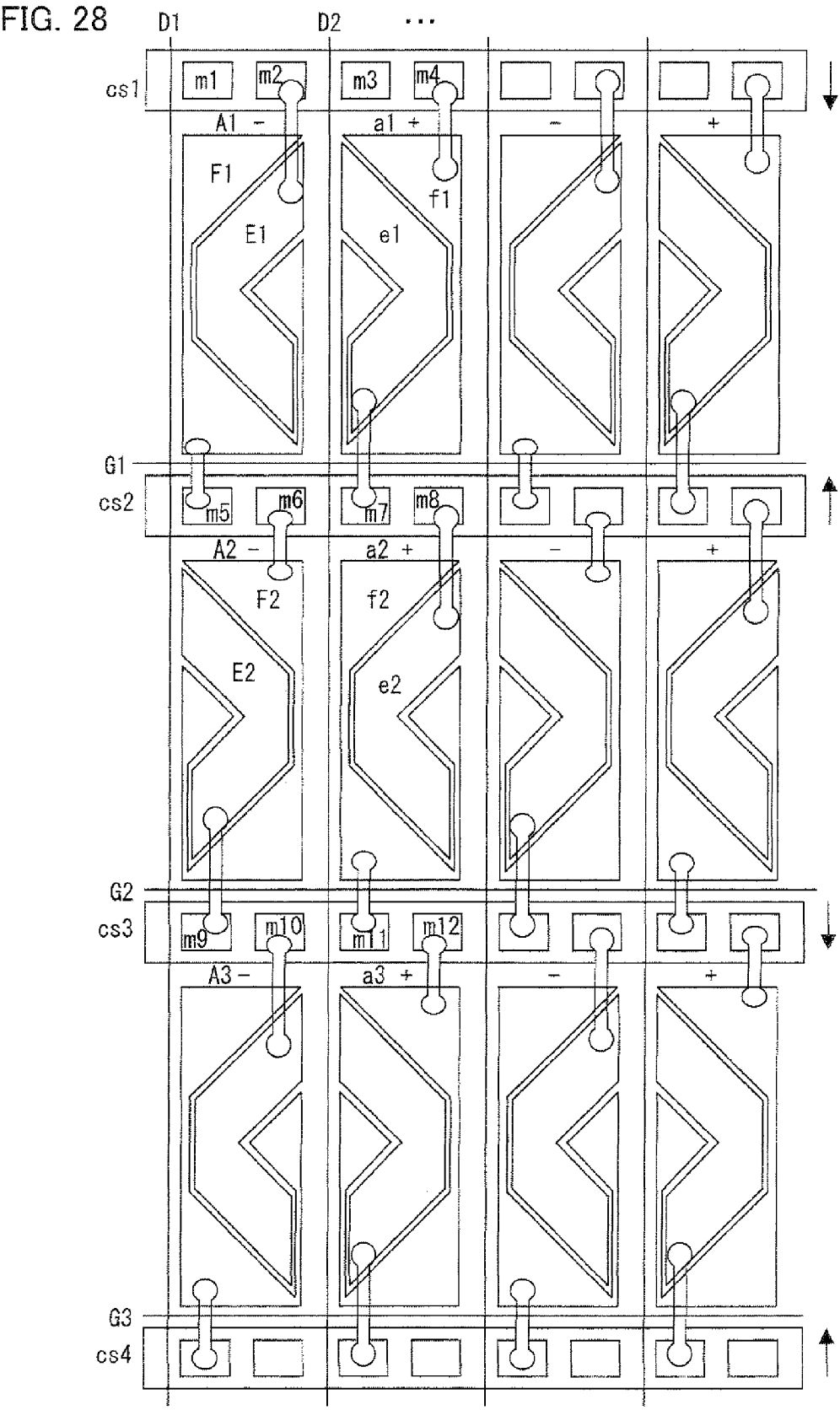

FIG. 28 is a plane view illustrating another arrangement of the active matrix substrate according to Embodiment 6 of the present invention.

Figure 29:
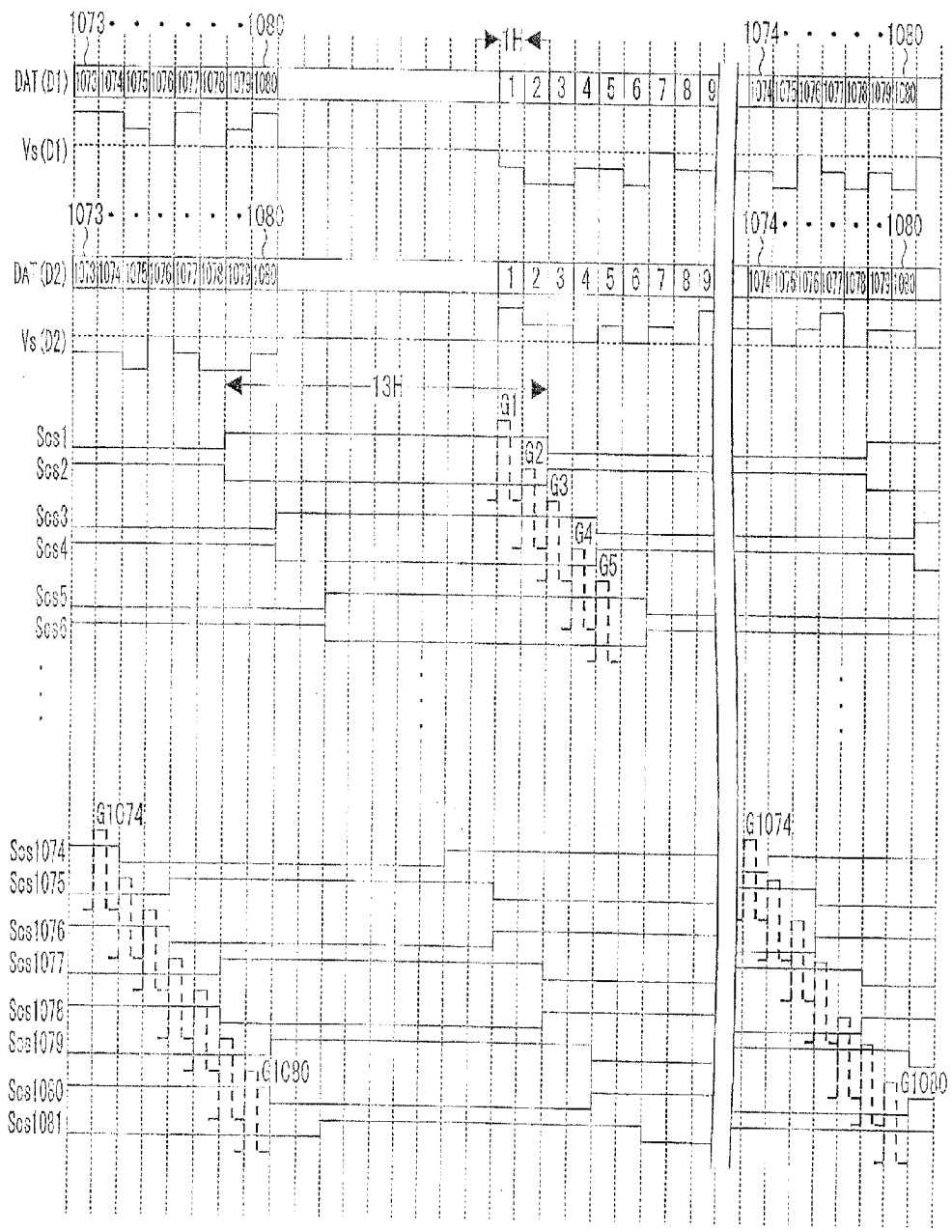

FIG. 29 is a timing diagram showing a driving method of the liquid crystal display device, of FIG. 28, including the active matrix substrate.

Figure 30:
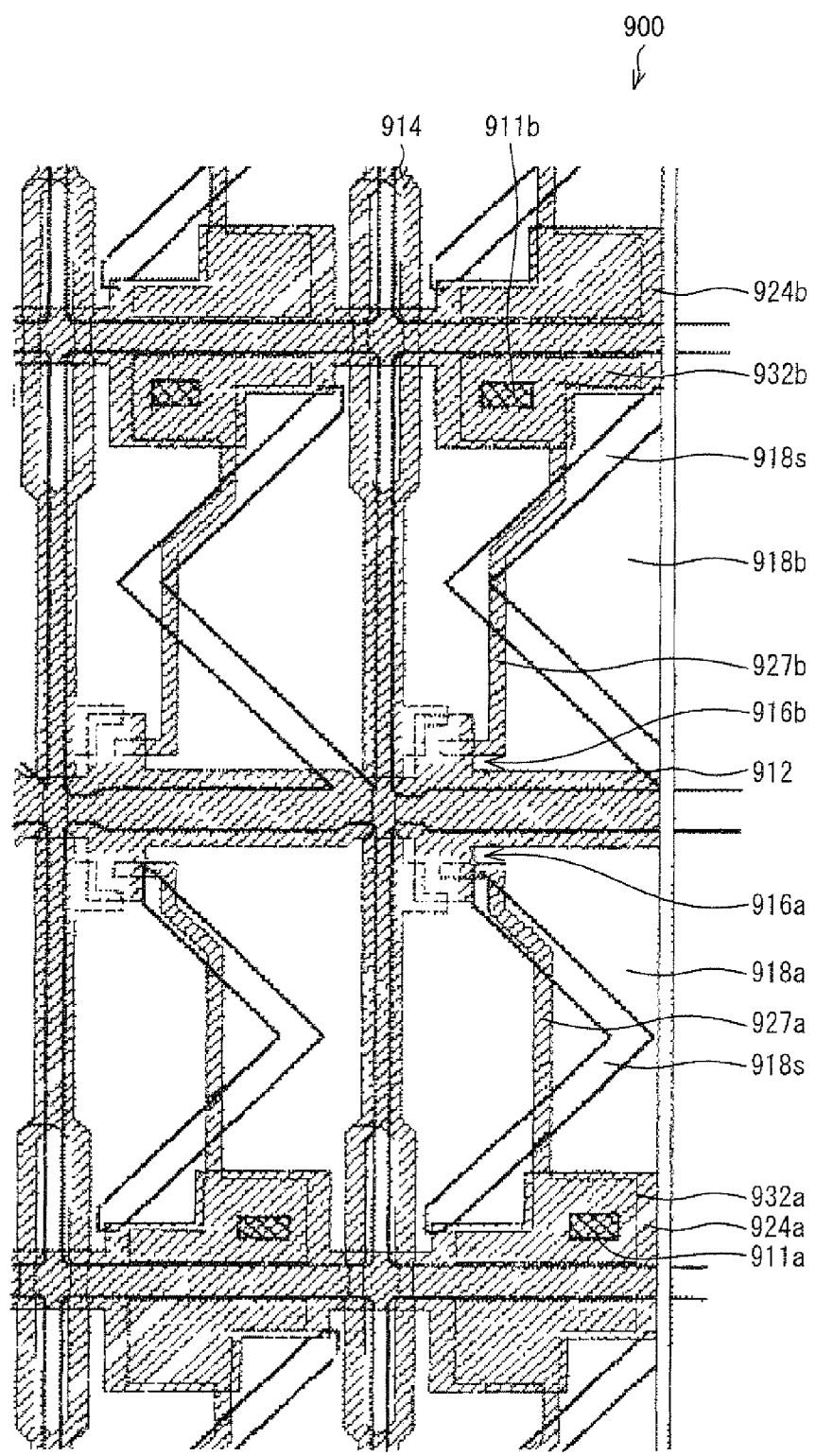

FIG. 30 is a plane view illustrating an arrangement of an active matrix substrate for use in a conventional liquid crystal panel.

Figure 31:
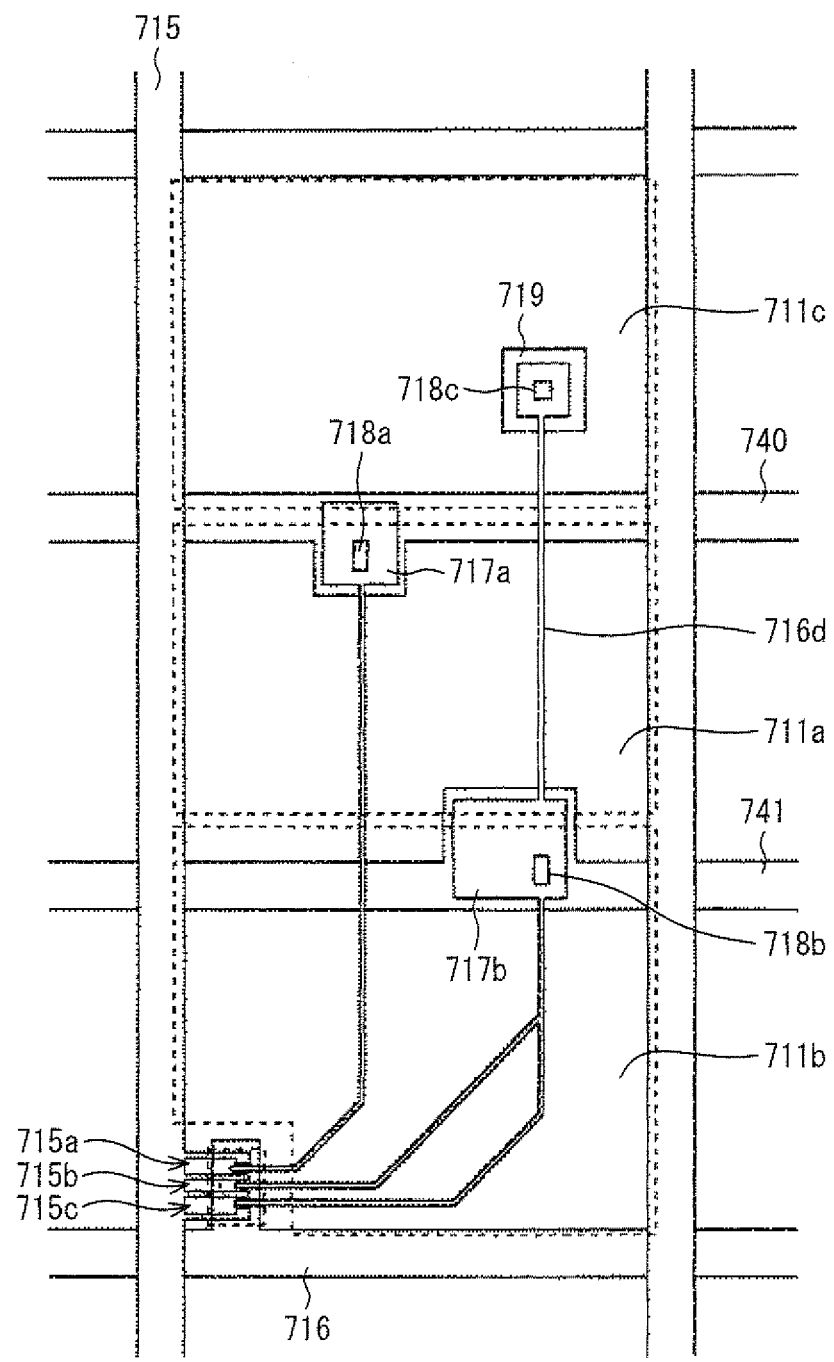

FIG. 31 schematically illustrates an arrangement of an active matrix substrate for use in a conventional liquid crystal panel.

REFERENCE SIGNS LIST $5\alpha, 5\beta, 5\gamma, 5\delta$: Pixel Region
A1, A1, a1, a2: Pixel Region 7b, 7A: Drain Extension Line
12a, 12A: First Transistor
12b, 12B: Second Transistor
15x, 15y: Data Signal Line
D1, D2: Data Signal Line
16x, 16y: Scanning Signal Line
G1 to G3: Scanning Signal Line
17a, 17A: First Pixel Electrode
E1, E2, e1, e2: First Pixel Electrode
17b, 17B: Second Pixel Electrode
F1, F2, f1, f2: Second Pixel Electrode
17w: Interconnection Line (Transparent Line)
17ib, 17iA: Interconnection Electrode
18x, 18y: Retention Capacitor Line
cs1 to cs4: Retention Capacitor Line
27xa, 27xb, 27xA, 27xB: Capacitor Electrode
27ya, 27yb, 27yA, 27yB: Capacitor Electrode
m1 to m12: Capacitor Electrode
27a, 27b, 27A, 27B: Drain Lead Line
27ia, 27iB: Interconnection Line
27w: Interconnection Line
55x, 55y: Pixel
100: Liquid Crystal Display Unit
110: Liquid Crystal Display Device
601: Television Receiver

DESCRIPTION OF EMBODIMENTS

Each embodiment of the present invention is described as below. Members having the same function in arrangements (drawings) have the same reference sign, and explanations about the members are omitted as appropriate.

Embodiment 1

Figure 1:
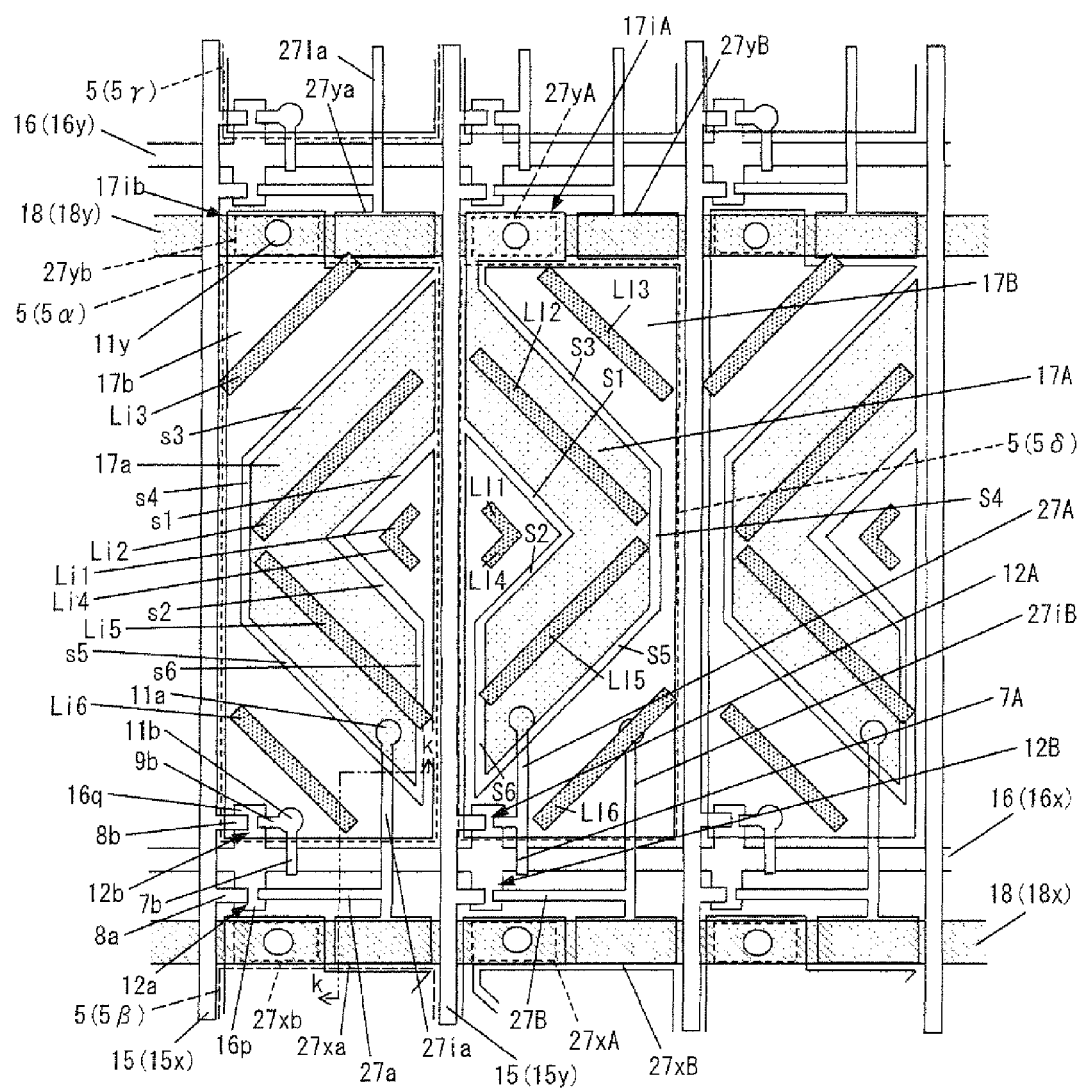
FIG. 1 is a plane view illustrating an arrangement of a liquid crystal panel according to Embodiment 1 of the present invention.

FIG. 1 is a plane view illustrating a liquid crystal panel according to Embodiment 1. Although the liquid crystal panel includes an active matrix substrate of the present invention, a liquid crystal layer, and a color filter substrate, the liquid crystal layer is not illustrated and the color filter substrate is only partially illustrated, in FIG. 1.

An active matrix substrate of the present embodiment includes, viewed in a plane manner: scanning signal lines 16 (16x, 16y) each extending in a row direction (right-left direction in the view); data signal lines 15 (15x, 15y) each extending in a column direction (upper-lower direction in the view); rectangular pixel regions 5 (5α, 5β, 5γ, 5δ) each marked off by the signal lines 15 and 16; first transistors (12a, 12A) and second transistors (12b, 12B) each provided near the vicinity of an intersection of the signal lines 15 and 16 so as to correspond to the pixel region 5; and retention capacitor lines 18 (18x, 18y) each provided so as to correspond to a space between two pixel regions adjoining each other in the column direction. Further, each pixel region includes a first pixel electrode corresponding to a bright pixel in display and a second pixel electrode corresponding to a dark pixel in display. In this way, a pixel includes the pixel region and a portion of a color filter substrate that corresponds to the pixel region. The scanning signal line 16 is provided between the pixel region 5 and the retention capacitor line 18, and the scanning signal line 16 includes an electrode section that juts in two directions in one pixel region.

For example, the pixel region 5α includes a first pixel electrode 17a and a second pixel electrode 17b. The first pixel electrode 17a is of a V shape, viewed in a row direction (right-left direction in the view), and a bending part in the V shape is positioned at a middle of the pixel region. The second pixel electrode 17b is provided so as to surround the first pixel electrode 17a via spaces s1 through s6. A set of the first pixel electrode 17a, the spaces s1 through s6, and the second pixel electrode 17b forms a rectangular shape. Further, the retention capacitor line 18x is provided so as to correspond a space between the two pixel regions 5α and 5β adjoining each other in the column direction. Similarly, the retention capacitor line 18y is provided so as to correspond a space between the two pixel regions 5α and 5γ adjoining each other in the column direction. The scanning signal line 16x is provided between the pixel region 5α and the retention capacitor line 18x, and the scanning signal line 16y is provided between the pixel region 5γ and the retention capacitor line 18y. Further, the scanning signal line 16x, for example, includes, in the pixel region 5α, electrode sections 16p and 16q that jut in two directions (upper and lower directions in the view) along the column direction.

Furthermore, the active matrix substrate of the present embodiment is configured such that capacitor electrodes 27xb and 27xa aligned in the row direction are provided above the retention capacitor line 18x, and capacitor electrodes 27yb and 27ya aligned in the row direction are provided above the retention capacitor line 18y. Further, (i) an interconnection line 27ia that connects the capacitor electrode 27xa to the first pixel electrode 17a and (ii) an interconnection electrode 17ib that connects the capacitor electrode 27yb to the second pixel electrode 17b are provided. More specifically, one end of the interconnection line 27ia extending in the row direction is connected to the capacitor electrode 27xa and the other end is connected to the first pixel electrode 17a via a contact hole 11a. Further, the interconnection electrode 17ib is provided above the capacitor electrode 27yb so as to be connected to part of the second pixel electrode 17b and is connected to the capacitor electrode 27yb through a contact hole 11y.

A source electrode 8a of the first transistor 12a is led out of the data signal line 15x. A drain electrode of the first transistor 12a is connected to the first pixel electrode 17a via (i) a drain lead line 27a extending in the row direction, (ii) the interconnection line 27ia connected to the drain lead line 27a, and (iii) the contact hole 11a. The electrode section 16p of the scanning signal line 16x doubles as a gate electrode of the first transistor 12a. On the other hand, a source electrode 8b of the second transistor 12b is led out of the data signal line 15x. A drain electrode 9b of the second transistor 12b is connected to the second pixel electrode 17b via a contact hole 11b and to a drain extension line 7b extending in the column direction. The electrode section 16q of the scanning signal line 16x doubles as a gate electrode of the second transistor 12b.

The active matrix substrate of the present invention is configured such that the data signal line 15, the drain electrodes of the first and second transistors 12a and 12b, the capacitor electrodes 27xb, 27xa, 27yb, and 27ya, the drain lead line 27a, the drain extension line 7b, and the interconnection line 27ia are provided in the same layer (by the same process). The first and second pixel electrodes 17a and 17b, and the interconnection electrode 17ib are provided in the same layer (by the same process). Further, as has been described above, since the scanning signal line 16x is provided between the pixel region 5α and the retention capacitor line 18x, the interconnection line 27ia extending in the column direction is provided so as to overstride the scanning signal line 16x, and the drain extension line 7b extending in the column direction is also provided so as to overstride the scanning signal line 16x.

Moreover, the capacitor electrode 27xb provided above the retention capacitor line 18x is connected to a second pixel electrode provided in the pixel region 5β, via an interconnection electrode and a contact hole. The capacitor electrode

27ya provided above the capacitor electrode 18y is connected to a first pixel electrode provided in the pixel region 5γ, via an interconnection line 27Ia and a contact hole (not shown). That is, the retention capacitor line 18x is shared by the pixel regions 5α and 5β, and the retention capacitor line 18y is shared by the pixel regions 5α and 5γ.

Further, the liquid crystal panel of the present invention is configured such that a portion of the color filter substrate that overlaps the pixel region 5α is provided with: ribs Li2 and Li5 overlapping the first pixel electrode 17a; and ribs Li1, Li3, Li4, and Li6 overlapping the second pixel electrode 17b. The ribs Li1 through Li3 and the spaces s1 and s3 are parallel to one another, and form an angle of 45° with respect to the scanning signal line 16. When viewed in a plane manner, the space s3 is positioned between the ribs Li2 and Li3, and the rib Li2 is positioned between the spaces s1 and s3. Further, the ribs Li4 through Li6 and the spaces s2 and s5 are parallel to one another, and form an angle of 135° with respect to the scanning signal line 16. When viewed in a plane manner, the space s5 is positioned between the ribs Li5 and Li6, and the rib Li5 is positioned between the spaces s2 and s5.

Figure 3:
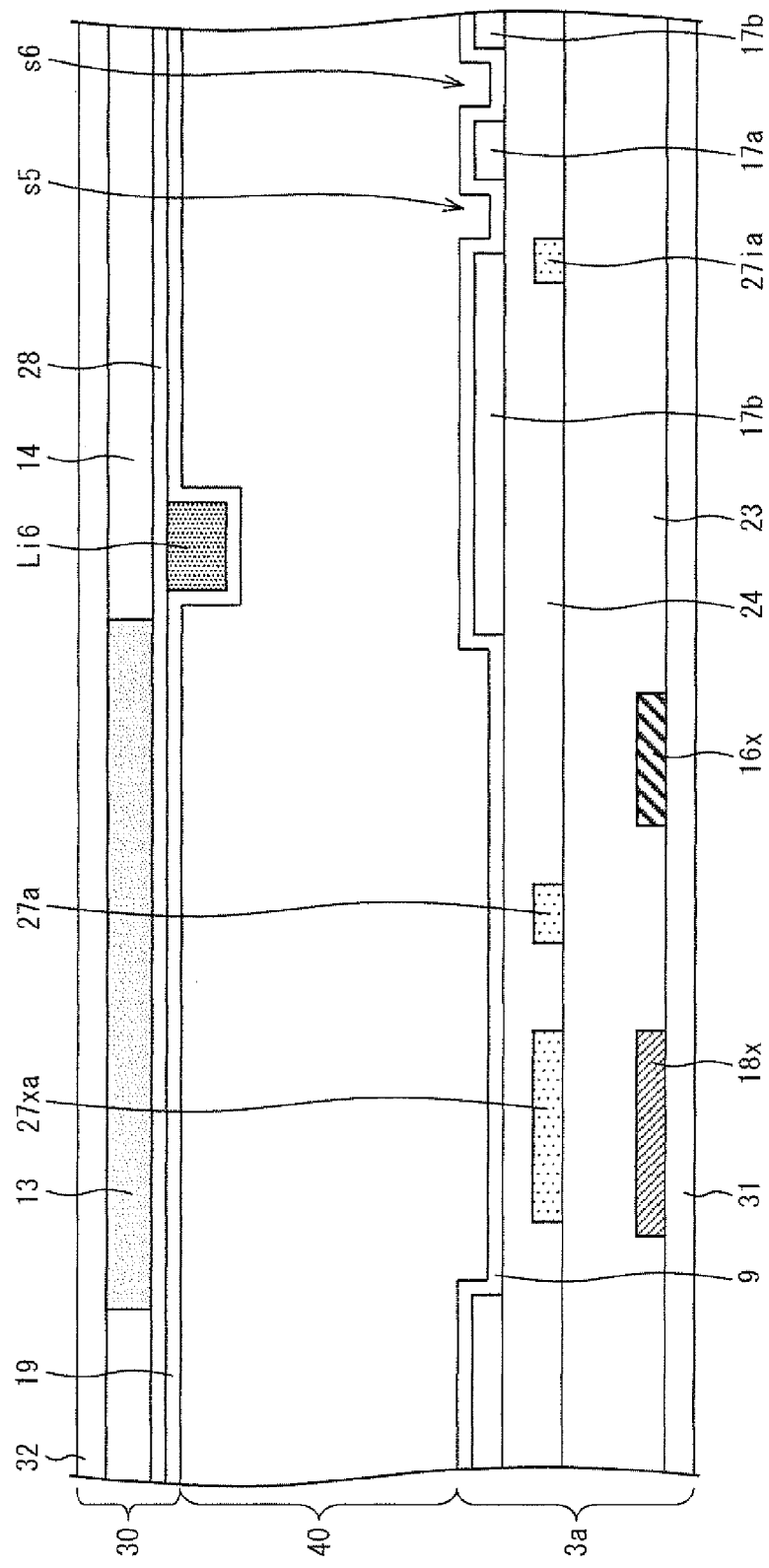
FIG. 3 is a cross sectional view illustrating the liquid crystal panel, viewed along arrows k-k in FIG. 1.

FIG. 3 is a cross sectional view of the liquid crystal panel of the present embodiment, viewed along arrows k-k in FIG. 1. As illustrated in FIG. 3, the liquid crystal panel of the present embodiment includes: the active matrix substrate 3a of the present embodiment; a color filter substrate 30; and a liquid crystal layer 40. In the active matrix substrate 3a, a scanning signal line 16 (16x), a retention capacitor line 18 (18x), and the like are provided on a substrate 31. A gate insulating film 23 is provided thereon, and a capacitor electrode 27xa, a drain lead line 27a, an interconnection line 27ia, and the like are provided on the gate insulating film 23. Further, an interlayer insulating film 24 is provided thereon, and first and second pixel electrodes 17a and 17b, and the like are provided on the interlayer insulating film 24. Further, an orientation film 9 is provided so as to cover the first and second pixel electrodes 17a and 17b. The color filter 30 faces the active matrix substrate 3a via the liquid crystal layer 40 provided therebetween. The color filter substrate 30 includes: a color filter 14 provided so as to face the first and second pixel electrodes 17a and 17b; and a black matrix 13 provided so as to fill spaces between the color filter 14, each of the color filter 14 and the black matrix 13 being provided on a substrate 32. A counter electrode 28 is provided on the color filter 14 and the black matrix 13, and a rib (Li6) is provided on part of the counter electrode 28. Further, an orientation film 19 is provided so as to cover the counter electrode 28 and the rib.

The pixel region 5δ adjacent to the pixel region 5α in the row direction is provided with a first pixel electrode 17A and a second pixel electrode 17B. The first pixel electrode 17A is of a V shape, viewed in the row direction (in a right-to-left direction, in the figure), and a bending part in the V shape is positioned at a middle of the pixel region. The second pixel electrode 17B is provided so as to surround the first pixel electrode 17A via spaces S1 through S6. A set of the first electrode 17A, the spaces S1 through S6, and the second pixel electrode 17B forms a rectangular shape.

Further, above the retention capacitor line 18x, capacitor electrodes 27xA and 27xB aligned in the row direction are provided between two adjacent data signal lines. Above the retention capacitor line 18y, capacitor electrodes 27yA and 27yB aligned in the row direction are provided between two adjacent data signal lines. Moreover, an interconnection line 27iB that connects the capacitor electrode 27xB to the second pixel electrode 17B and an interconnection electrode 17iA that connects the capacitor electrode 27yA to the first pixel electrode 17A are provided. More specifically, one end of the interconnection line 27iB extending in the column direction is connected to the capacitor electrode 27xB, and the other end of the interconnection line 27iB is connected to the second pixel electrode 17B via a contact hole. The interconnection electrode 17iA is provided above the capacitor electrode 27yA in such a manner as to be connected to a part of the second pixel electrode 17A, and is connected to the capacitor electrode 27yA via a contact hole. The scanning signal line 16x is provided between the pixel region 5δ and the retention capacitor line 18x.

Here, a source electrode of a second transistor 12B is led out of the data signal line 15y. A drain electrode of the second transistor 12B is connected to the second pixel electrode 17B via (i) a drain lead line 27B extending in the row direction, (ii) the interconnection line 27iB connected to the drain lead line 27B, and (iii) a contact hole. An electrode section of the scanning signal line 16x doubles as a gate electrode of the second transistor 12B. A source electrode of a first transistor 12A is led out of the data signal line 15y. A drain electrode of the first transistor 12A is connected to the first pixel electrode 17A via a drain lead line 27A and a contact hole and is also connected to a drain extension line 7A extending in the column direction. An electrode section of the scanning signal line 16x doubles as a gate electrode of the first transistor 12A.

The data signal line 15y, the drain electrodes of the first and second transistors 12A and 12B, the capacitor electrodes 27xA, 27xB, 27yA, and 27yB, the drain lead line 27A, the drain extension line 7A, and the interconnection line 27iB are provided in the same layer (in the same process). The first and second pixel electrodes 17A and 17B, and the interconnection electrode 17iA are provided in the same layer (in the same process). As has been described above, since the scanning signal line 16x is provided between the pixel region 5δ and the retention capacitor line 18x, the interconnection line 27iB extending in the column direction is provided so as to overstride the scanning signal line 16x, and the drain extension line 7A extending in the column direction is also provided so as to overstride the scanning signal line 16x.

Furthermore, in the liquid crystal panel of the present embodiment, a portion of the color filter substrate that overlaps the pixel electrode 5δ is provided with: ribs LI2 and LI5 overlapping the first pixel electrode 17A; and ribs LI1, LI3, LI4, and LI6 overlapping the second pixel electrode 17B. The ribs LI1 through LI3 and the spaces S1 and S3 are parallel to one another, and form an angle of 45° with respect to the scanning signal line 16. When viewed in a plane manner, the space S3 is positioned between the ribs LI2 and LI3, and the rib LI2 is positioned between the spaces S1 and S3. Meanwhile, the ribs LI4 through LI6 and the spaces S2 and S5 are parallel to one another, and form an angle of 135° with respect to the scanning signal line 16. When viewed in a plane manner, the space S5 is positioned between the ribs LI5 and LI6, and the rib LI5 is positioned between the spaces S2 and S5.

In a liquid crystal display device using the liquid crystal panel of the present embodiment, the same signal potential is supplied from the data signal line 15 to the first pixel electrode 17a and the second pixel electrode 17b. However, by individually controlling potentials of the first and second retention capacitor lines 18x and 18y so as to form first and second retention capacitances, respectively, it is possible to make potentials of the first pixel electrode 17a and the second pixel electrode 17b different, via the first and second retention capacitances.

For example, assume a case where, while the data signal line 15 is driven in a dot-inversion drive manner, (i) a positive signal potential is supplied to the pixel region 5α (the transistors 12a and 12b thereof), (ii) a negative signal potential is supplied to the pixel region 5β, and (iii) a negative signal potential is supplied to the pixel region 5δ (the transistors 12A and 12B). Further, in this case, after the transistors 12a, 12b, 12A and 12B are turned off, a potential of the retention capacitor line 18x rapidly is increased and a potential of the retention capacitor line 18y is rapidly decreased. This allows the following arrangement.

That is, in regard to the pixel region 5α, since the potential of the retention capacitor line 18x is rapidly increased after a plus potential has been once written in the first pixel electrode 17a via the data signal line 15x, the potential of the first pixel electrode 17a is also increased due to a retention capacitance formed between the capacitor electrode 27xa and the retention capacitor line 18x, thereby resulting in that a bright sub pixel including the first pixel electrode 17a can be constructed. On the other hand, since the potential of the retention capacitor line 18y is rapidly deceased after the positive potential has been once written in the second pixel electrode 17b via the data signal line 15x, the potential of the second pixel electrode 17b is also decreased due to a retention capacitance formed between the capacitor electrode 27yb and the retention capacitor line 18y, thereby resulting in that a dark sub pixel including the second pixel electrode 17b can be constructed. Further, in regard to the pixel region 5δ, since the potential of the retention capacitor line 18y is rapidly decreased after a minus potential has been once written in the first pixel electrode 17A via the data signal line 15y, the potential of the first pixel electrode 17A is also decreased due to a retention capacitance formed between the capacitor electrode 27yA and the retention capacitor line 18y, thereby resulting in that a bright sub pixel including the first pixel electrode 17A can be constructed. On the other hand, since the potential of the retention capacitor line 18x is rapidly increased after the negative potential has been once written in the second pixel electrode 17B via the data signal line 15y, the potential of the second pixel electrode 17B is also increased due to a retention capacitance formed between the capacitor electrode 27XB and the retention capacitor line 18x, thereby resulting in that a dark sub pixel including the second pixel electrode 17B can be constructed. Further, in regard to the pixel region 5β, since the potential of the retention capacitor line 18x is rapidly increased after a negative potential has been once written in a second pixel electrode of the pixel region 5β via the data signal line 15x, the potential of the second pixel electrode is also increased due to a retention capacitance formed between the capacitor electrode 27xb and the retention capacitor line 18x, thereby resulting in that a dark sub pixel including the second pixel electrode of the pixel region 5β can be constructed.

As a result, in the liquid crystal display device including the liquid crystal panel of the present embodiment, one pixel is constituted by a sub-pixel with high luminance (bright sub-pixel) and a sub pixel with low luminance (dark sub-pixel). This allows halftone expression due to area coverage modulation. As a result, a viewing angle dependence of a γ-characteristic (for example, excess brightness in screen) can be improved.

The liquid crystal panel of the present invention is configured such that one retention capacitor line (for example, 18x) is provided so as to correspond a space between two pixel regions (for example, 5α and 5β) adjoining each other in the column direction, a plurality of capacitor electrodes (for example, 27xb and 27xa) aligned in the row direction are provided above the retention capacitor line (for example, 18x), and a plurality of capacitor electrodes (for example, 27yb and 27ya) aligned in the row direction are provided on the retention capacitor line (for example, 18y), and the interconnection line (for example, 27ia) that connects the capacitor electrode (for example 27xa) to the first pixel electrode (for example, 17a), and the interconnection electrode (for example, 17ib) that connects the capacitor electrode (for example, 27yb) to the second pixel electrode (for example, 17b) are provided. This allows an arrangement where one retention capacitor line (for example, 18x) is shared by two pixel regions (for example, 5α and 5β), a part of a second pixel electrode (for example, 17b) is positioned around the first pixel electrode (for example, 17a). That is, in comparison with the conventional technique illustrated in FIG. 30, it is possible to reduce roughness caused due to the shapes and positions of individual pixel electrodes, without increasing the number of retention capacitor lines.

Further, such an arrangement in which one retention capacitor line is shared by two pixel regions adjoining each other in a row direction, generally requires that (a) a pixel electrode (second pixel electrode) constituting a dark sub pixel in a first pixel region and (b) a pixel electrode (first pixel electrode) constituting a bright sub pixel in a second pixel region be connected to corresponding capacitor electrodes, respectively, the corresponding capacitor electrodes overlapping the same retention capacitor line, while (c) a pixel electrode (first pixel electrode) constituting a bright sub pixel in the first pixel region and (d) a pixel electrode (second pixel electrode) constituting a dark sub pixel in the second pixel region be connected to corresponding capacitor electrodes, respectively, the corresponding capacitor electrodes overlapping the same retention capacitor line. This is because, normally in a liquid crystal display device, signal potentials having different polarities are supplied to such pixels adjacent to each other in the row direction, respectively.

In the liquid crystal panel of the present embodiment, in such two pixel regions (for example, 5α and 5β) adjoining each other in the row direction, first pixel electrodes (for example, first pixel electrodes 17a and 17A) thereof are provided in a substantially axisymmetrical manner with respect to an axis of a data signal line (for example, 15y) provided between the two pixel regions. Meanwhile, second pixel electrodes (for example, second pixel electrodes 17b and 17B) of the two pixel regions are provided in a substantially axisymmetrical manner with respect to an axis of the data signal line (for example, 15y) provided between the two pixel regions. This arrangement satisfies the requirements and further allows wiring lines to be equivalently provided in the two pixel regions.

Moreover, in the liquid crystal panel of the present embodiment, in the pixel region 5α, for example, the interconnection line 27ia connected to the drain electrode of the first transistor 12a is provided so as to overstride the scanning signal line 16. Similarly, the drain extension line 7b connected to the drain electrode 9b of the transistor 12b is provided so as to overstride the scanning signal line 16. The arrangement allows (a) a parasitic capacitance generated between the interconnection line 27ia electrically connected to the first pixel electrode 17a and the scanning signal line 16 and (b) a parasitic capacitance generated between the drain extension line 7b electrically connected to the second pixel electrode 17b and the scanning signal line 16, to be equal to each other. This allows uniformizing the influences on the first and second pixel electrodes 17a and 17b due to the parasitic capacitances (for example, potential fluctuation caused due to diving charge when the transistor is turned off). This results in that display quality of the liquid crystal display device including the liquid crystal panel of the present embodiment can be improved. Further, as illustrated in FIG. 1, it is desirable that a drain extension line (for example, 7b) have a margin (a part slightly overlying the scanning signal line 16x) so that a parasitic capacitance is still generated between the drain extension line and the scanning signal line even in case of displacement.

Figure 2:
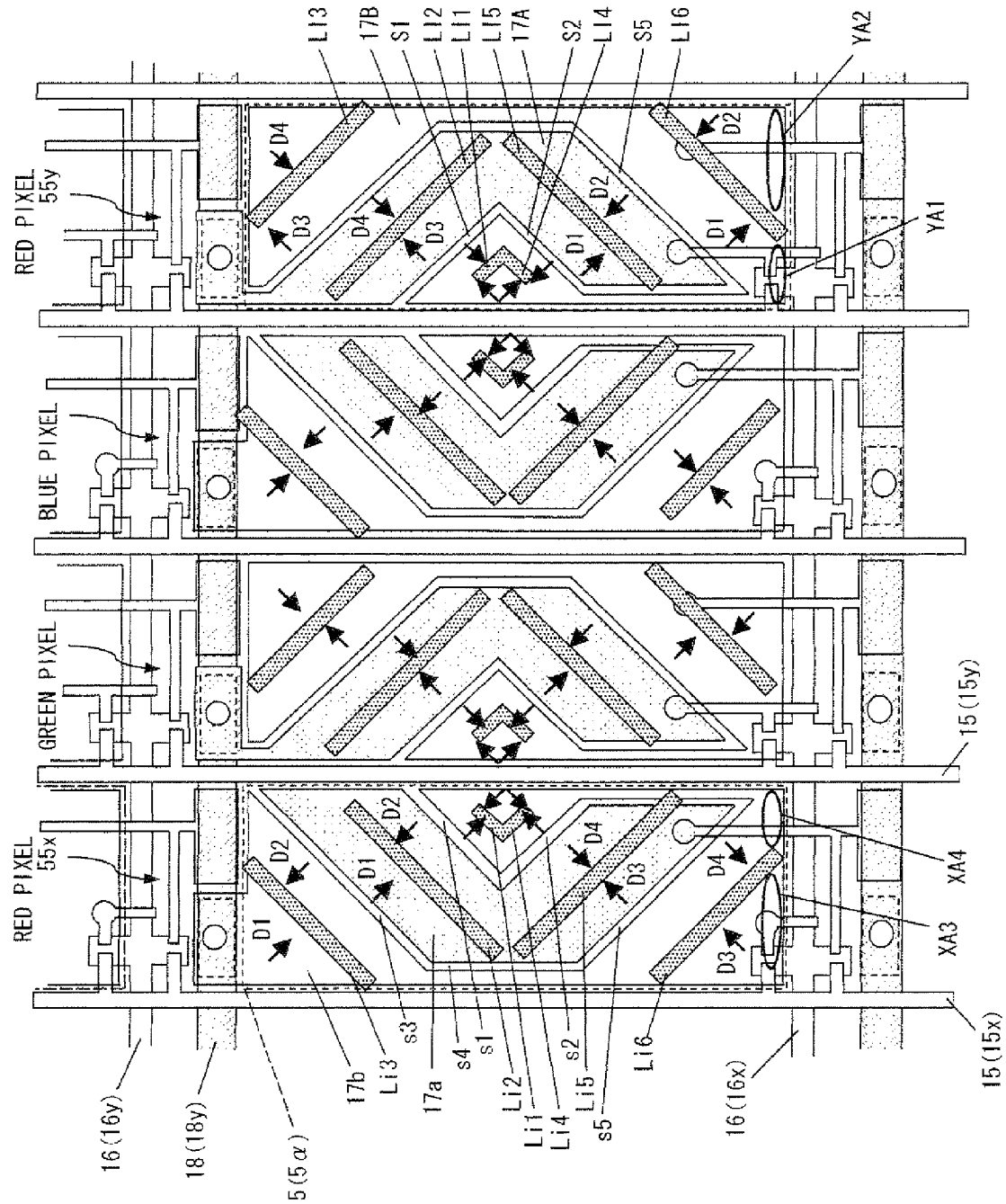
FIG. 2 is a plane view schematically illustrating orientation in a liquid crystal display device including the liquid crystal panel of FIG. 1.

Furthermore, the liquid crystal panel of the present invention is an MVA structure in which spaces (s1-s4) provided between the first and second pixel electrodes 17a and 17b, serving as orientation regulation structures, and ribs (Li1-Li6) serving as orientation regulation structures are provided as described on the pixel region 5α, for example. Here, FIG. 2 illustrates orientation regions (domains D1 through D4) formed in each of four pixels (a red pixel 55x, a green pixel, a blue pixel, a red pixel 55y) aligned side by side in a row direction in the liquid crystal display device including the liquid crystal panel of the present embodiment. As illustrated in FIG. 2, in the liquid crystal display device of the present embodiment, while a halftone display is being carried out, four orientations shown by arrows in the figure are formed, thereby realizing a good viewing angle property. In each of the red pixel 55x and the blue pixel, shapes and positions of first and second pixel electrodes, spaces therebetween, and ribs are the same as those in the pixel region 5α. Meanwhile, in each of the green pixel and the red pixel 55y, shapes and positions of first and second pixel electrodes, spaces therebetween, and ribs are the same as those in the pixel region 5δ.

It has been known that such an arrangement as illustrated in FIG. 1 causes disturbance in orientation (liquid crystal orientation) near the vicinity of the scanning signal line 16 (a part along the scanning signal line 16). However, in the liquid crystal display device of the present embodiment, for example, in two adjacent red pixels 55x and 55y, orientation-disturbed parts in orientation regions D1 through D4 in a dark sub pixel in the red pixel 55x are 0 (no disturbance), 0 (no disturbance), XA3, and XA4, respectively. Meanwhile, orientation-disturbed parts in orientation regions D1 through D4 in a dark sub pixel in the red pixel 55y exhibit YA1, YA2, 0 (no disturbance), and 0 (no disturbance), respectively. That is, when the two red pixels 55x and 55y are considered as a single unit, orientation-disturbed parts in the orientation regions D1 through D4 included in the two dark sub pixels are XA1, XA2, YA3, and YA4, respectively. As such, in the liquid crystal panel of the present embodiment, it is shown that orientation-disturbed parts, occurring in the two dark sub pixels included in the two red pixels 55x and 55y adjoining each other in the row direction, are distributed over the orientation regions D1 through D4. The same can be also said in regard to the green pixel and the blue pixel.

Figure 4:
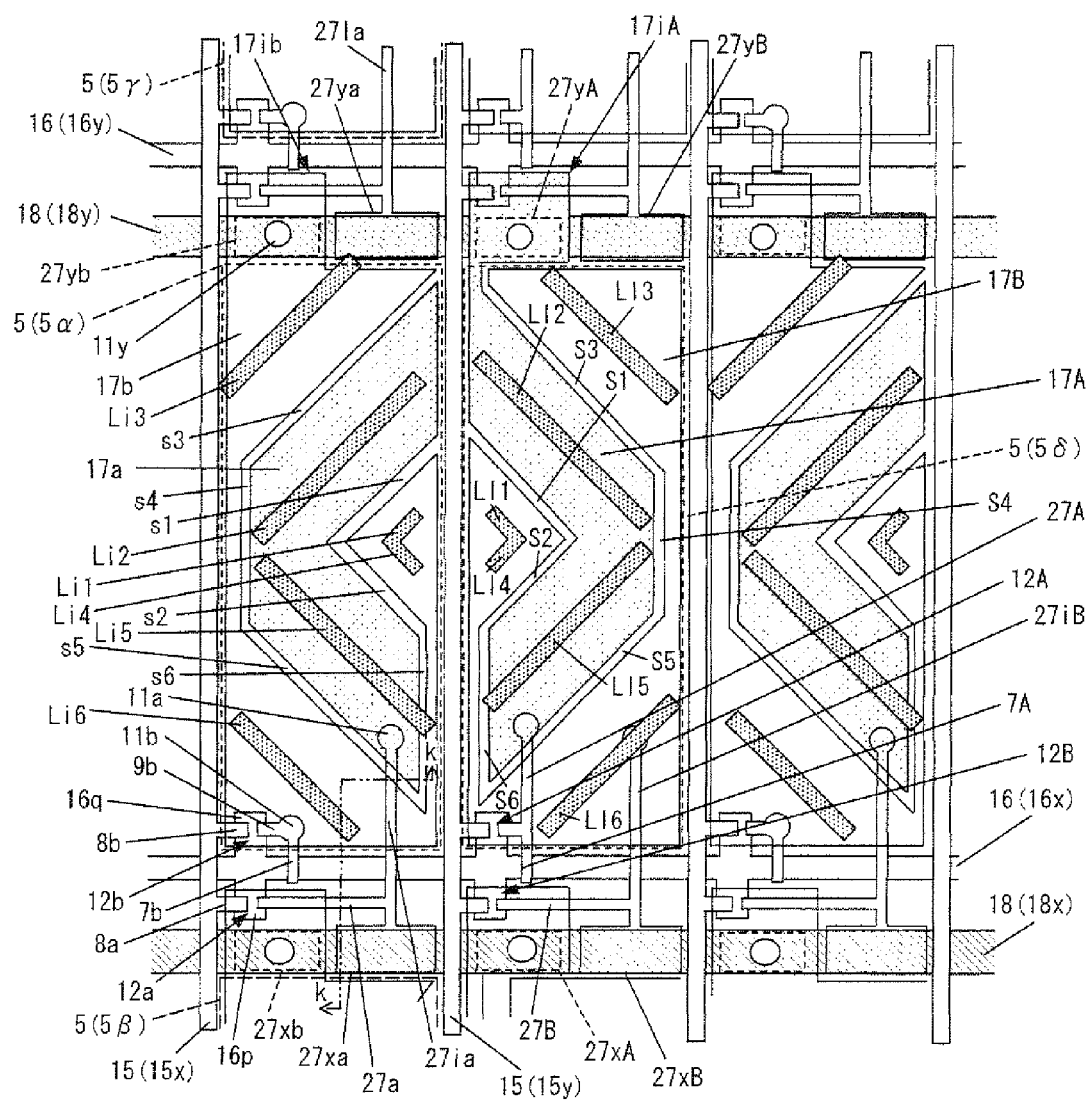
FIG. 4 is a plane view illustrating another arrangement of the liquid crystal panel according to Embodiment 1 of the present invention.

The liquid crystal panel of the present embodiment can be modified as one illustrated in FIG. 4. That is, the arrangement in FIG. 1 is such that one of the first and second transistors overlaps the second pixel electrode, and the other one does not overlap any pixel electrodes. However, in an arrangement of FIG. 4, an interconnection electrode (for example, 17ib and 17iA) is extended toward a side of a pixel region 5γ so that the interconnection electrode covers a first transistor of a precedently-provided pixel region. With this arrangement, each of the first and second transistors can overlap a pixel electrode. This allows uniformizing the influences on the first and second transistors, caused due to parasitic capacitances generated between (a) the first and second transistors and (b) their corresponding pixel electrodes.

Figure 5:
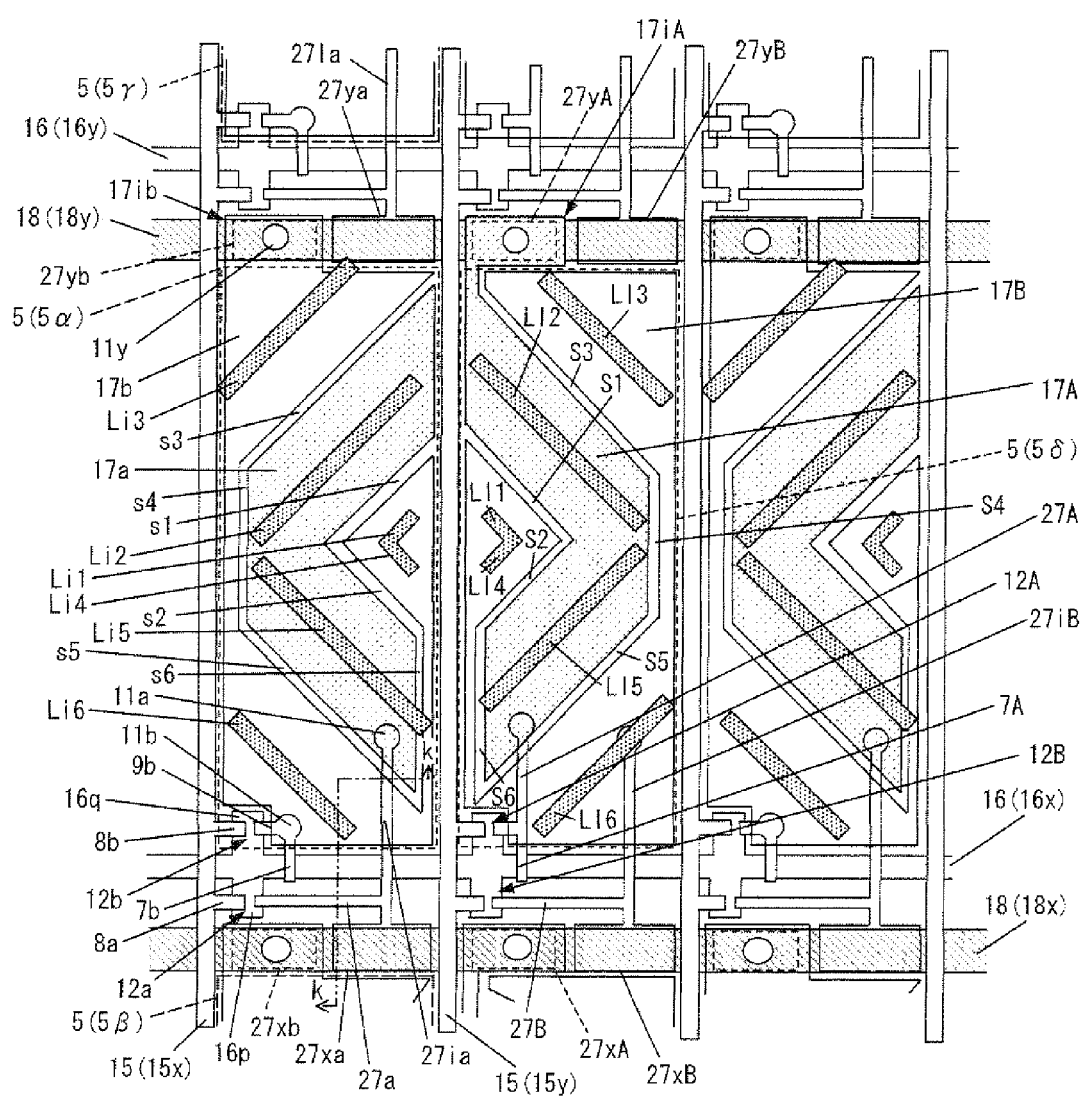
FIG. 5 is a plane view illustrating another arrangement of the liquid crystal panel according to Embodiment 1 of the present invention.

The liquid crystal panel of the present embodiment can be modified as one illustrated in FIG. 5. In FIG. 1, one of the first and second transistors overlaps a pixel electrode and the other one does not overlap any pixel electrodes. However, in FIG. 5, a corner of a second pixel electrode is cut away so that the second pixel electrode and a transistor do not overlap each other. In the arrangement, neither of the first and second transistors overlaps any pixel electrodes. As a result, it is possible to prevent generation of parasitic capacitances between a respective of the first and second transistors and a pixel electrode.

Figure 6:
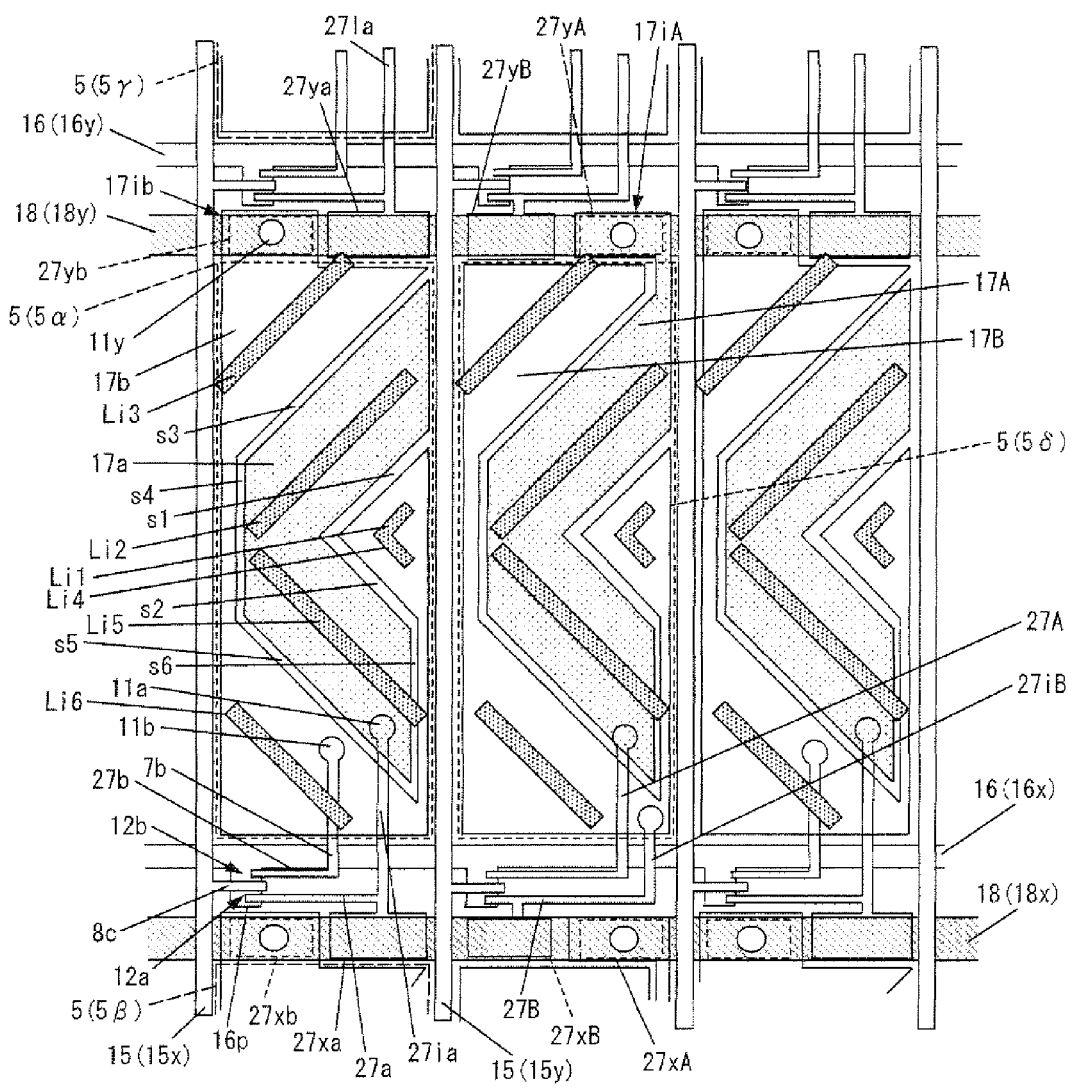
FIG. 6 is a plane view illustrating another arrangement of the liquid crystal panel according to Embodiment 1 of the present invention.

The liquid crystal panel of the present embodiment can be modified as one illustrated in FIG. 6. That is, an electrode section is provided only on one side (retention capacitor line side) of a scanning signal line 16x. Further, in terms of a part related to a pixel region 5α taken as an example, a common source electrode 8c is led out of a data signal line 15x toward a row direction. A drain electrode of a first transistor 12a is connected to a first pixel electrode 17a via (i) a drain lead line 27a extending in the row direction, (ii) an interconnection line 27ia connected to the drain lead line 27a, and (iii) a contact hole 11a. An (one-side) electrode section 16p of the scanning signal line 16x doubles as a gate electrode of the first transistor 12a. On the other hand, a drain electrode of a second transistor 12b is connected to a second pixel electrode 17b via (i) a drain lead line 27b extending in the row direction, (ii) a drain extension line 7b connected to the drain lead line 27b and extending in a column direction so as to overstride the scanning signal line 16x, and (iii) a contact hole 11b. The electrode section 16p of the scanning signal line 16x also doubles as a gate electrode of the second transistor 12b. This arrangement allows the first and second transistors 12a and 12b not to overlap any pixel electrodes, thereby making it possible to avoid that only one of the transistors is affected by a parasitic capacitance generated between the one of the transistors and a pixel electrode.

Further, as illustrated in FIG. 6, it is also possible to arrange two pixel regions (for example, pixel regions 5α and 5δ) adjoining each other in the row direction, such that V-shaped first pixel electrodes (17a and 17A) are provided so as to face the same direction, when viewed in the row direction.

Figure 7:
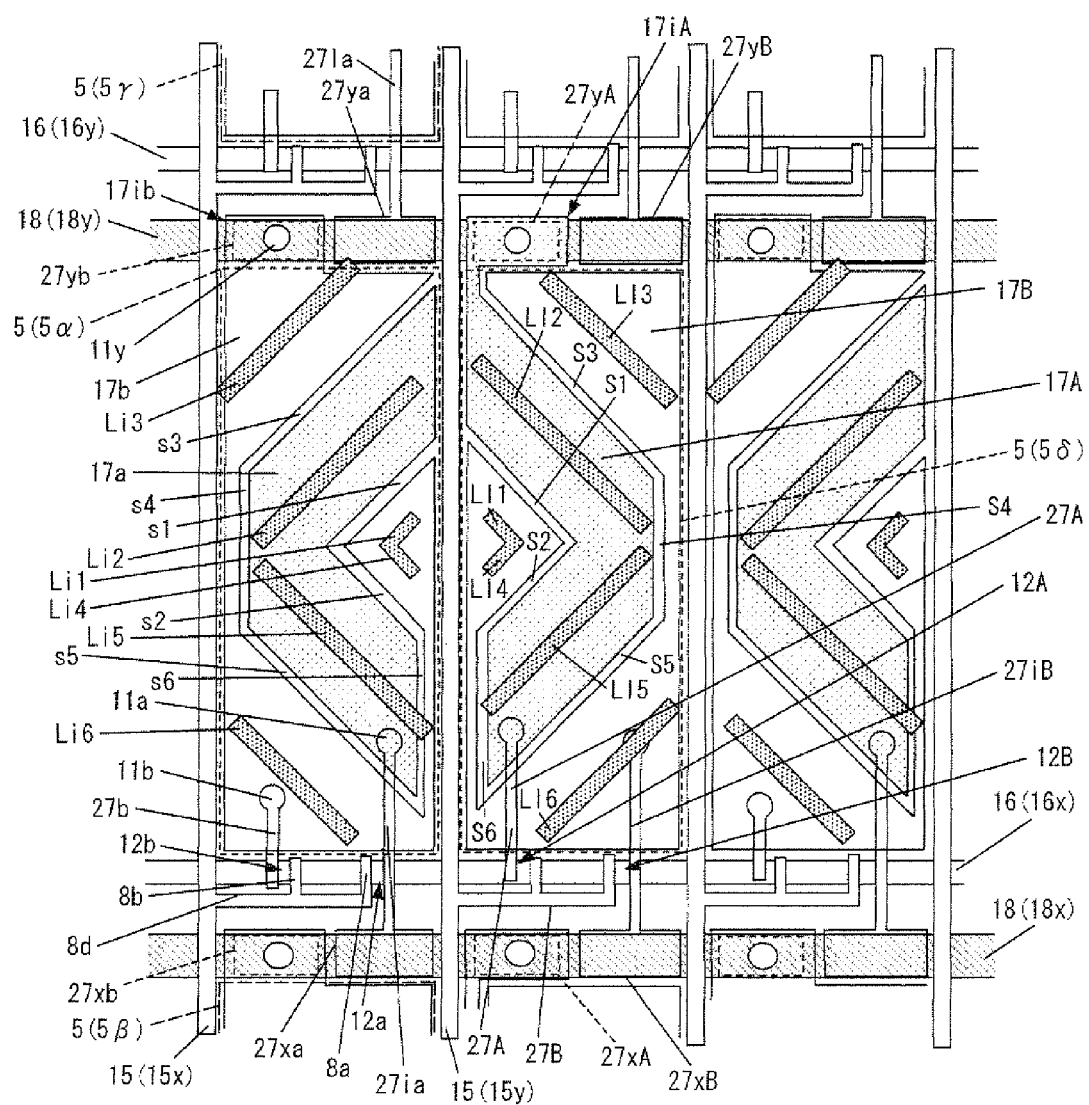
FIG. 7 is a plane view illustrating another arrangement of the liquid crystal panel according to Embodiment 1 of the present invention.

The liquid crystal panel of the present embodiment can be also modified as one illustrated in FIG. 7. That is, unlike the one of FIG. 1, no electrode section is provided in a scanning signal line 16x. Alternatively, in terms of a part related to a pixel region 5α taken as an example, an electrode 8d is led out of a data signal line 15x toward a row direction, and drain electrodes of first and second transistors 12a and 12b are provided on the scanning signal line 16x. That is, a source electrode 8a of the first transistor 12a is led out of the electrode 8d toward a column direction, and a drain electrode of the first transistor 12a is part of an interconnection line 27ia and is connected to a first pixel electrode 17a via the interconnection line 27ia and a contact hole 11a. The scanning signal line 16x doubles as a gate electrode of the first transistor 12a. On the other hand, a source electrode 8b of the second transistor 12b is led out of the electrode 8d toward the column direction, and a drain electrode of the second transistor 12b is connected to a second pixel electrode 17b via a drain lead line 27b and a contact hole 11b. The scanning signal line 16x also doubles as a gate electrode of the first transistor 12a. With the arrangement, it is possible to equalize capacitance values of: (a) a parasitic capacitance generated between the interconnection line 27ia (a part thereof that serves as the drain electrode of the first transistor 12a electrically connected to the first pixel electrode 17a, and the scanning signal line 16x; and (b) a parasitic capacitance generated between the drain electrode electrically connected to the second pixel electrode 17b, and the scanning signal line 16x. This allows uniformizing the influences on the first and second pixel electrodes 17a and 17b due to the parasitic capacitances (for example, potential fluctuation caused due to diving charge when the transistor is turned off). This results in that display quality of the liquid crystal display device including the liquid crystal panel of can be improved. Parts related to other pixel regions are the same as above.

Figure 8:
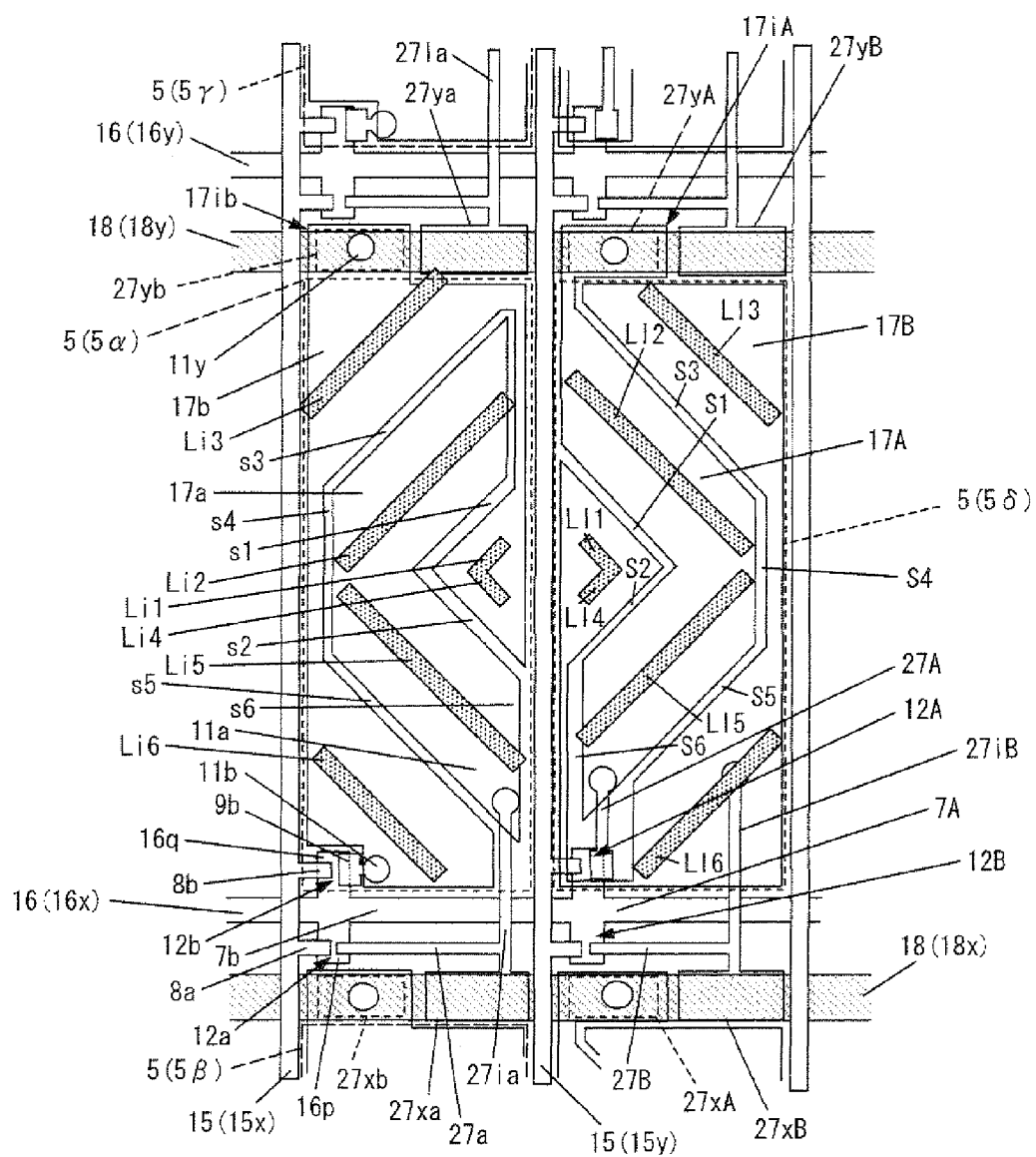
FIG. 8 is a plane view illustrating another arrangement of the liquid crystal panel according to Embodiment 1 of the present invention.

The liquid crystal panel of the present embodiment can be modified as one illustrated in FIG. 8. That is, the liquid crystal panel is arranged such that (i) one pixel region is provided between two adjacent retention capacitor lines, (ii) a scanning signal line is provided between the pixel region and one of the two retention capacitor lines, (iii) part of a second pixel electrode is provided in a part, of the pixel region, along the scanning signal line, and any part of a first pixel electrode is not provided in that part in the pixel region, (iv) a non-pixel electrode region in which neither of the first and second pixel electrodes is formed, is provided in a part of the pixel region, adjacent to the scanning signal line, and (v) the first pixel electrode is electrically connected to a drain electrode of a first transistor via an interconnection line or a drain lead line crossing in the non-pixel electrode region.

In terms of a part related to a pixel region 5α taken as an example, one pixel region 5α is provided between two adjacent retention capacitor lines 18x and 18y, and a scanning signal line 16x is provided between the pixel region 5α and one of the two retention capacitor lines 18x and 18y. In a part of the pixel region 5α, along the scanning signal line 16x, a part of a second pixel electrode 17b is provided while any part of a first pixel electrode 17a is not provided. In a part (around one of two corners of the pixel region 5α along the scanning signal line 16x, in which first and second transistors 12a and 12b are not provided) of the pixel region 5α, adjacent to the scanning signal line, a non-pixel electrode forming region in which neither of the first and second pixel electrodes is formed, is provided. A first pixel electrode 17a is electrically connected to a drain electrode of the first transistor 12a via an interconnection line 27ia crossing in the non-pixel electrode forming region. Likewise, in terms of a part related to a pixel region 5δ, in a part of the pixel region 5δ, along the scanning signal line 16x, a part of a second pixel electrode 17B is provided while any part of a first pixel electrode 17A is not provided. Further, in a part (around one of two corners of the pixel region 5δ along the scanning signal line 16x, in which first and second transistors 12A and 12B are provided) of the pixel region 5δ, adjacent to the scanning signal line 16x, a non-pixel electrode forming region in which neither of the first and second pixel electrodes is formed, is provided. The first pixel electrode 17A is electrically connected to a drain electrode of the first transistor 12A via a drain lead line 27A crossing in the non-pixel electrode forming region. In this case, the drain electrode of the first transistor 12A is provided within the non-pixel electrode forming region, and a drain extension line, which is provided in the arrangement of FIG. 1, is not provided here.

In this arrangement, for example, in terms of the part related to the pixel region 5α, no parasitic capacitance is generated between the second pixel electrode 17b and the interconnection line 27ia connected to the first pixel electrode 17a. As a result, potential fluctuation of the interconnection line 27ia does not affect a potential of the second pixel electrode 17b. This can improve display quality of a liquid crystal display device including the liquid crystal panel of the present embodiment.

In FIG. 8, for example, in terms of the part related to the pixel region 5α, an overlapping area where the drain electrode of the first transistor 12a and the scanning signal line 16x overlap each other is smaller than an overlapping area where a drain electrode 9b of the second transistor 12b and the scanning signal line 16x overlap each other. This allows (a) parasitic capacitances generated between a respective of the interconnection line 27ia and the drain electrode (of the first transistor 12a), electrically connected to the first pixel electrode 17a, and the scanning signal line 16x; and (b) a parasitic capacitance generated between the drain electrode 9b electrically connected to the second pixel electrode 17b, and the scanning signal line 16x, to be equal to each other. This allows uniformizing the influences on the first and second pixel electrodes 17a and 17b due to the parasitic capacitances (for example, potential fluctuation due to diving charge when the transistor is turned off). This results in that display quality of a liquid crystal display device including the liquid crystal panel of the present embodiment can be improved.

Further, in FIG. 8, for example, in regard to the pixel electrode 5α, a corner of each of the first and second, pixel electrodes 17a and 17b which corner is an overlapping part with a transistor-formation region, is cut away. In the arrangement, neither of the first and second transistors 12a and 12b overlap any pixel electrodes. As a result, it is possible to prevent generation of a parasitic capacitance between each of the first and second transistors, and a pixel electrode.

Figure 9:
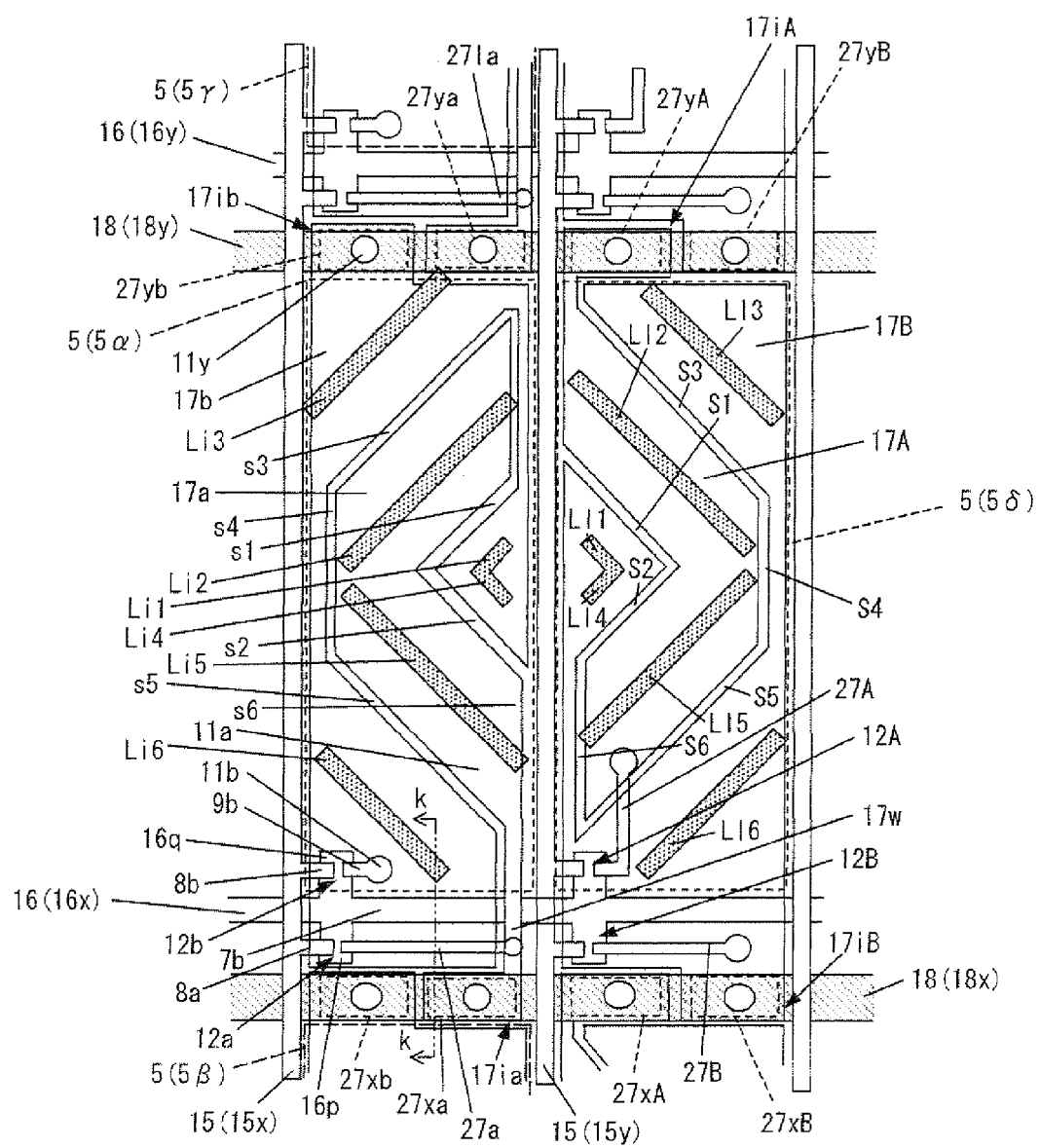
FIG. 9 is a plane view illustrating another arrangement of the liquid crystal panel according to Embodiment 1 of the present invention.
Figure 15:
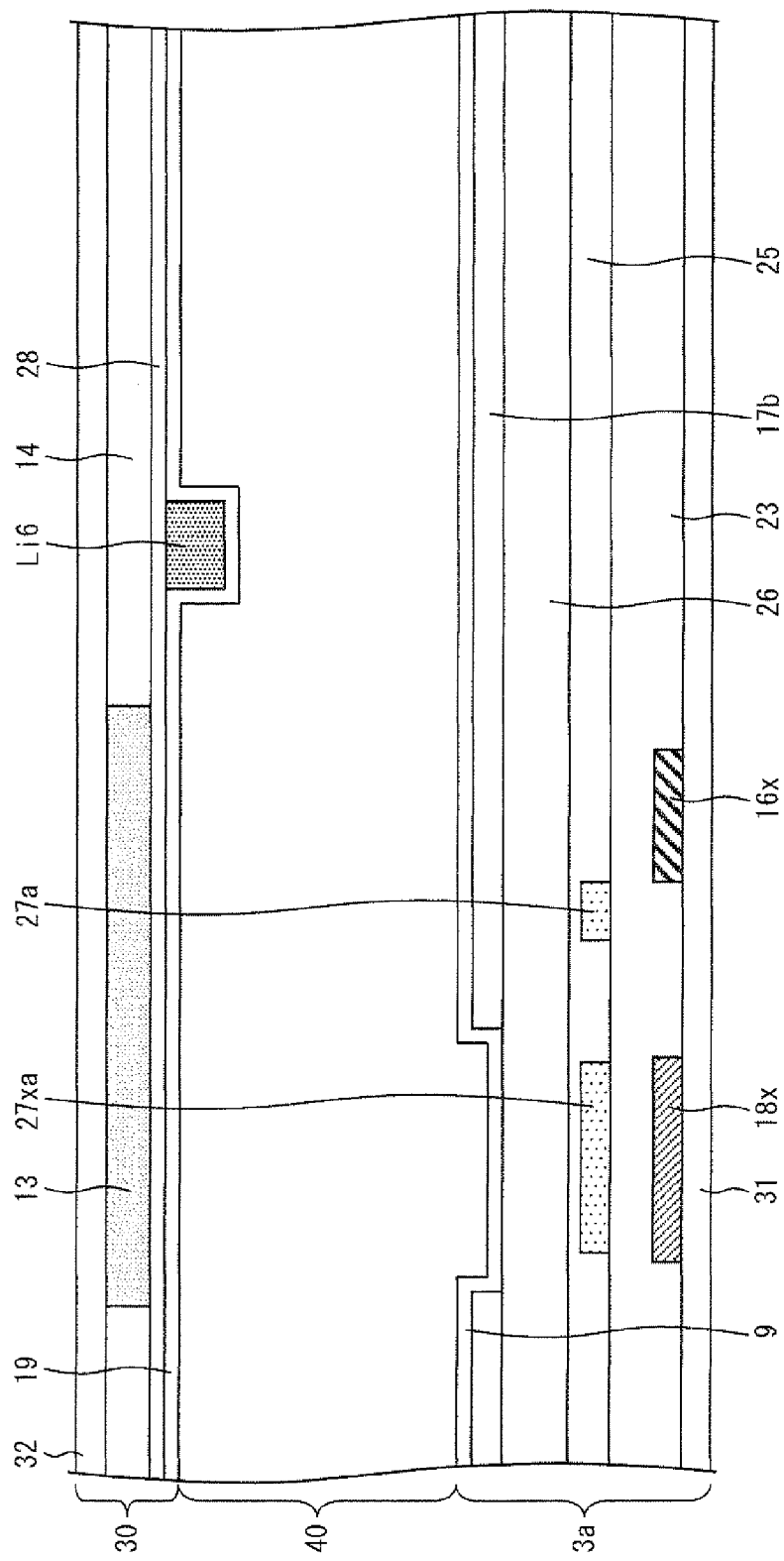
FIG. 15 is a cross sectional view illustrating the liquid crystal panel, viewed along arrows k-k in FIG. 9.

The liquid crystal panel of the present embodiment can be also modified as one illustrated in FIG. 9. An arrangement of FIG. 9 is preferably used in a case where an interlayer insulating film provided below a pixel electrode (for example, as illustrated in FIG. 15 that is a cross sectional view of the liquid crystal panel, viewed along arrows k-k of FIG. 9, an interlayer insulating film has a laminate structure of an inorganic insulating film 25 and a thin organic insulating film 26). That is, in FIG. 1, either of the first and second pixel electrodes, and the scanning signal line 16 do not overlap each other. On the other hand, in FIG. 9, respective pixel-electrode forming regions for first and second pixel electrodes are extended so that a transparent interconnection line (transparent line) connected to the first pixel electrode overstrides a scanning signal line 16 and the second pixel electrode covers the scanning signal line 16, and first and second transistors. The transparent interconnection line (transparent line) and the pixel electrodes are provided in the same layer.

In terms of a part related to a pixel region 5α taken as an example, a first pixel electrode 17a is connected to an interconnection electrode 17ia via a transparent interconnection line (transparent line) 17w overstriding a scanning signal line 16x, and the interconnection electrode 17ia is connected to a capacitor electrode 27xa via a contact hole. A drain electrode of a first transistor 12a is connected to the transparent interconnection line (transparent line) 17w via a drain lead line 27a extending in a row direction and a contact hole. The transparent interconnection line (transparent line) 17w, and first and second pixel electrode 17a and 17b are provided in the same layer. Other arrangements are the same as those in FIG. 1 except that a drain extension part 7b is not provided, unlike FIG. 1, because the drain extension part 7b is not required. This is because, in a case where an interlayer insulating film is thick, a parasitic capacitance between the interconnection (transparent line) 17w and the scanning signal line 16x can be negligible.

Figure 10:
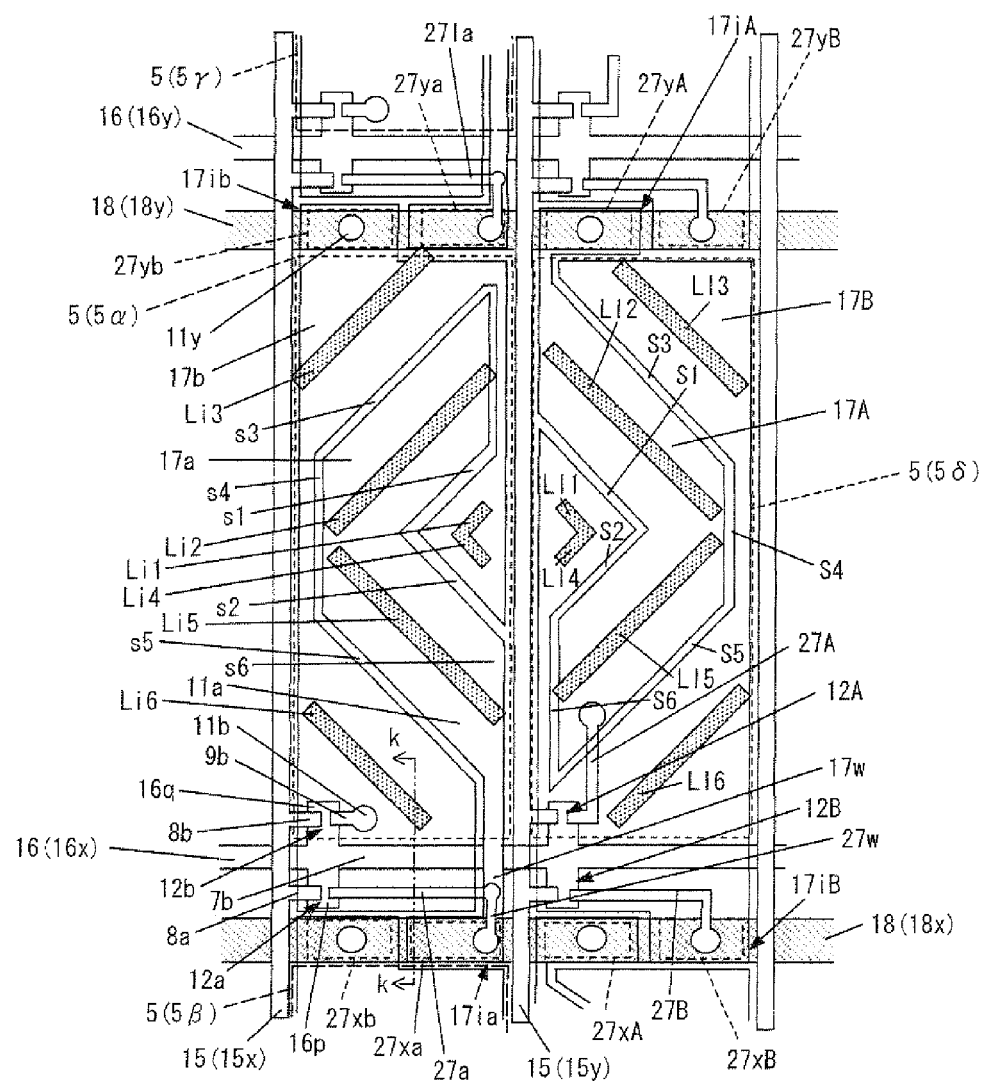
FIG. 10 is a plane view illustrating another arrangement of the liquid crystal panel according to Embodiment 1 of the present invention.

Further, in terms of a part related to a pixel region 5δ, a second pixel electrode 17B is connected to an interconnection electrode 17iB, and a drain electrode of a second transistor 12B is connected to the second pixel electrode 17B via a drain lead line 27B extending in the row direction and a contact hole. The interconnection electrode 17iB is connected to a capacitor electrode 27xB via a contact hole. As such, the transparent interconnection line is provided and the respective pixel-electrode forming regions are extended. This can increase an aperture ratio. In the arrangement, as one illustrated in FIG. 10, an interconnection line 27w for connecting a capacitor electrode 27xa to a drain lead line 27a and drain electrodes of transistors (12a and 12b) may be provided in the same layer.

Figure 16:
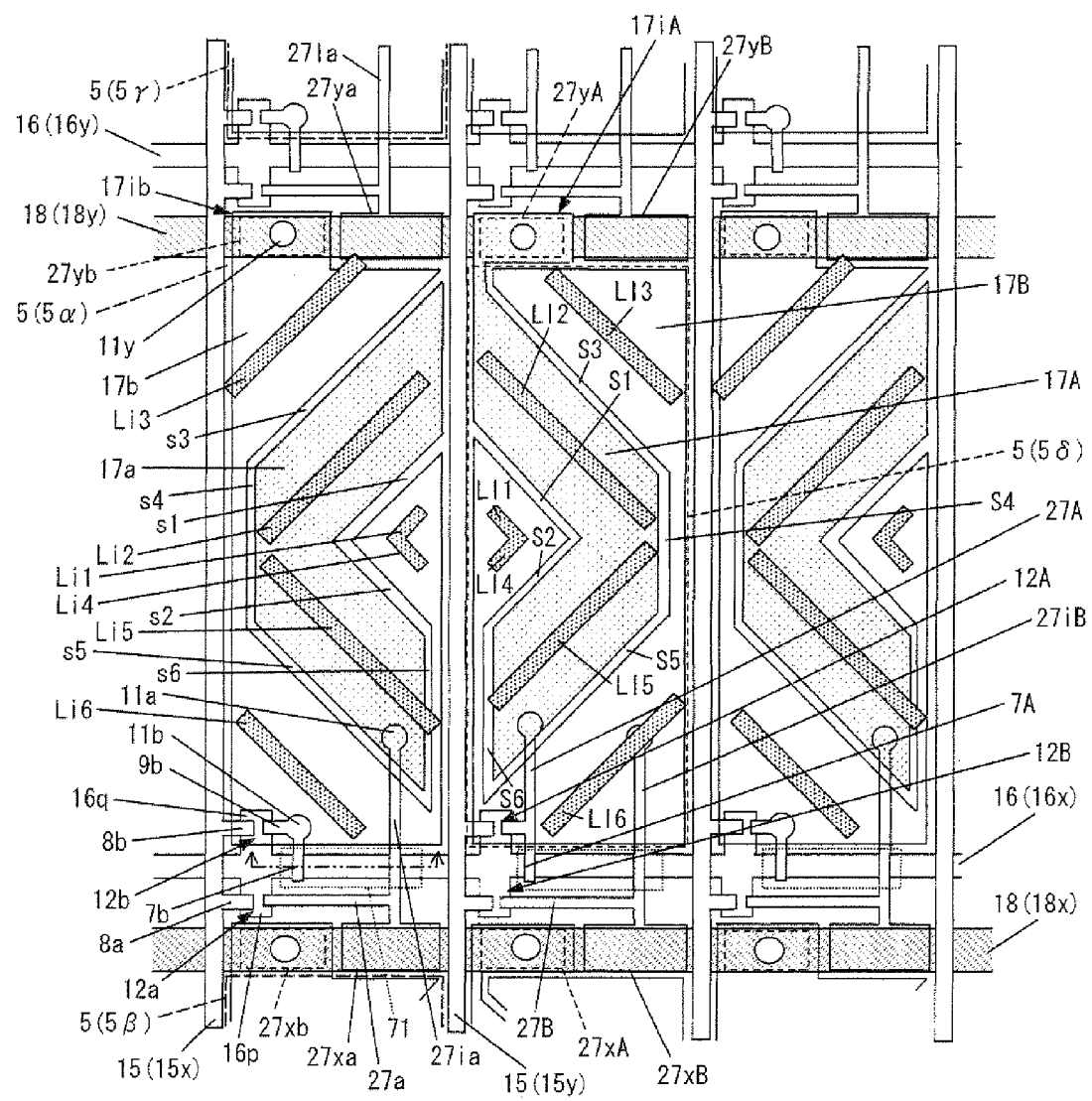
FIG. 16 is a plane view illustrating another arrangement of the liquid crystal panel according to Embodiment 1 of the present invention.
Figure 17:
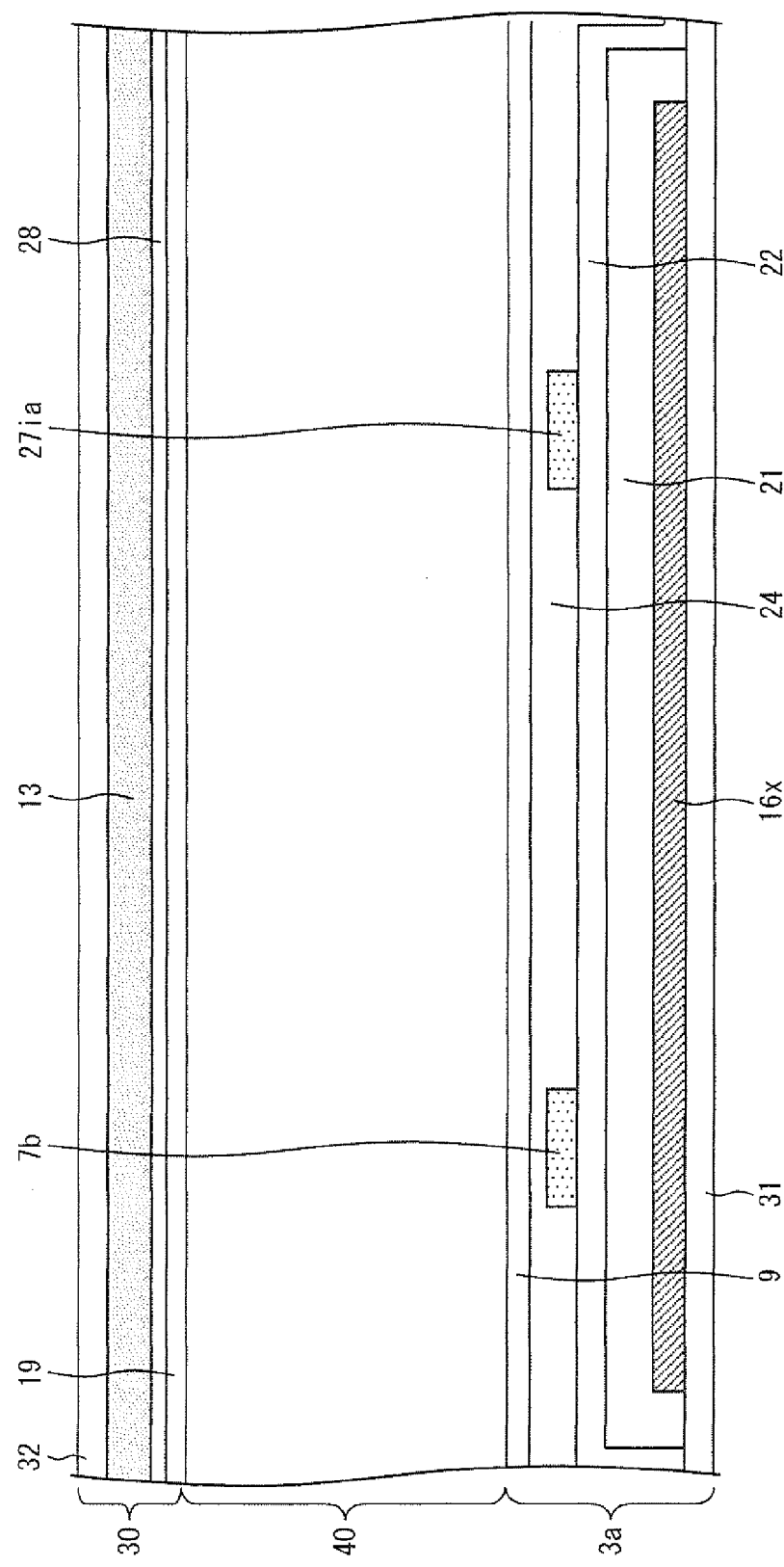
FIG. 17 is a cross sectional view illustrating the liquid crystal panel, viewed along arrows k-k in FIG. 16.

The liquid crystal panel of the present embodiment can be also modified as one illustrated in FIG. 16. In terms of a part related to a pixel region 5α taken as an example, a thick insulating layer made of an SOG material, for example, is provided in a region 71 including (a) an overlapping part where a scanning signal line 16x and an interconnection line 27ia overlap each other and (b) an overlapping part where the scanning signal line 16x and a drain extension part 7b overlap each other. FIG. 17 is a cross sectional view of the region 71 of FIG. 16. As illustrated in FIG. 17, in the region 71, the scanning signal line 16x is provided on a substrate 31, a thick gate insulating layer 21 made of an SOG material is provided so as to cover the scanning signal line 16x, and an inorganic gate insulating layer 22 is provided thereon. These gate insulating layer 21 and 22 constitute a gate insulating film. Other arrangements are the same as those in FIG. 1. This arrangement increases a distance between the scanning signal line 16x and the interconnection line 27ia or the drain extension part 7b, thereby allowing a parasitic capacitances between them (i.e., (i) between the scanning signal line and the interconnection line, or (ii) between the scanning signal line and the drain extension part) to decrease. This arrangement is also effective to restrain an occurrence of a short circuit between them.

Embodiment 2

Figure 11:
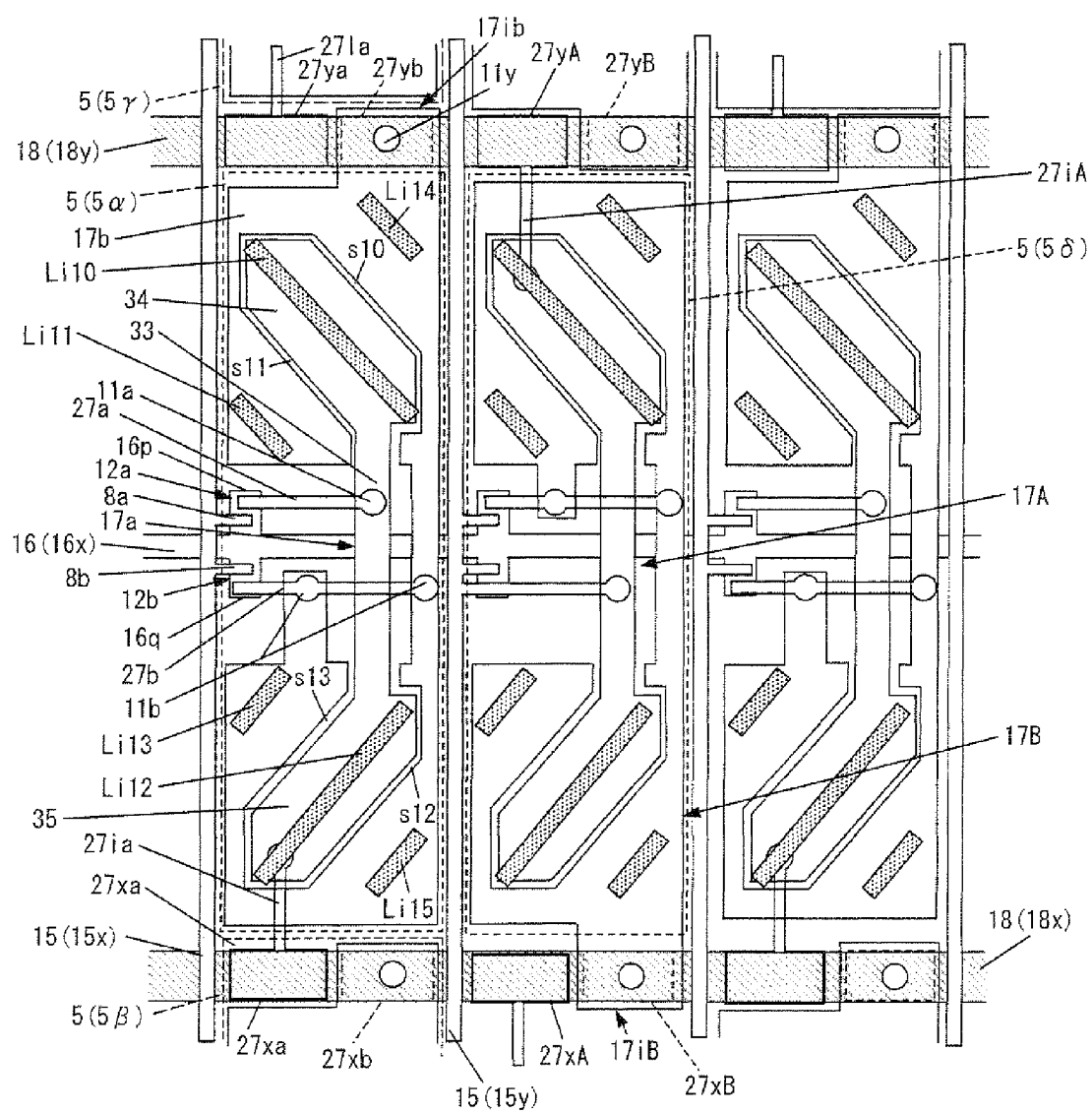
FIG. 11 is a plane view illustrating an arrangement of a liquid crystal panel according to Embodiment 2 of the present invention.

FIG. 11 is a plane view illustrating a liquid crystal panel of Embodiment 2. Although the liquid crystal panel of Embodiment 2 includes the active matrix substrate of the present invention, a liquid crystal layer, and a color filter substrate, the liquid crystal layer is not illustrated and the color filter substrate is only partially illustrated in FIG. 11.

When viewed in a plane manner, the active matrix substrate of the present invention includes: rectangular pixel regions 5 (5α, 5β, 5γ, 5δ) provided in a matrix manner; scanning signal lines 16 each extending in a row direction (right-left direction in the view) so as to cut across the pixel region 5; data signal lines 15 (15x, 15y) each extending in a column direction (upper-lower direction in the view); first and second transistors each provided near the vicinity of an intersection of the signal lines 15 and 16 so as to correspond to the pixel region 5; and retention capacitor lines 18 (18x, 18y) each provided so as to correspond to a space between two pixel regions adjoining each other in a column direction. Further, each pixel region 5 includes a first pixel electrode corresponding to a bright pixel in display and a second pixel electrode corresponding to a dark pixel in display, and a pixel includes the pixel region and a portion of a color filter substrate that corresponds to the pixel region. Further, the scanning signal line 16x is provided so as to cut across the center of the pixel region 5, and includes an electrode section that juts in two directions along the column direction in one pixel region.

For example, the pixel region 5α includes a first pixel electrode 17a and a second pixel electrode 17b. The first pixel electrode 17a is shaped in such a manner that a transparent electrode 33 having a rectangular shape and extending in the column direction is connected at both ends thereof with two transparent electrodes 34 and 35 each having a slanted rice grain shape, and the first pixel electrode 17a is line-symmetrical with respect to a line crossing across the center of the pixel region 5α (along the column direction). The second pixel electrode 17b is provided so as to surround the first pixel electrode 17a via spaces s10-s13 etc. The spaces s10 and s11 are positioned between the transparent electrode 34 and the second pixel electrode 17b, and the spaces s12 and s13 are positioned between the transparent electrode 35 and the second pixel electrode 17b. Further, the retention capacitor line 18x is provided so as to correspond to the space between the two pixel regions 5α and 5β adjoining each other in the column direction. Similarly, the retention capacitor line 18y is provided so as to correspond to the space between the two pixel regions 5α and 5γ adjoining each other in the column direction. The scanning signal line 16x is provided so as to cut across the center of the pixel region 5α. The scanning signal line 16x includes, in the pixel region 5α, electrode sections 16p and 16q that jut in two directions (upper and lower directions in the view) along the column direction.

Further, the active matrix substrate of the present invention is configured such that capacitor electrodes 27xa and 27xb aligned in the row direction are provided above the retention capacitor line 18x, capacitor electrodes 27ya and 27yb aligned in the row direction are provided above the retention capacitor line 18y, and an interconnection line 27ia that connects the capacitor electrode 27xa to the first pixel electrode 17a and an interconnection electrode 17ib that connects the capacitor electrode 27yb to the second pixel electrode 17b are provided. More specifically, one end of the interconnection line 27ia extending in the column direction is connected with the capacitor electrode 27xa and the other end is connected to the first pixel electrode 17a via a contact hole. Further, the interconnection electrode 17ib is provided above the capacitor electrode 27yb in such a manner as to be connected to a part of the second pixel electrode 17b, and is connected to the capacitor electrode 27yb via a contact hole 11y.

A source electrode 8a of a first transistor 12a is led out of the data signal line 15x. A drain electrode of the first transistor 12a is connected to the first pixel electrode 17a (transparent electrode 33) via a drain lead line 27a extending in the row direction and a contact hole 11a. The electrode section 16p of the scanning signal line 16x doubles as a gate electrode of the first transistor 12a. On the other hand, a source electrode 8b of the second transistor 12b is led out of the data signal line 15x. A drain electrode of the second transistor 12b is connected to the second pixel electrode 17b via a drain lead line 27b and a contact hole 11b (via two roots). The electrode section 16q of the scanning signal line 16x doubles as a gate electrode of the second transistor 12b. The drain lead line 27b extends in the row direction in such a manner as to overlap a part of the second pixel electrode 17b where one contact hole is provided, the transparent electrode 33 that is a part of the first pixel electrode 17a, and a part of the second pixel electrode 17b where the other contact hole is provided.

The active matrix substrate of the present invention is configured such that the data signal line 15, the drain electrodes of the first and second transistors 12a and 12b, the capacitor electrodes 27xa, 27xb, 27ya, and 27yb, the drain lead lines 27a and 27b, and the interconnection line 27ia are provided in the same layer (by the same process), and the first and second pixel electrodes 17a and 17b, and the interconnection electrode 17ib are provided in the same layer (by the same process).

Further, the capacitor electrode 27xb provided above the retention capacitor line 18x is connected to a second pixel electrode provided in the pixel region 5β, via an interconnection electrode and a contact hole, and the capacitor electrode 27ya provided above the retention capacitor line 18y is connected to a first pixel electrode provided in the pixel region 5γ via the interconnection line 27Ia and a contact hole (not shown). That is, the retention capacitor line 18x is shared by the pixel regions 5α and 5β, and the retention capacitor line 18y is shared by the pixel regions 5α and 5γ.

Further, the liquid crystal panel of the present invention is configured such that a portion of the color filter substrate that overlaps the pixel electrode 5α is provided with: a rib Li10 overlapping a part of the first pixel electrode 17a (transparent electrode 34); a rib Li12 overlapping a part of the first pixel electrode 17a (transparent electrode 35); and ribs Li11, Li13, Li14, and Li15 overlapping the second pixel electrode 17b. Here, the ribs Li10, Li11, Li14, and the spaces s10 and s11 are parallel to one another, and form an angle of 135° with respect to the scanning signal line 16. Seen in a plane manner, the space s10 is positioned between the ribs Li10 and Li14, the space s11 is positioned between the ribs Li10 and Li11, and the rib Li10 is positioned between the spaces s10 and s11. Further, the ribs Li12, Li13, Li15, and the spaces s12 and s13 are parallel to one another, and form an angle of 45° with respect to the scanning signal line 16. Seen in a plane manner, the space s12 is positioned between the ribs Li12 and Li15, the space s13 is positioned between the ribs Li12 and Li13, and the rib Li12 is positioned between the spaces s12 and s13.

The pixel region 5δ adjacent to the pixel region 5α in the row direction is provided with a first pixel electrode 17A and a second pixel electrode 17B. The shapes and positions of the first and second pixel electrodes 17A and 17B are the same as those of the first and second pixel electrodes in the pixel region 5α.

Further, above the retention capacitor line 18x, capacitor electrodes 27xA and 27xB aligned in the row direction are provided between two adjacent data signal lines. Above the retention capacitor line 18y, capacitor electrodes 27yA and 27yB aligned in the row direction are provided between two adjacent data signal lines. Further, an interconnection line 27iA that connects the capacitor electrode 27yA to the first pixel electrode 17A and an interconnection electrode 17iB that connects the capacitor electrode 27xB to the second pixel electrode 17B are provided. More specifically, one end of the interconnection line 27iA extending in the column direction is connected to the capacitor electrode 27yA, and the other end of the interconnection line 27iA is connected to the first pixel electrode 17A via a contact hole. The interconnection electrode 17iB is provided above the capacitor electrode 27xB in such a manner as to be connected to a part of the second pixel electrode 17B, and is connected with the capacitor electrode 27xB via a contact hole.

Other connections on the pixel region 5δ and the shapes and positions of ribs provided according to the connections are the same as those of the pixel region 5α. A method for driving a liquid crystal display device including the liquid crystal panel of the present invention is the same as the method for driving the liquid crystal display device including the liquid crystal panel shown in FIG. 1.

As described above, the liquid crystal display device including the liquid crystal panel of the present invention is configured such that one pixel is constituted by a sub-pixel with high luminance (bright sub-pixel) and a sub-pixel with low luminance (dark sub-pixel). This allows halftone expression by area coverage modulation, improving a viewing angle dependence of a γ-characteristic (e.g. excess brightness in screen).

The liquid crystal panel of the present invention is configured such that one retention capacitor line (e.g. 18x) is provided so as to correspond to a space between two pixel regions (e.g. 5α and 5β) adjoining each other in the column direction, a plurality of capacitor electrodes (e.g. 27xb, 27xa) aligned in the row direction are provided above the retention capacitor line (e.g. 18x), a plurality of capacitor electrodes (e.g. 27yb, 27ya) aligned in the row direction are provided on the retention capacitor line (e.g. 18y), and the interconnection line (e.g. 27ia) that connects the capacitor electrode (e.g. 27xa) with the first pixel electrode (e.g. 17a) and the interconnection electrode (e.g. 17ib) that connects the capacitor electrode (e.g. 27yb) to the second pixel electrode (e.g. 17b) are provided. This allows an arrangement where one retention capacitor line (e.g. 18x) is shared by two pixel regions (e.g. 5α and 5β) and a part of the second pixel electrode (e.g. 17b) is positioned around the first pixel electrode (e.g. 17a). This allows reducing roughness due to the shapes and positions of individual pixel electrodes, without increasing the number of retention capacitor lines, compared with the conventional art shown in FIG. 30.

Further, the liquid crystal panel of the present invention is an MVA structure in which spaces (s10-s13) between the first and second pixel electrodes 17a and 17b, serving as orientation regulation structures, and ribs (Li10-Li13) serving as orientation regulation structures are provided as described above on the pixel region 5α, for example. This allows the liquid crystal display device of the present invention including the liquid crystal panel of the present invention to have four orientations of liquid crystals when displaying halftone. This assures a good viewing angle property.

Embodiment 3

Figure 12:
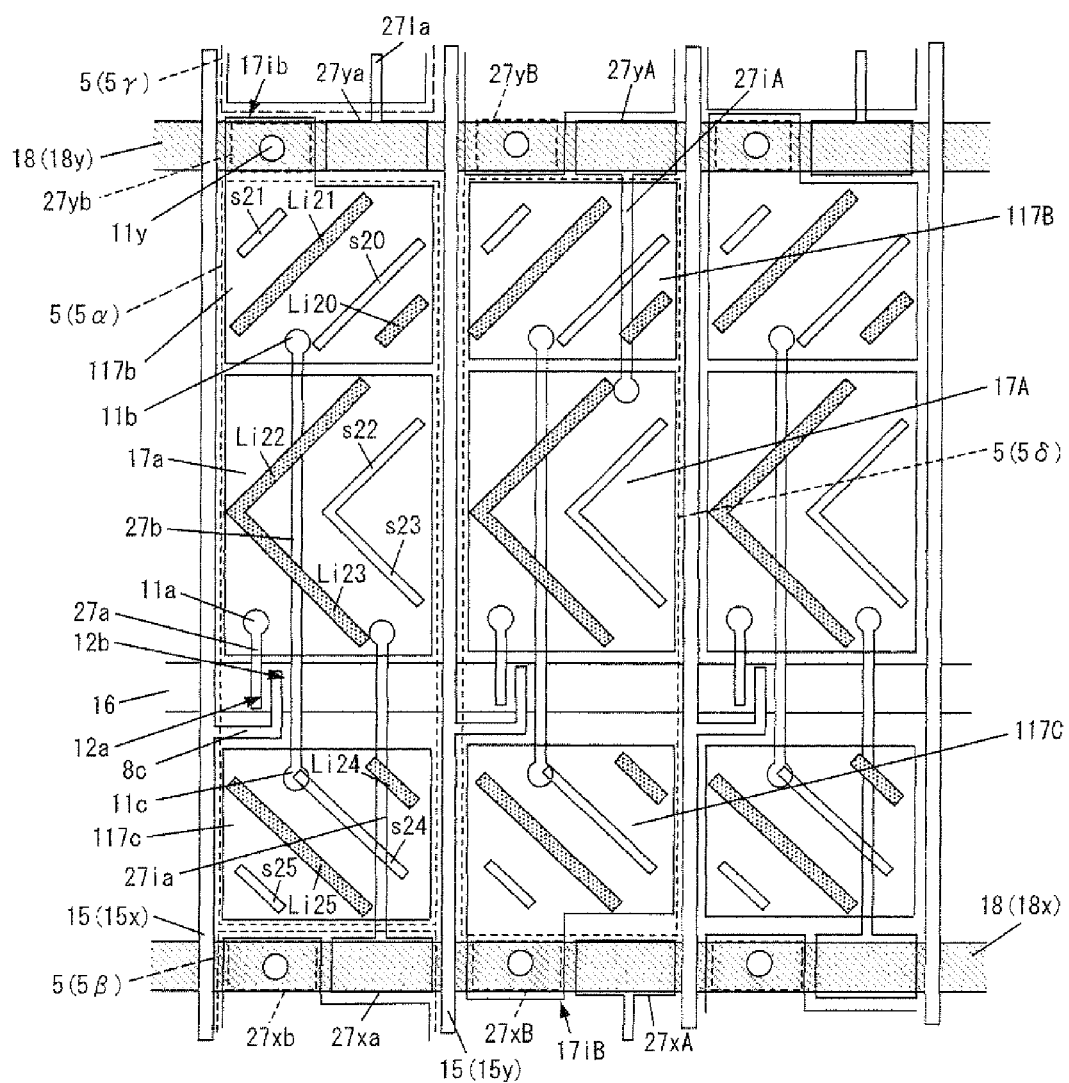
FIG. 12 is a plane view illustrating an arrangement of a liquid crystal panel according to Embodiment 3 of the present invention.

FIG. 12 is a plane view illustrating a liquid crystal panel of Embodiment 3. Although the liquid crystal panel of Embodiment 3 includes the active matrix substrate of the present invention, a liquid crystal layer, and a color filter substrate, the liquid crystal layer is not illustrated and the color filter substrate is only partially illustrated in FIG. 12.

When viewed in a plane manner, the active matrix substrate of the present invention includes: rectangular pixel regions 5 (5α, 5β, 5γ, 5δ) provided in a matrix manner; scanning signal lines 16 each extending in a row direction (right-left direction in the view) so as to cut across the pixel region 5; data signal lines 15 (15x, 15y) each extending in a column direction (upper-lower direction in the view); first and second transistors each provided near the vicinity of an intersection of the signal lines 15 and 16 so as to correspond to the pixel region 5; and retention capacitor lines 18 (18x, 18y) each provided so as to correspond to a space between two pixel regions adjoining each other in a column direction. Further, the pixel region 5 includes a first pixel electrode that corresponds to a bright pixel in display and a second pixel electrode that is made of two transparent electrodes and that corresponds to a dark pixel in display, and a pixel includes the pixel region and a portion of a color filter substrate that corresponds to the pixel region. Further, the scanning signal line 16 is provided so as to cut across a portion of the pixel region 5 that is other than the center thereof.

For example, the pixel region 5α includes a first pixel electrode 17a having a rectangular shape, a transparent electrode 117b having a rectangular shape, and a transparent electrode 117c having a rectangular shape. The transparent electrode 117b, the first pixel electrode 17a, and the transparent electrode 117c are aligned in this order (in a column direction) between the retention capacitor lines 18x and 18y adjoining each other. The scanning signal line 16 is provided between the first pixel electrode 17a and the transparent electrode 117c. The transparent electrode 117b and the transparent electrode 117c are connected to each other to form a second pixel electrode. Further, the transparent electrode 117b has parallel slits s20 and s21 that are positioned slantly with respect to the scanning signal line 16. The first pixel electrode 17a has slits s22 and s23 that form a V-shape in the row direction. The transparent electrode 117c has parallel slits s24 and s25 that are positioned slantly with respect to the scanning signal line 16. These slits serve as orientation regulation structures.

Further, the active matrix substrate of the present invention is configured such that capacitor electrodes 27xb and 27xa aligned in the row direction are provided above the retention capacitor line 18x, capacitor electrodes 27yb and 27ya aligned in the row direction are provided above the retention capacitor line 18y, and an interconnection line 27ia that connects the capacitor electrode 27xa to the first pixel electrode 17a and an interconnection electrode 17ib that connects the capacitor electrode 27yb to the second pixel electrode (transparent electrode 117b) are provided. More specifically, one end of the interconnection line 27ia extending in the column direction is connected to the capacitor electrode 27xa and the other end is connected to the first pixel electrode 17a via a contact hole. Further, the interconnection electrode 17ib is provided above the capacitor electrode 27yb in such a manner as to be connected to a part of the second pixel electrode (transparent electrode 117b), and is connected to the capacitor electrode 27yb via a contact hole 11y.

A source electrode 8c (common source electrode) of a first transistor 12a is led out of the data signal line 15x. A drain electrode of the first transistor 12a is connected to the first pixel electrode 17a via a drain lead line 27a extending in the column direction and a contact hole 11a. The scanning signal line 16 doubles as a gate electrode of the first transistor 12a. On the other hand, a source electrode 8c (common source electrode) of a second transistor 12b is led out of the data signal line 15x. A part of the drain lead line 27b extending in the column direction doubles as a drain electrode of the second transistor 12b. One end of the drain lead line 27b is connected to the transparent electrode 117b via the contact hole 11b, and the other end of the drain lead line 27b is connected to the transparent electrode 117c via the contact hole 11c. The scanning signal line 16 doubles as a gate electrode of the second transistor 12b.

The active matrix substrate of the present invention is configured such that the data signal line 15, the drain electrodes of the first and second transistors 12a and 12b, the capacitor electrodes 27xa, 27xb, 27ya, and 27yb, the drain lead lines 27a and 27b, and the interconnection line 27ia are provided in the same layer (by the same process), and the first pixel electrode 17a, the second pixel electrodes 117b and 117c, and the interconnection electrode 17ib are provided in the same layer (by the same process).

Further, the capacitor electrode 27xb provided on the retention capacitor line 18x is connected via an interconnection electrode and a contact hole to a second pixel electrode provided on the pixel region 5β, and the capacitor electrode 27ya provided on the retention capacitor line 18y is connected via the interconnection line 27Ia and a contact hole (not shown) to a first pixel electrode provided on the pixel region 5γ. That is, the retention capacitor line 18x is shared by the pixel regions 5α and 5β, and the retention capacitor line 18y is shared by the pixel regions 5α and 5γ.

Further, the liquid crystal panel of the present invention is configured such that a portion of the color filter substrate that overlaps the pixel electrode 5α is provided with: ribs Li20 and Li21 that overlap the transparent electrode 117b, ribs Li22 and 23 that overlap the first pixel electrode 17a and that form a V-shape in the row direction, and ribs Li24 and Li25 that overlap the transparent electrode 117c. These ribs serve as orientation regulation structures. Here, the ribs Li20 and Li21, and the slits s20 and s21 are parallel to one another, and form an angle of 45° with respect to the scanning signal line 16. Seen in a plane manner, the slit s20 is positioned between the ribs Li20 and Li21, and the rib Li21 is positioned between the slits s20 and s21. Further, the rib Li22 and the slit s22 are parallel to each other and form an angle of 45° with respect to the scanning signal line 16, and the rib Li23 and the slit s23 are parallel to each other and form an angle of 135° with respect to the scanning signal line 16. Further, the ribs Li24 and Li25, and the slits s24 and s25 are parallel to one another, and form an angle of 135° with respect to the scanning signal line 16. Seen in a plane manner, the slit s24 is positioned between the ribs Li24 and Li25, and the rib Li25 is positioned between the slits s24 and s25.

The pixel region 5δ adjacent to the pixel region 5α in the row direction is provided with a first pixel electrode 17A and second pixel electrodes 117B and 117C. The shape and position of the first pixel electrode 17A are the same as those of the first pixel electrode 17a in the pixel region α and the shapes and positions of the second pixel electrodes 117B and 117C are the same as those of the second pixel electrodes 117b and 117c in the pixel region 5α.

Further, above the retention capacitor line 18x, capacitor electrodes 27xB and 27xA aligned in the row direction are provided. Above the retention capacitor line 18y, capacitor electrodes 27yB and 27yA aligned in the row direction are provided. Further, an interconnection line 27iA that connects the capacitor electrode 27yA to the first pixel electrode 17A and an interconnection electrode 17iB that connects the capacitor electrode 27xB to the second pixel electrode (transparent electrode 117C) are provided. More specifically, one end of the interconnection line 27iA extending in the column direction is connected to the capacitor electrode 27yA, and the other end of the interconnection line 27iA is connected to the first pixel electrode 17A via a contact hole. The interconnection electrode 17iB is provided above the capacitor electrode 27xB in such a manner as to be connected to a part of the second pixel electrode (transparent electrode 117C), and is connected to the capacitor electrode 27xB via a contact hole.

Other connections on the pixel region 5δ and the shapes and positions of ribs provided according to the connections are the same as those of the pixel region 5α. A method for driving a liquid crystal display device including the liquid crystal panel of the present invention is the same as the method for driving the liquid crystal display device including the liquid crystal panel shown in FIG. 1.

As described above, the liquid crystal display device including the liquid crystal panel of the present invention is configured such that one pixel is constituted of a sub-pixel with high luminance (bright sub-pixel) and a sub-pixel with low luminance (dark sub-pixel). This allows halftone expression by area coverage modulation, improving a viewing angle dependence of a γ-characteristic (e.g. excess brightness in screen).

The liquid crystal panel of the present invention is configured such that one retention capacitor line (e.g. 18x) is provided so as to correspond to a space between two pixel regions (e.g. 5α and 5β) adjoining each other in the column direction, a plurality of capacitor electrodes aligned in the row direction (e.g. 27xb, 27xa) are provided on the retention capacitor line (e.g. 18x), a plurality of capacitor electrodes aligned in the row direction (e.g. 27yb, 27ya) are provided on the retention capacitor line (e.g. 18y), and the interconnection line (e.g. 27ia) that connects the capacitor electrode (e.g. 27xa) to the first pixel electrode (e.g. 17a) and the interconnection electrode (e.g. 17ib) that connects the capacitor electrode (e.g. 27yb) to the second pixel electrode (e.g. 17b) are provided. This allows an arrangement where one retention capacitor line (e.g. 18x) is shared by two pixel regions (e.g. 5α and 5β) and a part of the second pixel electrode (e.g. 117b and 117c) is positioned at two sides (upper and lower sides) of four sides surrounding the first pixel electrode (e.g. 17a). This allows reducing roughness due to the shapes and positions of individual pixel electrodes, without increasing the number of retention capacitor lines, compared with the conventional art shown in FIG. 30.

Further, the liquid crystal panel of the present invention is an MVA structure in which slits of the first and second pixel electrodes, serving as orientation regulation structures, and ribs serving as orientation regulation structures are provided as described above. This allows the liquid crystal display device of the present invention including the liquid crystal panel of the present invention to have four orientations of liquid crystals when displaying halftone. This assures a good viewing angle property.

Figure 13:
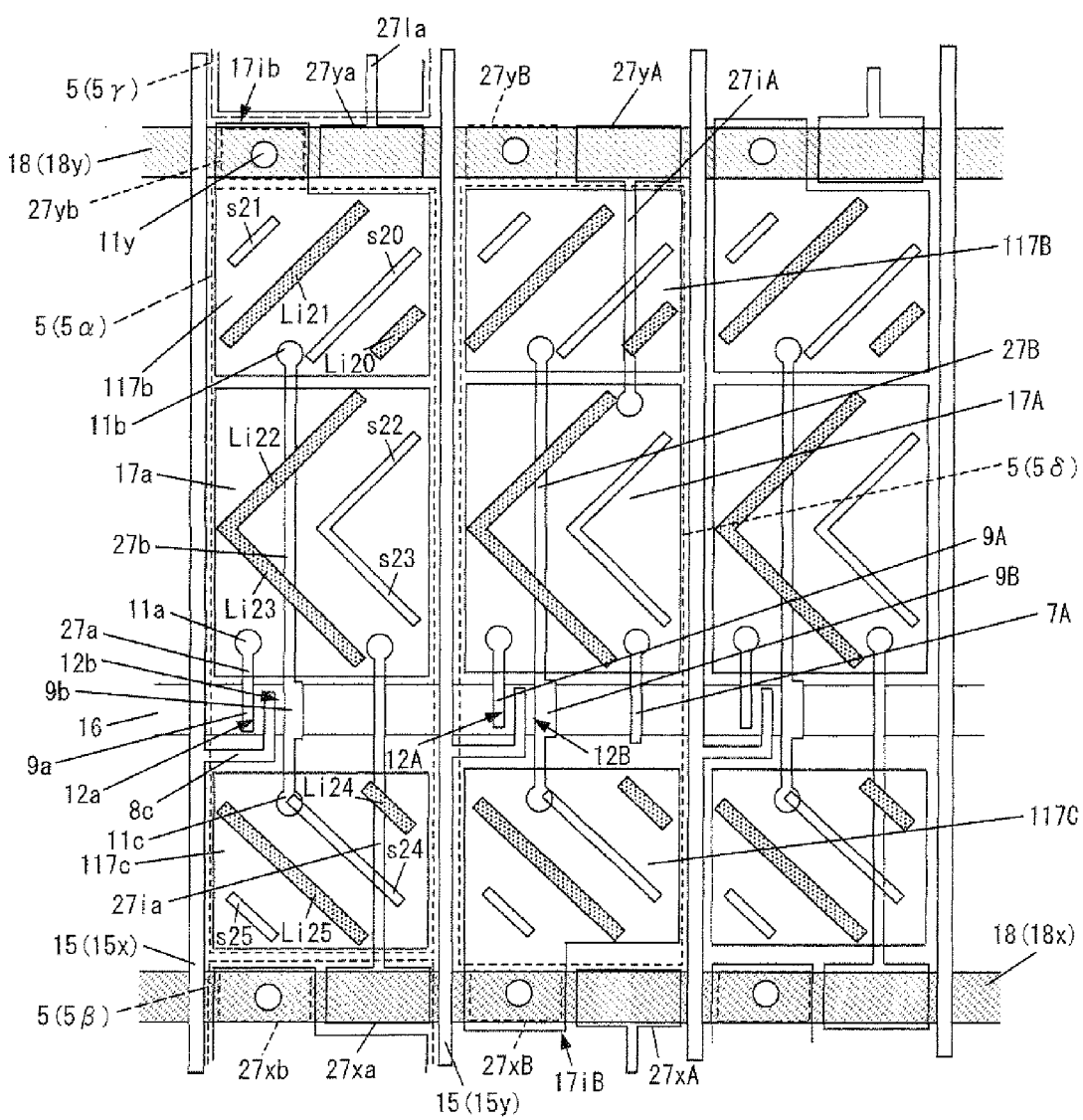
FIG. 13 is a plane view illustrating another arrangement of the liquid crystal panel according to Embodiment 3 of the present invention.

The liquid crystal panel of the present embodiment may be configured as shown in FIG. 13. For example, the pixel region 5α may be configured such that a portion 9b of the drain lead line 27b that overlaps the scanning signal line 16 and that serves as a drain electrode of the second transistor 12b is made larger than the drain electrode 9a of the first transistor 12a on the scanning signal line 16.

This allows parasitic capacitance between: the drain lead line 27b (a part of which serves as the drain electrode of the second transistor 12b) electrically connected to the second pixel electrodes 117b and 117c; and the scanning signal line 16 and parasitic capacitance between: the drain electrode 9a and the interconnection electrode 27ia that are electrically connected to the first pixel electrode 17a; and the scanning signal line 16 to be equal to each other. This allows uniformizing the influences on the first pixel electrode 17a and the second pixel electrodes 117b and 117c due to the parasitic capacitances (e.g. potential fluctuation caused by diving charge when the transistor is turned off), increasing display quality of the liquid crystal display device including the liquid crystal panel of the present invention.

Further, the pixel region 5δ is configured such that a drain extension line 7A connected to the first pixel electrode 17A via a contact hole is provided in such a manner as to overstride the scanning signal line 16. Further, a drain lead line 27B for connecting the second pixel electrodes 117B and 117C is provided in such a manner as to overstride the scanning signal line 16, and a portion 9B where the drain lead line 27B overlaps the scanning signal line 16 serves as the drain electrode of the transistor 12B. Here, the portion 9B is made larger than the drain electrode 9A of the first transistor 12A on the scanning signal line 16. This allows (i) a parasitic capacitance value between: the drain lead line 27B (a part of which serves as the drain electrode of the second transistor 12B) electrically connected to the second pixel electrodes 117B and 117C; and the scanning signal line 16 and (ii) a parasitic capacitance value between: the drain electrode 9A and the drain extension line 7A that are electrically connected to the first pixel electrode 17A; and the scanning signal line 16, to be equal to each other. This allows uniformizing the influences on the first pixel electrode 17A and the second pixel electrodes 117B and 117C due to the parasitic capacitances (e.g. potential fluctuation caused by (diving charge) when the transistor is turned off), thereby increasing display quality of the liquid crystal display device including the liquid crystal panel of the present invention.

When an overlapping area of lines and electrodes (connected to pixel electrodes) overstriding the scanning signal line 16 with the scanning signal line 16 on the pixel region 5α is the same as an overlapping area of lines and electrodes (connected to pixel electrodes) overstriding the scanning signal line 16 with the scanning signal line 16 on the pixel region 5δ, it is possible to make parasitic capacitances with respect to the scanning signal line 16 equal to each other. This allows uniformizing the influences on a pixel including the pixel region 5α and a pixel including the pixel region 5δ due to the parasitic capacitances (e.g. flicker due to potential fluctuation caused by diving charge when the transistor is turned off).

Embodiment 4

Figure 14:
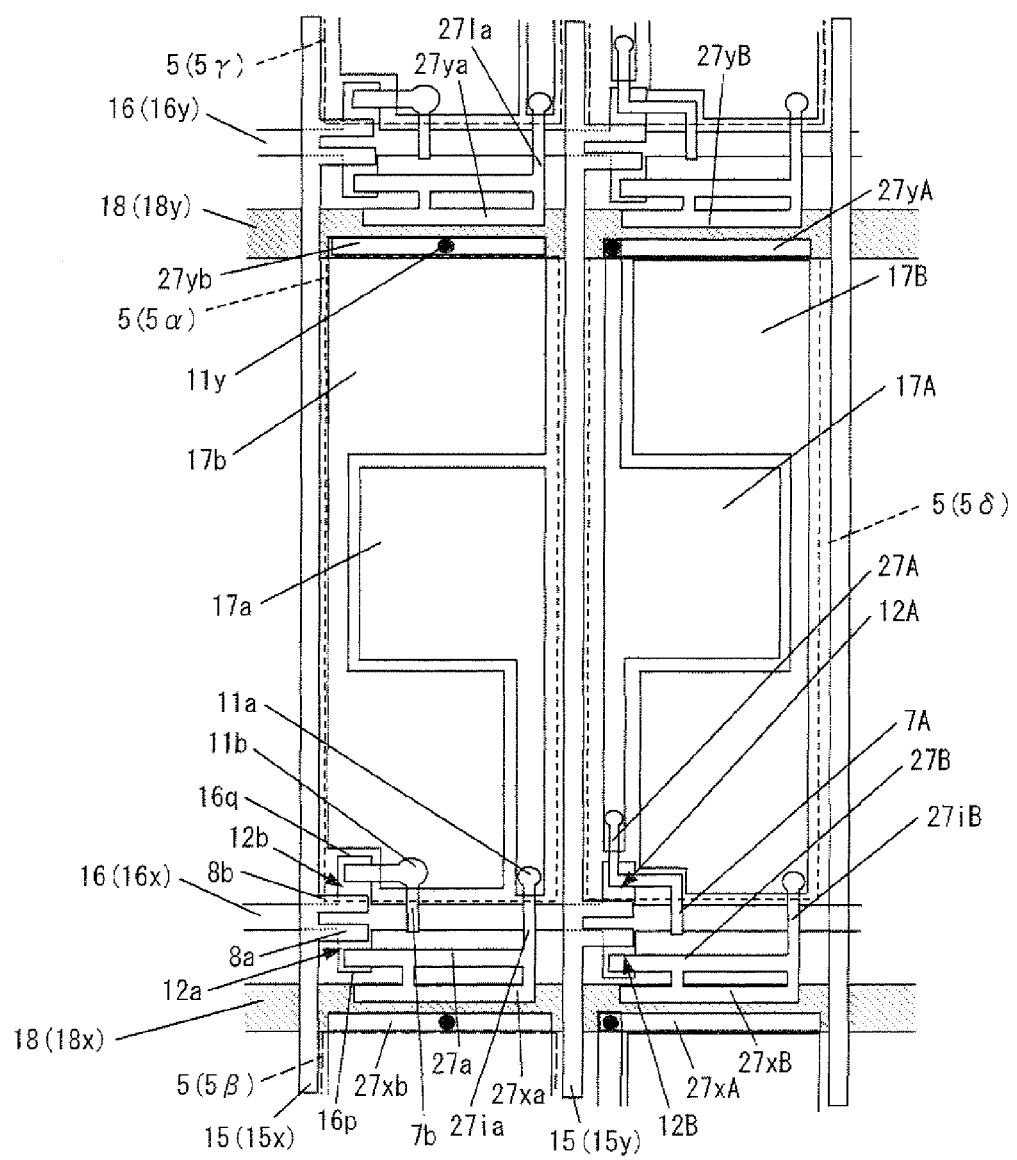
FIG. 14 is a plane view illustrating an arrangement of a liquid crystal panel according to Embodiment 4 of the present invention.

FIG. 14 is a plane view illustrating a liquid crystal panel of Embodiment 4. Although the liquid crystal panel of Embodiment 4 includes the active matrix substrate of the present invention, a liquid crystal layer, and a color filter substrate, the liquid crystal layer is not illustrated and the color filter substrate is only partially illustrated in FIG. 14.

When viewed in a plane manner, the active matrix substrate of the present invention includes: scanning signal lines 16 (16x, 16y) each extending in a row direction (right-left direction in the view); data signal lines 15 (15x, 15y) each extending in a column direction (upper-lower direction in the view); rectangular pixel regions 5 (5α, 5β, 5γ, 5δ) each marked off by the signal lines 15 and 16; first and second transistors each provided near the vicinity of an intersection of the signal lines 15 and 16 so as to correspond to the pixel region 5; and retention capacitor lines 18 (18x, 18y) each provided so as to correspond to a space between two pixel regions adjoining each other in a column direction. Further, each pixel region includes a first pixel electrode corresponding to a bright pixel in display and a second pixel electrode corresponding to a dark pixel in display, and a pixel includes the pixel region and a portion of a color filter substrate that corresponds to the pixel region. Further, the scanning signal line 16 is provided between the pixel region 5 and the retention capacitor line 18, and includes an electrode section that juts in two directions along the column direction and that corresponds to one pixel region.

For example, the pixel region 5α includes a first pixel electrode 17a and a second pixel electrode 17b. The first pixel electrode 17a is consisted of a rectangular portion positioned at the center of a pixel region and a portion that extends from a corner of the rectangular portion to the vicinity of the scanning signal line 16x along the data signal line 15y. The second pixel electrode 17b is constituted by two portions sandwiching the rectangular portion of the first pixel electrode 17a and a portion connecting the two portions. Further, the retention capacitor line 18x is provided so as to correspond to the space between the two pixel regions 5α and 5β adjoining each other in the column direction. Similarly, the retention capacitor line 18y is provided so as to correspond to the space between the two pixel regions 5α and 5γ adjoining each other in the column direction. The scanning signal line 16x is provided between the pixel region 5α and the retention capacitor line 18x. The scanning signal line 16y is provided between the pixel region 5γ and the retention capacitor line 18y. The scanning signal line 16x, for example, includes electrode sections 16p and 16q that jut in two directions (upper and lower directions in the view) along the column direction and that correspond to the pixel region 5α.

Further, the active matrix substrate of the present invention is configured such that capacitor electrodes 27xa and 27xb aligned in the column direction are provided above the retention capacitor line 18x, capacitor electrodes 27ya and 27yb aligned in the column direction are provided above the retention capacitor line 18y, and an interconnection line 27ia that connects the capacitor electrode 27xa to the first pixel electrode 17a is provided. More specifically, one end of the interconnection line 27ia extending in the column direction is connected to the capacitor electrode 27xa and the other end is connected to the first pixel electrode 17a via a contact hole 11a. Further, a part of the second pixel electrode 17b overlaps the capacitor electrode 27yb. At the overlapping portion, the second pixel electrode 17b is connected to the capacitor electrode 27yb via a contact hole 11y.

A source electrode 8a of a first transistor 12a is led out of the data signal line 15x. A drain electrode of the first transistor 12a is connected to the first pixel electrode 17a via a drain lead line 27a extending in the row direction, an interconnection line 27ia connected to the drain lead line 27a, and a contact hole 11a. The electrode section 16p of the scanning signal line 16x doubles as a gate electrode of the first transistor 12a. On the other hand, a source electrode 8b of a second transistor 12b is led out of the data signal line 15x. A drain electrode of the second transistor 12b is connected to the second pixel electrode 17b via a contact hole 11b, and is connected to the drain extension line 7b extending in the column direction. The electrode section 16q of the scanning signal line 16x doubles as a gate electrode of the second transistor 12b.

The active matrix substrate of the present invention is configured such that the data signal line 15, the drain electrodes of the first and second transistors 12a and 12b, the capacitor electrodes 27xb, 27xa, 27yb, and 27ya, the drain lead line 27a, the drain extension line 7b, and the interconnection line 27ia are provided in the same layer (by the same process). Further, since the scanning signal line 16x is provided between the pixel region 5α and the retention capacitor line 18x, the interconnection line 27ia connected to the drain electrode of the first transistor 12a is provided so as to overstride the scanning signal line 16x. Correspondingly, the drain extension line 7b connected to the drain electrode of the first transistor 12b is provided so as to overstride the scanning signal line 16x.

Further, the capacitor electrode 27xb provided on the retention capacitor line 18x is connected via a contact hole to a second pixel electrode provided on the pixel region 5β, and the capacitor electrode 27ya provided on the retention capacitor line 18y is connected via the interconnection line 27Ia and a contact hole (not shown) to a first pixel electrode provided on the pixel region 5γ. That is, the retention capacitor line 18x is shared by the pixel regions 5α and 5β, and the retention capacitor line 18y is shared by the pixel regions 5α and 5γ.

The pixel region 5δ adjacent to the pixel region 5α in the row direction is provided with a first pixel electrode 17A and a second pixel electrode 17B. The first pixel electrode 17A is constituted by: a rectangular portion positioned at the center of a pixel region; an elongated portion extending from a corner of the rectangular portion to the vicinity of the scanning signal line 16x along the data signal line 15y; and an elongated portion extending from another corner of the rectangular portion onto the retention capacitor line 18y along the data signal line 15y. The second pixel electrode 17B is constituted by two portions sandwiching the rectangular portion of the first pixel electrode 17A and a portion connecting the two portions. The second pixel electrode 17B does not overlap the retention capacitor line 18y.

Further, above the retention capacitor line 18x, capacitor electrodes 27xB and 27xA aligned in the column direction are provided, Above the retention capacitor line 18y, capacitor electrodes 27yB and 27yA aligned in the column direction are provided. Further, an interconnection line 27iB that connects the capacitor electrode 27xB to the second pixel electrode 17B is provided. More specifically, one end of the interconnection line 27iB extending in the column direction is connected to the capacitor electrode 27xB, and the other end of the interconnection line 27iB is connected to the second pixel electrode 17B via a contact hole. A part of the first pixel electrode 17A (portion on the retention capacitor line 18y) overlaps the capacitor electrode 27yA. At the overlapping portion, the first pixel electrode 17A is connected to the capacitor electrode 27yA via a contact hole. The scanning signal line 16x is provided between the pixel region 5δ and the retention capacitor line 18x.

Here, a source electrode of the second transistor 12B is led out of the data signal line 15y, and a drain electrode of the second transistor 12B is connected to the second pixel electrode 17B via a drain lead line 27B extending in the row direction, an interconnection line 27iB connected to the drain lead line 27B, and a contact hole. The electrode section of the scanning signal line 16x doubles as a gate electrode of the second transistor 12B. On the other hand, a source electrode of the first transistor 12A is led out of the data signal line 15y, and a drain electrode of the first transistor 12A is connected to the first pixel electrode 17A via a drain lead line 27A and a contact hole, and is connected to the drain extension line 7A extending in the column direction. The electrode section of the scanning signal line 16x doubles as a gate electrode of the first transistor 12A.

The data signal line 15y, the drain electrodes of the first and second transistors 12A and 12B, the capacitor electrodes 27xA, 27xB, 27yA, and 27yB, the drain lead lines 27A and 27B, the drain extension line 7A, and the interconnection line 27iB are provided in the same layer (by the same process). Since the scanning signal line 16x is provided between the pixel region 5δ and the retention capacitor line 18x as described above, the interconnection line 27iB connected to the drain electrode of the second transistor 12B is provided so as to overstride the scanning signal line 16x. Correspondingly, the drain extension line 7A connected to the drain electrode of the first transistor 12A is provided so as to overstride the scanning signal line 16x.

A method for driving a liquid crystal display device including the liquid crystal panel of the present invention is the same as the method for driving the liquid crystal display device including the liquid crystal panel shown in FIG. 1. Consequently, the liquid crystal display device including the liquid crystal panel of the present invention is configured such that one pixel is constituted by a sub-pixel with high luminance (bright sub-pixel) and a sub-pixel with low luminance (dark sub-pixel). This allows halftone expression by area coverage modulation, improving a viewing angle dependence of a γ-characteristic (e.g. excess brightness in screen).

The liquid crystal panel of the present invention is configured such that one retention capacitor line (e.g. 18x) is provided so as to correspond to a space between two pixel regions (e.g. 5α and 5β) adjoining each other in the column direction, a plurality of capacitor electrodes (e.g. 27xb, 27xa) aligned in the column direction are provided on the retention capacitor line (e.g. 18x), a plurality of capacitor electrodes (e.g. 27yb, 27ya) aligned in the column direction are provided on the retention capacitor line (e.g. 18y), and the interconnection line (e.g. 27ia) that connects the capacitor electrode (e.g. 27xa) to the first pixel electrode (e.g. 17a) and the interconnection electrode (e.g. 17ib) that connects the capacitor electrode (e.g. 27yb) to the second pixel electrode (e.g. 17b) are provided. This allows an arrangement where one retention capacitor line (e.g. 18x) is shared by two pixel regions (e.g. 5α and 5β) and a part of the second pixel electrode (e.g. 17b) is positioned around the first pixel electrode (e.g. 17a). This allows reducing roughness due to the shapes and positions of individual pixel electrodes, without increasing the number of retention capacitor lines, compared with the conventional art shown in FIG. 30.

Further, in the liquid crystal panel of the present invention, the pixel region 5α, for example, is configured such that the interconnection line 27ia connected to the drain electrode of the first transistor 12a is provided so as to overstride the scanning signal line 16x. Correspondingly, the drain extension line 7b connected to the drain electrode of the transistor 12b is provided so as to overstride the scanning signal line 16x. This arrangement allows (i) a parasitic capacitance value between the interconnection line 27ia electrically connected to the first pixel electrode 17a and the scanning signal line 16x and (ii) a parasitic capacitance value between the drain extension line 7b electrically connected to the second pixel electrode 17b and the scanning signal line 16x, to be equal to each other. This allows uniformizing the influences on the first pixel electrode 17a and the second pixel electrode 17b due to the parasitic capacitances (e.g. potential fluctuation caused by diving charge when the transistor is turned off), thereby increasing display quality of the liquid crystal display device including the liquid crystal panel of the present invention.

Embodiment 5

Figure 18:
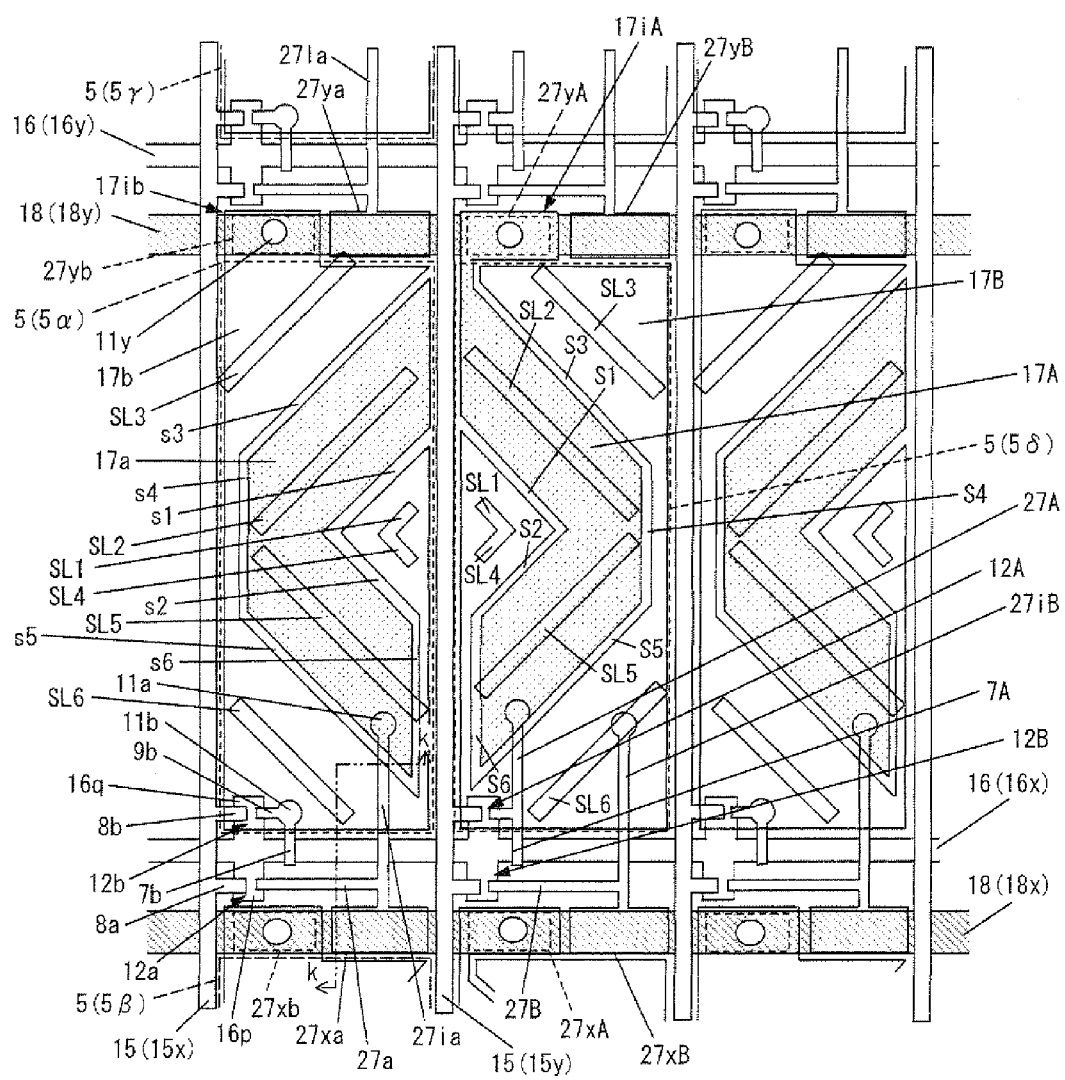
FIG. 18 is a plane view illustrating another arrangement of the liquid crystal panel according to Embodiment 5 of the present invention.

FIG. 18 is a plane view illustrating a liquid crystal panel of Embodiment 5. Although the liquid crystal panel of the present embodiment includes the active matrix substrate of the present invention, a liquid crystal layer, and a color filter substrate, the liquid crystal layer is not illustrated and only parts of the color filter substrate (slits in common electrode) are illustrated in FIG. 18.

The active matrix substrate of the liquid crystal panel of the present embodiment is configured in the same manner as that of the liquid crystal panel in FIG. 1 except that the liquid crystal panel of the present embodiment includes slits in a common electrode (provided in the color filter substrate) instead of ribs provided in the color filter substrate of the liquid crystal panel in FIG. 1. That is, the common electrode of the color filter substrate of the liquid crystal panel of the present embodiment includes slits SL1-SL6, and the shapes and plane positions of SL1-SL6 are the same as those of the ribs Li1-Li6 in the liquid crystal panel in FIG. 1.

Embodiment 6

FIG. 26 is a view schematically illustrating relations in connection between pixel electrodes and capacitor electrodes in an active matrix substrate of Embodiment 6 and relations between individual lines (data signal lines, scanning signal lines, and retention capacitor lines). FIG. 27 is a timing chart illustrating an example of how a liquid crystal display device including the active matrix substrate is driven.

As illustrated in FIG. 26, when a direction in which the scanning signal lines (G1, G2, . . . ) extend is regarded as a row direction, the active matrix substrate of the present Embodiment is configured such that there are provided data signal lines (D1, D2, . . . ) each extending in a column direction, retention capacitor lines (cs1, cs2, . . . ), and first and second transistors (not shown) each connected to one scanning signal line and one data signal line, each pixel region is provided with a first pixel electrode corresponding to a bright pixel in display and a second pixel electrode corresponding to a dark pixel, and the first pixel electrode is connected to the first transistor and the second pixel electrode is connected to the second transistor. Further, when a virtual line bisecting a pixel region in the column direction is regarded as a central line (broken line in the view), the first pixel electrode has a V-shape seen from the row direction, and the first pixel electrode having a V-shape is surrounded by the second pixel electrode. That is, the first and second pixel electrodes are shaped in such a manner that a part of the first pixel electrode and a part of the second pixel electrode are positioned at one side of the central line and the other part of the first pixel electrode and the other part of the second pixel electrode are positioned at the other side of the central line.

For example, a pixel region A1 includes a first pixel electrode E1 and a second pixel electrode F1, the first pixel electrode E1 is connected to a first transistor (not shown) connected to the data signal line D1 and the scanning signal line G1, and the second pixel electrode F1 is connected to a second transistor (not shown) connected to the data signal line D1 and the scanning signal line G1. Further, a pixel region A2 includes a first pixel electrode E2 and a second pixel electrode F2, the first pixel electrode E2 is connected to a first transistor (not shown) connected to the data signal line D1 and the scanning signal line G2, and the second pixel electrode F2 is connected to a second transistor (not shown) connected to the data signal line D1 and the scanning signal line G2. Similarly, a pixel region a1 adjoining the pixel region A1 in the row direction includes a first pixel electrode e1 and a second pixel electrode f1, and a pixel region a2 adjoining the pixel region A2 in the row direction includes a first pixel electrode e2 and a second pixel electrode f2.

The first pixel electrode E1 of the pixel region A1 and the first pixel electrode e1 of the pixel region a1 adjoining the pixel region A1 in the row direction each have a V-shape (seen in the row direction), and one of the first pixel electrode E1 and the first pixel electrode e1 has a shape obtained by rotating by 180° the shape of the other. Further, the first pixel electrode E1 and the first pixel electrode E2 of the pixel region A2 adjoining the pixel region A1 in the column direction each have a V-shape, and one of the first pixel electrode E1 and the first pixel electrode E2 has a shape obtained by rotating by 180° the shape of the other. Further, the first pixel electrode e1 and the first pixel electrode e2 of the pixel region a2 adjoining the pixel region a1 in the column direction each have a V-shape, and one of the first pixel electrode e1 and the first pixel electrode e2 has a shape obtained by rotating by 180° the shape of the other. Shaping individual pixel electrodes as described above allows a liquid crystal display device including the active matrix substrate of the present Embodiment to reduce jaggies and uniformize four domains (improve visual angle dependence).

One retention capacitor line is provided so as to correspond to two pixel regions adjoining each other in the column direction. A plurality of capacitor electrodes are aligned in the row direction so as to overlap the retention capacitor line (to form a capacitance). One of two pixel electrodes provided in one of the two pixel regions and one of two pixel electrodes provided in the other of the two pixel regions are electrically connected to respective capacitor electrodes adjoining each other in the row direction out of the plurality of capacitor electrodes. Further, the first pixel electrode provided in one pixel region is electrically connected to a capacitor electrode overlapping one of two adjacent retention capacitor lines, and the second pixel electrode provided in the pixel region is electrically connected to a capacitor electrode overlapping the other of the two adjacent retention capacitor lines.

For example, the active matrix substrate of the present embodiment is configured such that the retention capacitor lines cs1-cs4 each extending in the row direction are aligned in the column direction. For example, the retention capacitor line cs2 is provided so as to correspond to two pixel regions A1 and A2 (or a1 and a2) adjoining each other in the column direction, and the retention capacitor line cs3 is provided so as to correspond to the two pixel regions A2 and A3 (or a2 and a3) adjoining each other in the column direction. Further, the active matrix substrate of the present embodiment is configured such that capacitor electrodes m1-m4 are aligned in this order in the row direction so as to overlap the retention capacitor line cs1 (to form a capacitance), capacitance electrodes m5-m8 are aligned in this order in the row direction so as to overlap the retention capacitance line cs2 (to form a capacitance), and capacitor electrodes m9-m12 are aligned in this order in the row direction so as to overlap the retention capacitor line cs3 (to form a capacitance).

Further, the first pixel electrode E1 of the pixel region A1 is connected to the capacitor electrode m2 overlapping the retention capacitor line cs1, and the second pixel electrode F1 is connected to the capacitor electrode m6 overlapping the retention capacitor line cs2. Further, the first pixel electrode e1, of the pixel region a1 adjoining the pixel region A1 in the row direction is connected to the capacitor electrode m7 overlapping the retention capacitor line cs2, and the second pixel electrode f1 is connected to the capacitor electrode m4 overlapping the retention capacitor line cs1. Further, the first pixel electrode E2 of the pixel region A2 adjoining the pixel region A1 in the column direction is connected to the capacitor electrode m5 overlapping the retention capacitor line cs2, and the second pixel electrode F2 is connected to the capacitor electrode m9 overlapping the retention capacitor line cs3. Further, the first pixel electrode e2 of the pixel region a2 adjoining the pixel region a1 in the column direction is connected to the capacitor electrode m12 overlapping the retention capacitor line cs3, and the second pixel electrode f2 is connected to the capacitor electrode m8 overlapping the retention capacitor line cs2.

How to (electrically) connect the pixel electrode and the capacitor electrode is not limited. For example, the connection may be such that an interconnection line is led out of the capacitor electrode to a portion under the pixel electrode and the capacitor electrode and the pixel electrode are connected to each other via a contact hole. Alternatively, the connection may be such that the pixel electrode is made to overlap the capacitor electrode and the pixel electrode and the capacitor electrode are connected to each other via a contact hole.

In the liquid crystal display device including the active matrix substrate of the present embodiment, the scanning signal lines (G1, G2, . . . ), the data signal lines (D1, D2, . . . ), and the retention capacitor lines (cs1, cs2, . . . ) are driven as shown in FIG. 27 for example. This allows the first pixel electrode (e.g. E1, e1, E2, e2, . . . ) of each pixel region to correspond to a bright pixel in display and allows the second pixel electrode (e.g. F1, f1, F2, f2, . . . ) of each pixel region to correspond to a dark pixel.

Specifically, a signal potential whose polarity inverts with respect to one horizontal scanning period is supplied to a data signal line (D1, D2, . . . ), and a signal potential having opposite polarity in the horizontal scanning period is supplied to two data signal lines adjacent to the data signal line. For example, to the data signal line D1, a minus signal potential is supplied in the first horizontal scanning period and a plus signal potential is supplied in the second horizontal scanning period. To the data signal line D2, a plus signal potential is supplied in the first horizontal scanning period and a minus signal potential is supplied in the second horizontal scanning period.

Further, a Cs signal (Scs1, Scs2, . . . ) that is a retention capacitor line signal is supplied to a retention capacitor line (cs1, cs2, . . . ). Each Cs signal changes its level ("High" and "Low") in response to a cyclic level shift (standard cycle: 13H). Cs signals respectively supplied to two retention capacitor lines that form capacitances with two pixel electrodes in one pixel exhibit level shifts opposite to each other that are first level shifts after scanning of a scanning signal line to which the two pixel electrodes are connected. For example, in a case of Cs signals Scs1 and Scs2 that are respectively supplied to two retention capacitor lines cs1 and cs2 that form capacitances with two pixel electrodes provided in the pixel region A1 in FIG. 26, Cs signal Scs1 exhibits a minus (rapidly decreased) level shift that is a first level shift after scanning of the scanning signal line G1 to which the two pixel electrodes (E1 and F1) are connected, and Cs signal Scs2 exhibits a plus (rapidly increased) level shift that is a first level shift after scanning of the scanning signal line G1.

More specifically, the Cs signal Scs1 shifts its level from "L" to "H" before scanning of the scanning signal line G1 by 11 H and maintains substantially the same level until the scanning, and shifts its level from "H" to "L" in synchronization with start timing of the third horizontal scanning period after the scanning. On the other hand, the Cs signal Scs2 shifts its level from "H" to "L" before scanning of the scanning signal line G1 by 11 H and maintains substantially the same level until the scanning, and shifts its level from "L" to "H" in synchronization with start timing of the third horizontal scanning period after the scanning. Here, in consideration of distortion of a potential waveform of a retention capacitor line, the Cs signals Scs1 and Scs2 are set to shift their levels before the scanning of G1 and G2 by 10 H or more (certain period or more). Cs signals with odd numbers after the Cs signal Scs1 are set to delay their phases by 2 H in turn, and Cs signals with even numbers after the Cs signal Scs2 are set to delay their phases by 2 H in turn.

The active matrix substrate in FIG. 26 is configured on the premise that polarity of a signal potential supplied to each pixel region is subjected to dot-inversion (1V/1 H inversion). However, the active matrix substrate is not limited to this arrangement. For example, in order to reduce power consumption of a source driver or heat release of the source power, polarity of a signal potential supplied to each pixel region may be subjected to a V-line inversion. In this case, connections between pixel electrodes and capacitor electrodes, and relations between lines (data signal lines, scanning signal lines, and retention capacitor lines) in the active matrix substrate are those in FIG. 28 for example. FIG. 29 illustrates an example of how to drive a liquid crystal display device including the active matrix substrate in FIG. 28.

In the above embodiments, in order to regulate (control) orientation, slits are provided in individual pixel electrodes, or ribs are provided in a color filter substrate, or slits are provided in common electrodes of the color filter substrate. However, the present invention is not limited to these arrangements. The present invention may be arranged so that regulation of orientation is made by rubbing an orientation film, or regulation of orientation is made by changing the tilt of an orientation film with light.

In the above explanation, a direction in which a scanning signal line extends is regarded as a row direction, and a direction in which a data signal line extends is regarded as a column direction. This is intended for only convenience of explanation. In a case of an active matrix substrate in which a scanning signal line extends in a lateral direction, the lateral direction is regarded as a row direction. In a case of an active matrix substrate in which a scanning signal line extends in a vertical direction, the vertical direction is regarded as a row direction.

The following explains an example of how to produce the active matrix substrate of the present invention.

Initially, a metal film such as titan, chrome, aluminum, molybdenum, tantalum, tungsten, or copper, a film of alloy thereof, or a laminate film thereof is formed on a transparent insulating substrate such as glass or plastic by sputtering etc. in such a manner that the film thickness is 1000-3000 Å. This film is patterned by photo etching to have a desired shape. Thus, scanning signal lines (which double as gate electrodes of transistors) and retention capacitor lines are formed.

Subsequently, a silicon nitride film (SiNx) serving as a gate insulating film, a highly resistive semiconductor layer made of amorphous silicon, polysilicon etc., and a lowly resistive semiconductor layer made of n+amorphous silicon etc. are sequentially formed by plasma CVD (Chemical Vapor Deposition) etc., and are patterned by photo etching. The film thickness of the silicon nitride film serving as the gate insulating film is set to approximately 3000-5000 Å, for example. The film thickness of the amorphous silicon film serving as the highly resistive semiconductor layer is set to 1000-3000 Å, for example. The film thickness of the n+amorphous silicon film serving as the lowly resistive semiconductor film is set to 400-700 Å for example.

Subsequently, a metal film such as titan, chrome, aluminum, molybdenum, tantalum, tungsten, and copper, a film of alloy thereof, or a laminate film thereof is formed by sputtering etc. in such a manner that the film thickness is 1000-3000 Å. This film is patterned by photo etching to have a desired shape. Thus, a metal section including a data signal line, a source electrode, a drain electrode, an interconnection line, a drain extension line, a drain lead line etc. is formed.

Subsequently, the highly resistive semiconductor layer (i layer) such as the amorphous silicon film and the lowly resistive semiconductor layer (n+layer) such as the n+amorphous silicon film are subjected to channel etching by dry etching with patterns of the metal section being masks. In this process, the film thickness of the i layer is optimized and transistors (channel regions) are formed. Here, the semiconductor layer that is not covered with the metal section is removed by etching, and the i layer with a film thickness required for performance of individual transistors remains.

Subsequently, an inorganic insulating film such as silicon nitride and silicon oxide, or an organic insulating film such as a photosensitive acrylic resin film, or a laminate film thereof etc., each serving as an interlayer insulating film, is formed so as to cover the individual transistors (channel regions) and the metal section. Specifically, a silicon nitride film of 2000-5000 Å in film thickness, formed by plasma CVD etc., or a photosensitive acrylic resin film of 20000-40000 Å in film thickness, formed by spin coating, or a laminate film thereof may be used. A polyimide resin film, a resin film without photosensitivity, or a spin on glass (SOG) film etc. may be used as an interlayer insulating film.

Subsequently, in accordance with the position of a contact hole, the interlayer insulating film is etched to form a hole. Here, a photosensitive resist is patterned by photolithography (exposure and development) to make etching.

Subsequently, a transparent conductive film such as ITO (Indium Tin Oxide), IZO, zinc oxide, or tin oxide is formed on the interlayer insulating film by sputtering to have a film thickness of 1000-2000 Å, and is patterned by photo etching etc. to have a required shape. Thus, pixel electrodes and interconnection electrodes (if necessary, transparent lines) are formed. Further, if necessary, a pixel electrode slit for regulating orientation is formed.

Subsequently, an orientation film is applied by an ink-jet method etc. Thus, an active matrix substrate is formed.

The following explains how to seal liquid crystals between an active matrix substrate and a color filter substrate that is a counter substrate.

Sealing of liquid crystals may be carried out by a method (vacuum filling method) in which an opening for pouring liquid crystals is provided in a thermosetting sealing resin, the opening is immersed in liquid crystals in vacuum, the opening is put in the air so that the liquid crystals are poured, and thereafter the opening is sealed with UV curing resin etc. Alternatively, sealing of liquid crystals may be carried out by a one drop filling process as explained below.

A UV curing sealing resin containing spaces such as fiber glass is applied on the peripheral of an active matrix substrate, and liquid crystals are dropped on a color filter substrate by a one drop filling process. The one drop filling process allows the most appropriate amount of liquid crystals to be regularly dropped inside the seal. The amount of liquid crystals to be dropped depends on the cell gap value and the volume of liquid crystals that can be filled in cells.

Subsequently, in order to combine the color filter substrate on which the seal has been drawn and to which liquid crystals have been dropped with the active matrix substrate, the pressure of atmosphere in a combining device is reduced to 1 Pa, and the two substrates are combined with each other under the atmosphere with the reduced pressure. Reducing the pressure of the atmosphere in the combining device to atmospheric pressure allows the sealed portions to be crushed.

Subsequently, the combined substrates are subjected to UV irradiation by a UV curing device so that the sealing resin is cured. Thereafter, the substrates are baked so that the sealing resin is finally cured. At this point, liquid crystals pervade the inside of the sealing resin and the cell is filled with the liquid crystals.

The color filter substrate includes colored layers (R, G, B) positioned in a matrix manner so as to correspond to individual pixels of the active matrix substrate, black matrices provided at gaps of the color layers, counter electrodes (common electrodes) etc. By combining the color filter substrate having such arrangement with the active matrix substrate of the present invention, and pouring and sealing liquid crystals as described above, the liquid crystal panel of the present invention is produced.

In the present Embodiment, the liquid crystal display unit of the present invention and the liquid crystal display device of the present invention are produced as follows.

Figure 21:
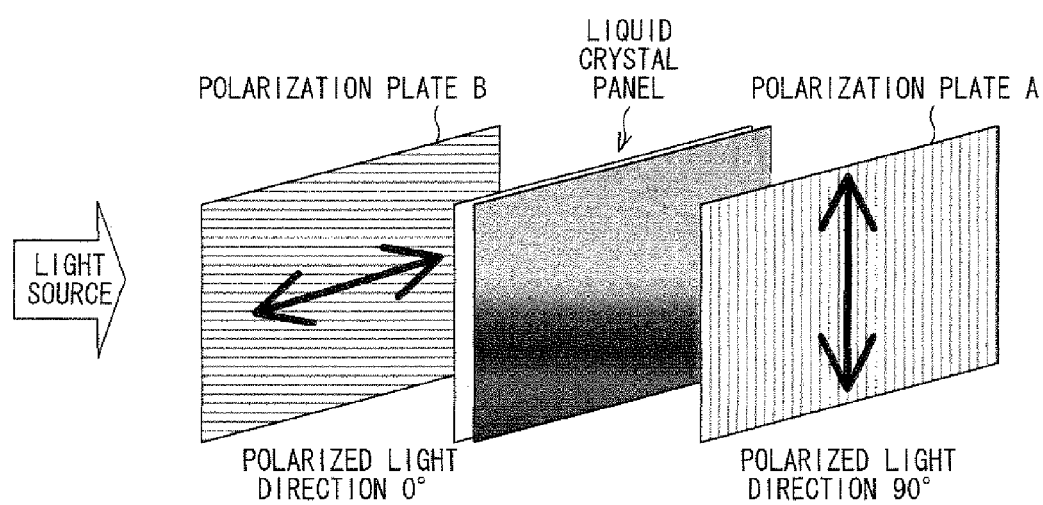
FIG. 21 schematically illustrates how to attach polarizers to a liquid crystal panel of the present invention.

As illustrated in FIG. 21, two polarization plates A and B are attached to both sides of the liquid crystal panel, respectively, in such a manner that the polarization axis of the polarization plate A is perpendicular to the polarization axis of the polarization plate B. If necessary, an optical compensation sheet etc. may be laminated on the polarization plate. Thereafter, as illustrated in (a) of FIG. 22, drivers (gate driver 102, source driver 101) are connected with the liquid crystal panel. As an example, the following explains connecting the drivers by TCP (Tape Career Package). Initially, ACF (Anisotropic Conductive Film) is temporarily pressed and attached to a terminal section of the liquid crystal panel. Subsequently, TCPs on which the drivers are mounted are knocked through from carrier tapes, are positioned on terminal electrodes of the liquid crystal panel, and heated and pressed so as to be completely attached. Thereafter, a circuit substrate 103 (PWB: Printed Wiring Board) for connecting the driver TCPs is connected with input terminals of the TCPs via the ACF. Thus, a liquid crystal display unit 100 is completed.

Thereafter, as illustrated in (b) of FIG. 22, the drivers 101 and 102 of the liquid crystal display unit are connected to a display control circuit 113 via the circuit substrate 103, and the liquid crystal display unit is combined with an illuminating device (backlight unit) 104. Thus, a liquid crystal display device 110 is completed.

Figure 19:
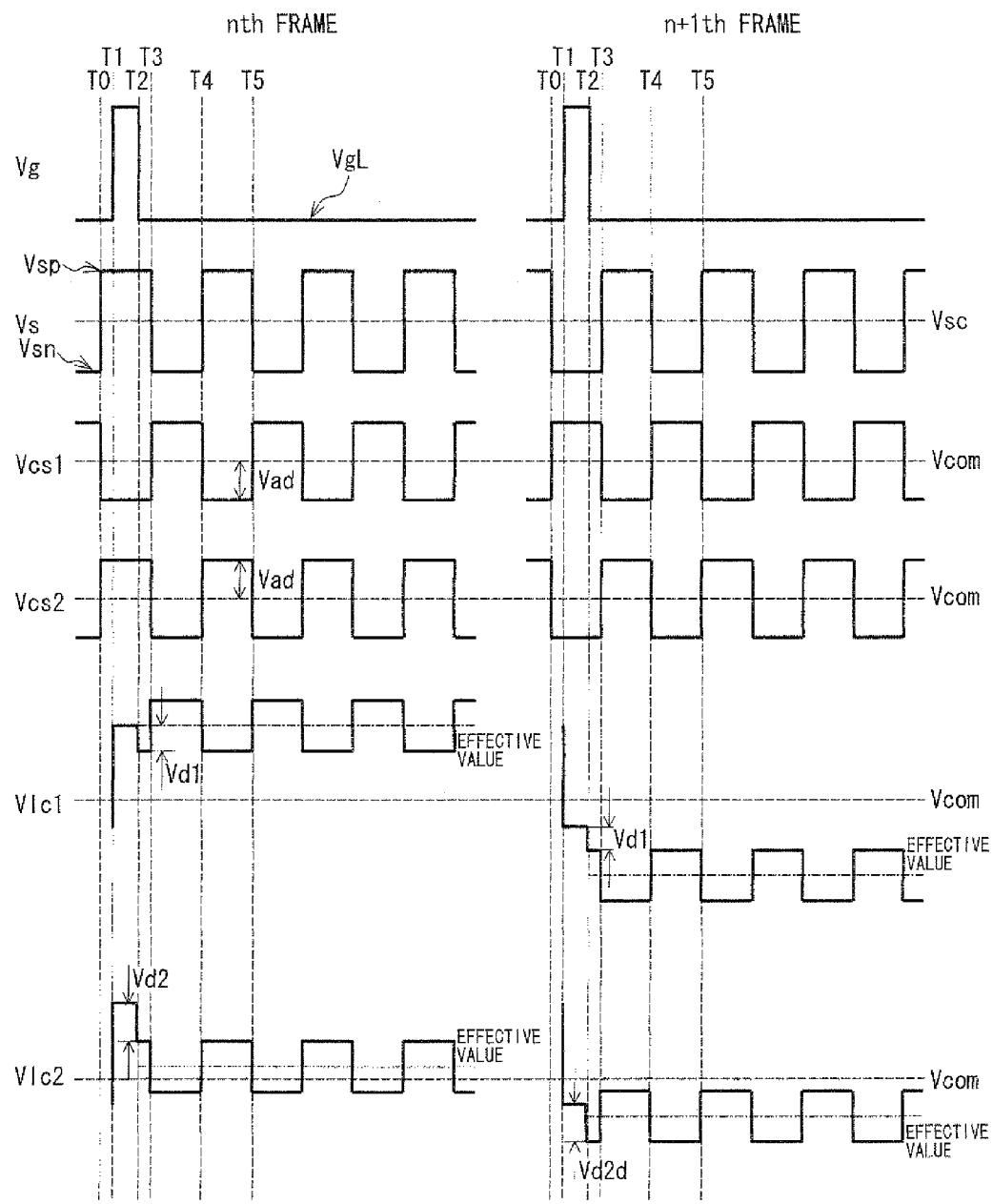
FIG. 19 is a timing diagram showing a driving method of a liquid crystal display device of the present invention.

FIG. 19 is a timing chart showing operations of individual sections of the liquid crystal display device of the present invention. In a case of employing the liquid crystal panel in FIG. 1, Vg indicates a potential of the scanning signal line 16x, Vs indicates a potential (signal potential) of the data signal line 15x, Vcs1 indicates a potential of the first retention capacitor line 18x, Vcs2 indicates a potential of the second retention capacitor line 18y, Vlc1 indicates a potential of the first pixel electrode 17a, and Vlc2 indicates a potential of the second pixel electrode 17b. The potential of the first retention capacitor line 18x and the potential of the second retention capacitor line 18y are oscillated each with an oscillation voltage of Vad, and the phases of the potentials are shifted from each other by 180°. That is, the potentials are controlled in such a manner that Vg gets "L" at T2 (TFTs 12a and 12b get OFF) and then Vcs1 gets "H" and Vcs2 gets "L". Here, central potentials of Vcs1 and Vcs2 are set to Vcom, but not limited to Vcom. Potential variations of Vlc1 and Vlc2 are correlated to an oscillation voltage Vad of Vcs1 and Vcs2 and therefore potentials of Vlc1 and Vlc2 can be varied regardless of whether the central potentials of Vcs1 and Vcs2 are Vcom or not. The same can be said about FIG. 20 mentioned later.

Figure 20:
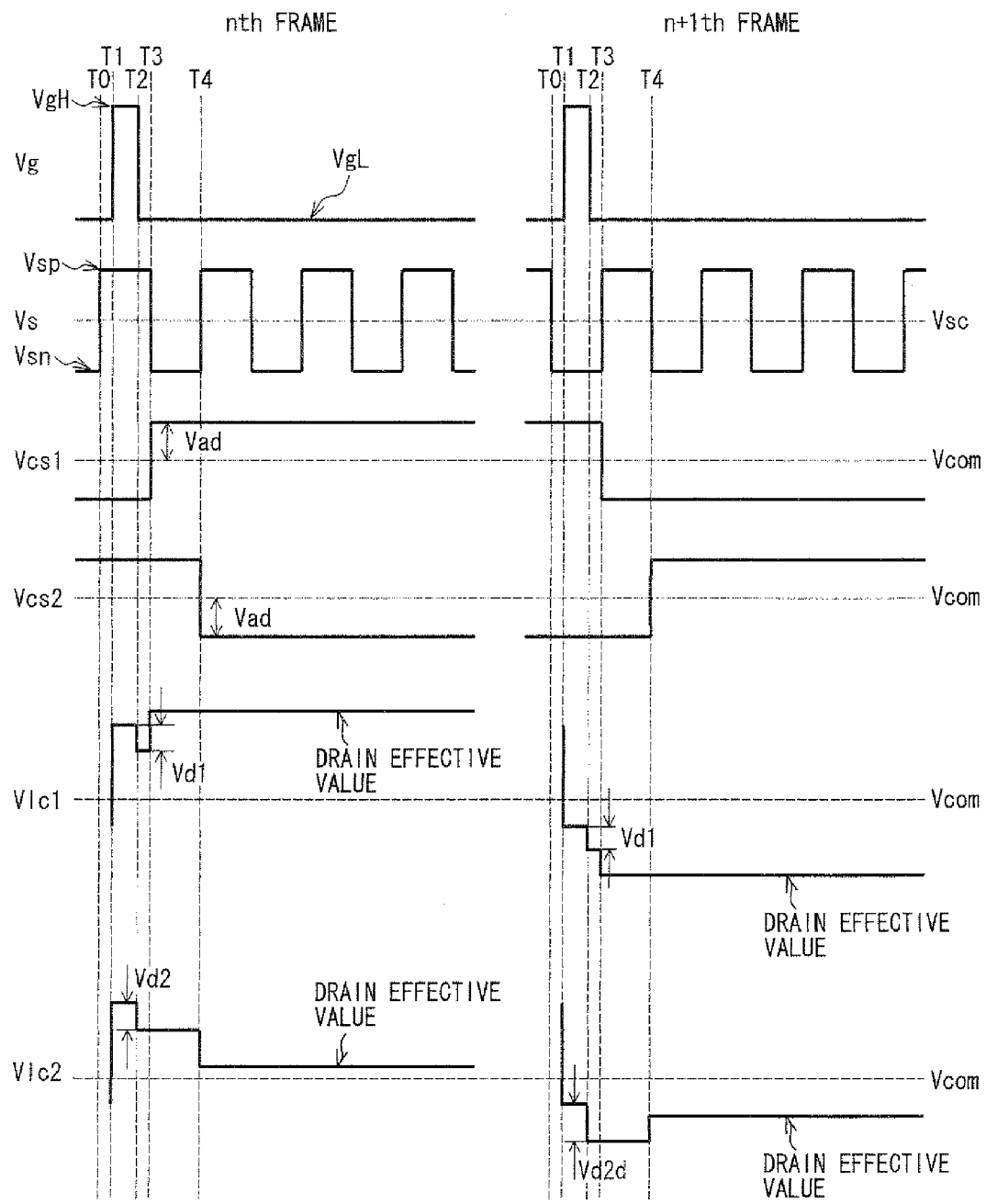
FIG. 20 is a timing diagram showing another driving method of the liquid crystal display device of the present invention.

Further, as illustrated in FIG. 20, the present invention may be arranged so that Vcs1 gets "High" (or "Low") at T3 just after Vg has got "L" at T2 (TFTs 12a and 12b have got OFF) and Vcs1 maintains "High" ("Low"), and Vcs2 gets "Low" (or "High") at T4 that is 1 horizontal period (1 H) after T3 and Vcs2 maintains "Low" (or "High"). That is, a potential is controlled in such a manner that after the transistors are turned off, Vcs1 is rapidly increased and the increased value is kept in the frame, and Vcs2 is rapidly decreased 1 H period after the rapid increase of Vcs1 and the decreased value is kept in the frame. Alternatively, a potential is controlled in such a manner that after the transistors are turned off, Vcs1 is rapidly decreased and the decreased value is kept in the frame, and Vcs2 is rapidly increased 1 H period after the rapid decrease of Vcs1 and the increased value is kept in the frame. This reduces the influence of distortions of Vcs1 and Vcs2 waveforms on a drain effective potential, which is effective for reducing luminance unevenness.

The following explains an example of an arrangement where the liquid crystal display device of the present invention is applied to a television receiver. FIG. 23 is a block diagram illustrating an arrangement of the liquid crystal display device 110 used for the television receiver. The liquid crystal display device 110 includes the liquid crystal display unit 100, a Y/C separation circuit 80, a video chroma circuit 81, an A/D converter 82, a liquid crystal controller 83, a back light driving circuit 85, a backlight 86, a microcomputer 87, and a tone circuit 98.

The liquid crystal display unit 100 includes one of the liquid crystal panels described in the embodiments, and a source driver and a gate driver each for driving the liquid crystal panel.

In the liquid crystal display device 110 with the above arrangement, a composite color video signal Scv is supplied from outside to the Y/C separation circuit 80, and separated there into a luminance signal and a color signal. The luminance signal and the color signal are converted by the video chroma circuit 81 into analog RGB signals corresponding to three primary colors of light. The analog RGB signals are converted by the A/D converter 82 into digital RGB signals. The digital RGB signals are inputted to the liquid crystal controller 83. Further, the Y/C separation circuit 80 also separates horizontal and vertical synchronization signals from the composite color video signal Scv supplied from the outside, and the horizontal and vertical synchronization signals are supplied to the liquid crystal controller 83 via the microcomputer 87.

The digital RGB signals are supplied, together with timing signals based on the synchronization signals, from the liquid crystal controller 83 to the liquid crystal display unit 100 with predetermined timing. Further, tone voltages corresponding to three primary colors R, G, and B for color display are generated in the tone circuit 98 and are supplied to the liquid crystal display unit 100. In the liquid crystal display unit 100, driving signals (such as data signals and scanning signals) are generated by the source driver, the gate driver etc. provided therein on a basis of the RGB signals, the timing signals, and the tone voltages, and a color image is displayed by a display section provided therein on a basis of the driving signals. In order that the liquid crystal display unit 100 displays an image, it is necessary to emit light from the back of the liquid crystal display unit 100. In the liquid crystal display device 110, the backlight driving circuit 85 drives the backlight 86 in response to control of the microcomputer 87, so that light is emitted to the backside of the liquid crystal panel of the present invention.

The microcomputer 87 controls the whole system, including the above processes. Examples of the video signals (composite color video signals) supplied from the outside include not only video signals based on television broadcasting but also video signals captured by a camera and video signals supplied via an Internet line. Thus, the liquid crystal display device 110 can display an image based on various kinds of video signals.

In a case where the liquid crystal display device 110 displays an image based on the television broadcasting, a tuner section 600 is connected with the liquid crystal display device 110 as illustrated in FIG. 24. Thus, a television receiver 601 of the present invention is provided. The tuner section 600 extracts a signal of a channel to receive from reception waves (high frequency signals) received by an antenna (not shown) and converts the signal into an intermediate frequency signal, and demodulates the intermediate frequency signal so as to take out a complex color video signal Scv serving as a television signal. The composite color video signal Scv is supplied to the liquid crystal display device 110 as described above, and the liquid crystal display device 110 displays an image based on the composite color video signal Scv.

FIG. 25 is an exploded perspective view illustrating an example of an arrangement of the television receiver of the present invention. As illustrated in FIG. 25, the television receiver 601 of the present invention includes the liquid crystal display device 110, a first housing 801, and a second housing 806. The liquid crystal display device 110 is sandwiched between the first housing 801 and the second housing 806 in such a manner that the liquid crystal display device 110 is enwrapped by the first housing 801 and the second housing 806. The first housing 801 includes an opening section 801a through which an image displayed by the liquid crystal display device 110 passes. The second housing 806 is provided so as to cover the backside of a display device 800. The second housing 806 includes an operation circuit 805 for operating the display device 800 and is provided at its lower part a supporting member 808 for supporting the display device 800.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The liquid crystal panel of the present invention and the liquid crystal display device of the present invention are preferably applicable to a liquid crystal television for example.

The invention claimed is:

1. An active matrix substrate comprising:
    scanning signal lines each extending in a row direction;
    data signal lines each extending in a column direction;
    retention capacitor lines each extending in the row direction;
    first and second transistors each provided near the vicinity of each intersection of the scanning signal lines and the data signal lines so that each of the first and second transistors is connected to a corresponding scanning signal line and a corresponding data signal line; and
    first and second pixel electrodes each provided in each pixel region, said first pixel electrode being connected to the first transistor and said second pixel electrode being connected to the second transistor, wherein:
    one retention capacitor line is provided so as to correspond to a space between two pixel regions adjoining each other in the column direction, a plurality of capacitor electrodes are provided so as to overlap the retention capacitor line so that (a) either of first and second pixel electrodes provided in one of the two pixel regions and (b) either of first and second pixel electrodes provided in the other one of the two pixel regions are electrically connected, respectively, to corresponding ones of the plurality of capacitor electrodes provided so as to overlap the retention capacitor line,
    said first pixel electrode provided in each pixel region is electrically connected to a corresponding one of the plurality of capacitor electrodes that is provided so as to overlap one of two adjacent retention capacitor lines, and said second pixel electrode provided in the each pixel region is electrically connected to a corresponding one of the plurality of capacitor electrodes that is provided so as to overlap the other one of the two adjacent retention capacitor lines,
    an interconnection line for electrically connecting said first or second pixel electrode to a corresponding one of the plurality of capacitor electrodes is provided,
    said first pixel electrode is connected to a drain electrode of the first transistor and said second pixel electrode is connected to a drain electrode of the second transistor,
    said first pixel electrode is provided so as not to overlap any lines connected to the drain electrode of the second transistor and said second pixel electrode is provided so as not to overlap any lines connected to the drain electrode of the first transistor,
    one pixel region is provided between two adjacent retention capacitor lines such that a scanning signal line is provided between the pixel region and one of the two retention capacitor lines,
    in a part of the pixel region along the scanning signal line, a part of said second pixel electrode is positioned, but any part of said first pixel electrode is not positioned,
    a non-pixel electrode forming region in which neither of said first and second pixel electrodes is formed, is provided in a part of the pixel region, adjacent to the scanning signal line, and
    said first pixel electrode is electrically connected to a drain electrode of the first transistor via the interconnection line or a drain lead line that crosses the non-pixel electrode forming region.

2. The active matrix substrate as set forth in claim 1, wherein:
    (i) a corresponding one of the plurality of capacitor electrodes that is connected to a first pixel electrode provided in one of two pixel regions adjoining each other in a row direction and (ii) a corresponding one of the plurality of capacitor electrodes that is connected to a second pixel electrode provided in the other one of the two pixel regions are provided so as to overlap the same retention capacitor line.

3. The active matrix substrate as set forth in claim 1, wherein:
    the plurality of capacitor electrodes and drain electrodes of the first and second transistors are provided in the same layer.

4. The active matrix substrate as set forth in claim 3, wherein:
    the interconnection line and the plurality of capacitor electrodes are provided in the same layer.

5. The active matrix substrate as set forth in claim 4, wherein:
    an insulating film containing an organic material is provided between the scanning signal lines and respective interconnection lines provided so as to overstride the scanning signal lines, respectively.

6. The active matrix substrate as set forth in claim 1, wherein:
    said first pixel electrode provided in each pixel region corresponds to a bright pixel in the display, and said second pixel electrode provided in the each pixel region corresponds to a dark pixel in the display.

7. The active matrix substrate as set forth in claim 1, wherein:
    a part of said second pixel electrode provided in each pixel region is positioned at both ends of the each pixel region, along two adjacent retention capacitor lines, respectively.

8. The active matrix substrate as set forth in claim 1, wherein:
    a part of said second pixel electrode is positioned to at least two sides of four sides surrounding said first pixel electrode.

9. The active matrix substrate as set forth in claim 1, wherein:
    the interconnection line is provided so as to overstride a scanning signal line.

10. The active matrix substrate as set forth in claim 9, wherein:
    only one of the first and second transistors is arranged such that its drain electrode is electrically connected to the interconnection line provided so as to overstride a scanning signal line, and an overlapping area where the drain electrode of the one of the first and second transistors and the scanning signal line overlap each other is smaller than an overlapping area where the drain electrode of the other one of the first and second transistors and the scanning signal line overlap each other.

11. The active matrix substrate as set forth in claim 1, wherein:
    a space between said first and second pixel electrodes serves as a structure for regulating liquid crystal orientation.

12. The active matrix substrate as set forth in claim 1, wherein:
an inorganic interlayer insulating layer and an organic interlayer insulating layer having a film thickness thicker than that of the inorganic interlayer insulating layer are provided between (i) drain electrodes of the first and second transistors and (ii) said first and second pixel electrodes.

13. The active matrix substrate as set forth in claim 1, wherein:
said first pixel electrode is provided substantially in a V-shape, when viewed in the row direction.

14. The active matrix substrate as set forth in claim 13, wherein:
respective first pixel electrodes provided in two pixel regions adjoining each other in the row direction, face directions opposite to each other.

15. The active matrix substrate as set forth in claim 1, wherein:
when a virtual line bisecting a pixel region in the column direction is regarded as a central line, a part of said first pixel electrode and a part of said second pixel electrode are positioned at one side of the central line while the other part of said first pixel electrode and the other part of said second pixel electrode are positioned at the other side of the central line.

16. A liquid crystal panel comprising an active matrix substrate as set forth in claim 1.

17. A liquid crystal display unit comprising:
a liquid crystal panel as set forth in claim 16; and
a driver.

18. A liquid crystal display device comprising:
a liquid crystal display unit as set forth in claim 17; and
an illumination device.

19. The liquid crystal display device as set forth in claim 18, wherein:
when two adjacent retention capacitor lines are regarded as first and second retention capacitor lines, respectively,
potentials of said first and second retention capacitor lines are controlled so that phases of potential signals of said first and second retention capacitor lines are shifted from each other by 180°.

20. The liquid crystal display device as set forth in claim 18, wherein:
when two adjacent capacitor lines are regarded as first and second capacitor lines, respectively,
(i) a potential of said first retention capacitor line is controlled such that, after each transistor has been turned off, the potential has been increased and an increased value thereof is maintained in a frame until the each transistor is to be turned off in a subsequent frame, and a potential of said second retention capacitor line is controlled such that, after the each transistor has been turned off, the potential has been decreased and a decreased value thereof is maintained in the frame until the each transistor is to be turned off in the subsequent frame, or alternatively, (ii) a potential of said first retention capacitor line is controlled such that, after each transistor has been turned off, the potential has been decreased and a decreased value thereof is maintained in a frame until the each transistor is to be turned off in a subsequent frame, and a potential of said second retention capacitor line is controlled such that, after the each transistor has been turned off, the potential has been increased and an increased value thereof is maintained in the frame until the each transistor is to be turned off in the subsequent frame.

21. The liquid crystal display device as set forth in claim 20, wherein:
the potential of said second retention capacitor line is decreased one horizontal period after the potential of said first retention capacitor line is increased, or alternatively, the potential of said second retention capacitor line is increased one horizontal period after the potential of said first retention capacitor line is decreased.

22. A television receiver comprising:
a liquid crystal display device as set forth in claim 18; and
a tuner section for receiving television broadcasting.

23. An active matrix substrate comprising:
data signal lines each extending in a column direction, when a direction in which scanning signal lines extend is regarded as a row direction;
retention capacitor lines;
first and second transistors each connected to a corresponding scanning signal line and a corresponding data signal line; and
pixel regions aligned in row and column directions, each including first and second pixel electrodes, said first pixel electrode being connected to the first transistor and said second pixel electrode being connected to the second transistor, wherein:
one retention capacitor line is provided so as to correspond to two pixel regions adjoining each other in the column direction, a plurality of capacitor electrodes aligned in the row direction are provided so as to form capacitances with the retention capacitor line, so that (a) one of two pixel electrodes provided in one of the two pixel regions and (b) one of two pixel electrodes provided in the other one of the two pixel regions are electrically connected to respective capacitor electrodes adjoining each other in the row direction out of the plurality of capacitor electrodes,
said first pixel electrode provided in each of the pixel regions is electrically connected to a corresponding one of the plurality of capacitor electrodes that forms a capacitance with one of two adjacent retention capacitor lines, and said second pixel electrode provided in the each of the pixel regions is electrically connected to a corresponding one of the plurality of capacitor electrodes that forms a capacitor with the other one of the two adjacent retention capacitor lines,
wherein the active matrix substrate is provided as part of a liquid crystal display unit including a liquid crystal panel;
when two adjacent capacitor lines are regarded as first and second capacitor lines, respectively,
(i) a potential of said first retention capacitor line is controlled such that, after each transistor has been turned off, the potential has been increased and an increased value thereof is maintained in a frame until the each transistor is to be turned off in a subsequent frame, and a potential of said second retention capacitor line is controlled such that, after the each transistor has been turned off, the potential has been decreased and a decreased value thereof is maintained in the frame until the each transistor is to be turned off in the subsequent frame, or alternatively, (ii) a potential of said first retention capacitor line is controlled such that, after each transistor has been turned off, the potential has been decreased and a decreased value thereof is maintained in a frame until the each transistor is to be turned off in a subsequent frame, and a potential of said second retention capacitor line is controlled such that, after the each transistor has been turned off, the potential has been increased and an increased value thereof is maintained in the frame until the each transistor is to be turned off in the subsequent frame.

24. The active matrix substrate as set forth in claim 23 when a virtual line bisecting a pixel region in the column direction is regarded as a central line, a part of said first pixel electrode and a part of said second pixel electrode are positioned at one side of the central line while the other part of said first pixel electrode and the other part of said second pixel electrode are positioned at the other side of the central line.

25. The liquid crystal display device as set forth in claim 23, wherein:
the potential of said second retention capacitor line is decreased one horizontal period after the potential of said first retention capacitor line is increased, or alternatively, the potential of said second retention capacitor line is increased one horizontal period after the potential of said first retention capacitor line is decreased.

26. A television receiver comprising:
a liquid crystal display device as set forth in claim 23; and
a tuner section for receiving television broadcasting.

27. An active matrix substrate comprising:
scanning signal lines each extending in a row direction;
data signal lines each extending in a column direction;
retention capacitor lines each extending in the row direction;
first and second transistors each provided near the vicinity of each intersection of the scanning signal lines and the data signal lines so that each of the first and second transistors is connected to a corresponding scanning signal line and a corresponding data signal line; and
first and second pixel electrodes each provided in each pixel region, said first pixel electrode being connected to the first transistor and said second pixel electrode being connected to the second transistor, wherein:
one retention capacitor line is provided so as to correspond to a space between two pixel regions adjoining each other in the column direction, a plurality of capacitor electrodes are provided so as to overlap the retention capacitor line so that (a) either of first and second pixel electrodes provided in one of the two pixel regions and (b) either of first and second pixel electrodes provided in the other one of the two pixel regions are electrically connected, respectively, to corresponding ones of the plurality of capacitor electrodes provided so as to overlap the retention capacitor line,
said first pixel electrode provided in each pixel region is electrically connected to a corresponding one of the plurality of capacitor electrodes that is provided so as to overlap one of two adjacent retention capacitor lines, and said second pixel electrode provided in the each pixel region is electrically connected to a corresponding one of the plurality of capacitor electrodes that is provided so as to overlap the other one of the two adjacent retention capacitor lines,
an interconnection line for electrically connecting said first or second pixel electrode to a corresponding one of the plurality of capacitor electrodes is provided,
wherein the active matrix substrate is provided in a liquid crystal display device including a liquid crystal panel, a driver, and an illumination device;
when two adjacent capacitor lines are regarded as first and second capacitor lines, respectively,
(i) a potential of said first retention capacitor line is controlled such that, after each transistor has been turned off, the potential has been increased and an increased value thereof is maintained in a frame until the each transistor is to be turned off in a subsequent frame, and a potential of said second retention capacitor line is controlled such that, after the each transistor has been turned off, the potential has been decreased and a decreased value thereof is maintained in the frame until the each transistor is to be turned off in the subsequent frame, or alternatively, (ii) a potential of said first retention capacitor line is controlled such that, after each transistor has been turned off, the potential has been decreased and a decreased value thereof is maintained in a frame until the each transistor is to be turned off in a subsequent frame, and a potential of said second retention capacitor line is controlled such that, after the each transistor has been turned off, the potential has been increased and an increased value thereof is maintained in the frame until the each transistor is to be turned off in the subsequent frame.

28. The liquid crystal display device as set forth in claim 27, wherein:
the potential of said second retention capacitor line is decreased one horizontal period after the potential of said first retention capacitor line is increased, or alternatively, the potential of said second retention capacitor line is increased one horizontal period after the potential of said first retention capacitor line is decreased.

29. A television receiver comprising:
a liquid crystal display device as set forth in claim 27; and
a tuner section for receiving television broadcasting.

* * * * *